United States Patent
Maruo et al.

(10) Patent No.: US 12,036,725 B2
(45) Date of Patent: Jul. 16, 2024

(54) SHAPING APPARATUS, DROPLET MOVING DEVICE, OBJECT PRODUCTION METHOD, SHAPING METHOD, DROPLET MOVING METHOD, SHAPING PROGRAM, AND DROPLET MOVING PROGRAM

(71) Applicant: National University Corporation Yokohama National University, Kanagawa (JP)

(72) Inventors: Shoji Maruo, Yokohama (JP); Hotaka Hirata, Yokohama (JP); Taichi Furukawa, Yokohama (JP)

(73) Assignee: National University Corporation Yokohama National University, Yokohama (JP)

( * ) Notice: Subject to any disclaimer, the term of this patent is extended or adjusted under 35 U.S.C. 154(b) by 315 days.

(21) Appl. No.: 17/436,503

(22) PCT Filed: Mar. 6, 2020

(86) PCT No.: PCT/JP2020/009634
§ 371 (c)(1),
(2) Date: Sep. 3, 2021

(87) PCT Pub. No.: WO2020/179904
PCT Pub. Date: Sep. 10, 2020

(65) Prior Publication Data
US 2022/0193979 A1    Jun. 23, 2022

(30) Foreign Application Priority Data

Mar. 7, 2019 (JP) ................................. 2019-042010
Aug. 30, 2019 (JP) ................................. 2019-158495

(51) Int. Cl.
*B29C 41/02*      (2006.01)
*B01L 3/00*      (2006.01)
(Continued)

(52) U.S. Cl.
CPC ...... *B29C 64/112* (2017.08); *B01L 3/502792* (2013.01); *B29C 64/209* (2017.08);
(Continued)

(58) Field of Classification Search
CPC ....... B01L 3/502792; B01L 2400/0448; B29C 64/124; B29C 64/129; B29C 64/386;
(Continued)

(56) References Cited

U.S. PATENT DOCUMENTS 6,079,821 A * 6/2000 Chwalek .................. B41J 2/085
347/82
2006/0246224 A1* 11/2006 Neitzel ............. B01L 3/502792
118/313

(Continued)

FOREIGN PATENT DOCUMENTS

JP    A-2005-144217    6/2005
JP    2005-254263 A    9/2005
(Continued)

OTHER PUBLICATIONS

Notice of Allowance issued in corresponding JP Application No. 2021-503663, dated Jun. 27, 2023.
(Continued)

*Primary Examiner* — Leo B Tentoni
(74) *Attorney, Agent, or Firm* — Blank Rome LLP

(57) ABSTRACT

A shaping apparatus includes: a movement processing unit that heats a droplet such that a temperature of the droplet on a peripheral side in a horizontal direction becomes higher than that on a center side in the horizontal direction and move the droplet by moving a heating area; and a shaping unit that performs shaping by partially changing the droplet into a solid in a predetermined shaping area.

6 Claims, 41 Drawing Sheets

(51) Int. Cl.
  *B29C 64/112*  (2017.01)
  *B29C 64/209*  (2017.01)
  *B29C 64/268*  (2017.01)
  *B29C 64/286*  (2017.01)
  *B33Y 10/00*  (2015.01)
  *B33Y 30/00*  (2015.01)
(52) U.S. Cl.
  CPC .......... *B29C 64/268* (2017.08); *B29C 64/286* (2017.08); *B33Y 10/00* (2014.12); *B33Y 30/00* (2014.12); *B01L 2400/0448* (2013.01)
(58) Field of Classification Search
  CPC ....... B29C 64/393; B33Y 10/00; B33Y 30/00; B33Y 40/00; B33Y 40/20; B33Y 50/00; B33Y 50/02
  USPC ....... 264/40.1, 308, 401, 482, 494; 425/135, 425/174.4, 375; 137/13, 334; 250/432 R
  See application file for complete search history.

(56) References Cited

U.S. PATENT DOCUMENTS

| 2008/0105829 | A1* | 5/2008 | Faris | B01L 3/502792 250/432 R |
| 2011/0232524 | A1* | 9/2011 | Kim | C09D 11/30 106/31.13 |
| 2014/0150887 | A1* | 6/2014 | Basu | B01L 3/502792 137/13 |
| 2014/0203479 | A1* | 7/2014 | Teken | B33Y 10/00 264/401 |
| 2017/0312981 | A1 | 11/2017 | Selbertinger et al. | |
| 2017/0364058 | A1* | 12/2017 | Jagdale | B33Y 10/00 |
| 2018/0187640 | A1 | 7/2018 | Zhang et al. | |

FOREIGN PATENT DOCUMENTS

| JP | 2012-032258 A | 2/2012 |
| JP | 2015-214771 A | 12/2015 |
| JP | A-2016-219773 | 12/2016 |
| JP | 2017-018960 A | 1/2017 |
| JP | 2017-533851 A | 11/2017 |
| WO | WO 2019/156170 A1 | 8/2019 |

OTHER PUBLICATIONS

YY. Cao et al., "3D Metallic Nanostructure Fabrication by Surfactant-Assisted Multiphoton-Induced Reduction," *Small*, vol. 5, No. 10, pp. 1144-1148, 2009.

T. Zandrini et al., "Magnetically Driven Micromachines Created by Two-Photon Microfabrication and Selective Electroless Magnetite Plating for Lab-on-a-Chip Applications," *Micromachines*, vol. 8, No. 35, pp. 1-8, 2017.

F. Mayer et al., "Multimaterial 3D Laser Microprinting Using an Integrated Microfluidic System," *Science Advances*, vol. 5, No. 2, Feb. 8, 2019.

International Search Report for Application No. PCT/JP2020/009634, dated Jun. 9, 2020, with English translation.

International Preliminary Report on Patentability for Application No. PCT/JP2020/009634, dated Dec. 22, 2020, with English translation.

* cited by examiner

SHAPING APPARATUS, DROPLET MOVING DEVICE, OBJECT PRODUCTION METHOD, SHAPING METHOD, DROPLET MOVING METHOD, SHAPING PROGRAM, AND DROPLET MOVING PROGRAM

The present application claims priority over Japanese Patent Application No. 2019-042010 filed in Japan on Mar. 7, 2019, and Japanese Patent Application No. 2019-158495 filed in Japan on Aug. 30, 2019, the contents of which are incorporated herein by reference.

TECHNICAL FIELD

The present invention relates to a shaping apparatus, a droplet moving device, an object production method, a shaping method, a droplet moving method, a shaping program, and a droplet moving program.

BACKGROUND ART

Stereolithography is one method capable of shaping a three-dimensional object. In stereolithography, an object is shaped by irradiating a material in a liquid form with light such as ultraviolet laser light and partially changing the material into a solid.

In relation to stereolithography, Non Patent Literature 1 discloses a method of shaping a fine structure of silver by using a photoreduction. In the method described in Non Patent Literature 1, an aqueous liquid containing silver ions is irradiated with laser light to condense silver into a desired shape. Thereby, the aqueous liquid is removed.

Further, Non-Patent Literature 2 shows an experimental example of performing stereolithography by combining a plurality of materials. In the experimental example described in Non-Patent Literature 2, each of an acrylic resin and a methacrylic resin is shaped by using photopolymerization, and the magnetic material is electroless plated. As a result, of the acrylic resin and the methacrylic resin, only the acrylic resin is selectively plated. Further, in Non-Patent Literature 3, a method is used in which an acrylic resin or the like is introduced into a shaping unit using a microchannel, the material is switched by a valve, and shaping is performed with a plurality of resin materials.

In this way, by performing stereolithography using a plurality of types of materials, it is possible to shape an object having various characteristics.

CITATION LIST

Non-Patent Literature
  Non-Patent Literature 1
    Y. Cao et al., "3D Metallic Nanostructure Fabrication by Surfactant-Assisted Multiphoton-Induced Reduction", *Small*, 2009, Vol. 5, No. 10, p. 1144-1148.
  Non-Patent Literature 2
    T. Zandrini et al., "Magnetically Driven Micromachines Created by Two-Photon Microfabrication and Selective Electroless Magnetite Plating for Lab-on-a-Chip Applications", *Micromachines*, 2017, Vol. 8, No. 35, p. 1-8.
  Non-Patent Literature 3
    F. Mayer et al., "Multimaterial 3D laser microprinting using an integrated microfluidic system", *Science Advances*, Feb. 8, 2019: Vol. 5, No. 2 (https://www-.science.org/doi/10.1126/sciadv.aau9160)

SUMMARY OF THE INVENTION

Problem to be Solved by the Invention

When shaping an object by changing a material in a liquid form into a solid such as in stereolithography or photoreduction, it is necessary to place the material in a liquid form in an area where the shaping is performed, such as a range that can be irradiated with laser light. Such a method becomes a burden for a user performing the placement. In particular, when shaping is performed by using a plurality of materials, it is necessary to clean the object in the process of being shaped every time the material is replaced and place the cleaned object and the next material in an area where the shaping is performed. Therefore, the burden on the user performing the work is large. Further, in a case where a precision process is performed such as when the object is small when the cleaned object is placed, the accuracy of the placement position and direction is required, which further increases the burden on the user performing the work. Further, the method of exchanging materials by using a microchannel has an advantage that a substrate is not detached, but there is a problem that the amount of material in a microtube or a switching valve connected to a shaping unit is very large and the materials are mixed when the materials are exchanged so that the waste of the material is very large.

The present invention provides a shaping apparatus, a droplet moving device, an object production method, a shaping method, a droplet moving method, a program, a shaping program, and a droplet moving program that can reduce the burden of placing a material in a liquid form when shaping an object by changing the material in a liquid form into a solid.

Means for Solving the Problem

According to a first aspect of the present invention, a shaping apparatus includes: a movement processing unit that heats a droplet such that a temperature of the droplet on a peripheral side in a horizontal direction becomes higher than that on a center side in the horizontal direction and move the droplet by moving a heating area; and a shaping unit that performs shaping by partially changing the droplet into a solid in a predetermined shaping area.

The movement processing unit may heat the droplet by using an electromagnetic wave.

The movement processing unit may heat the droplet such that the temperature of the droplet on the peripheral side in the horizontal direction becomes higher than that on the center side in the horizontal direction by blocking part of the electromagnetic wave with a mask.

After moving the droplet, the movement processing unit may cool the moved droplet and end heating, which makes the temperature of the droplet on the peripheral side in the horizontal direction higher than that on the center side in the horizontal direction.

The movement processing unit may move the droplet on a surface where a patterning process that changes wettability is applied.

According to a second aspect of the present invention, a droplet moving device includes: a movement processing unit that heats a droplet such that a temperature of the droplet on a peripheral side in a horizontal direction becomes higher than that on a center side in the horizontal direction and move the droplet by moving a heating area.

According to a third aspect of the present invention, a shaping method includes: a step of heating a droplet such that a temperature of the droplet on a peripheral side in a horizontal direction becomes higher than that on a center side in the horizontal direction and moving the droplet by moving a heating area; and a step of performing shaping by partially changing the droplet into a solid in a predetermined shaping area.

According to a fourth aspect of the present invention, a droplet moving method includes: a step of heating a droplet such that a temperature of the droplet on a peripheral side in a horizontal direction becomes higher than that on a center side in the horizontal direction and moving the droplet by moving a heating area.

According to a fifth aspect of the present invention, a program is for causing a computer to execute: a step of heating a droplet such that a temperature of the droplet on a peripheral side in a horizontal direction becomes higher than that on a center side in the horizontal direction and moving the droplet by moving a heating area; and a step of performing shaping by partially changing the droplet into a solid in a predetermined shaping area.

According to a sixth aspect of the present invention, a program is for causing a computer to execute: a step of heating a droplet such that a temperature of the droplet on a peripheral side in a horizontal direction becomes higher than that on a center side in the horizontal direction and moving the droplet by moving a heating area.

According to a seventh aspect of the present invention, a shaping apparatus includes: a movement processing unit that generates a temperature gradient having a predetermined shape by applying a laser, and move a droplet based on the temperature gradient; and a shaping unit that performs shaping by partially changing the droplet into a solid in a predetermined shaping area.

The movement processing unit may generate the temperature gradient by moving an irradiation area of the laser.

The movement processing unit may generate the temperature gradient by moving the irradiation area of the laser with a galvano mirror.

According to an eighth aspect of the present invention, a droplet moving device includes: a movement processing unit that generates a temperature gradient having a predetermined shape by applying a laser and moving an irradiation area of the laser with a galvano mirror, and move the droplet based on the temperature gradient.

According to a ninth aspect of the present invention, a shaping method includes: a step of generating a temperature gradient having a predetermined shape by applying a laser and moving a droplet based on the temperature gradient; and a step of performing shaping by partially changing the droplet into a solid in a predetermined shaping area.

According to a tenth aspect of the present invention, a droplet moving method includes: a step of generating a temperature gradient having a predetermined shape by applying a laser and moving an irradiation area of the laser with a galvano mirror, and moving the droplet based on the temperature gradient.

According to an eleventh aspect of the present invention, a shaping program is for causing a computer to function as: a movement processing unit that generates a temperature gradient having a predetermined shape by applying a laser, and move the droplet based on the temperature gradient; and a shaping unit that performs shaping by partially changing the droplet into a solid in a predetermined shaping area.

According to a twelfth aspect of the present invention, a droplet moving program is for causing a computer to function as: a movement processing unit that generates a temperature gradient having a predetermined shape by applying a laser and moving an irradiation area of the laser with a galvano mirror, and move the droplet based on the temperature gradient.

Advantageous Effects of Invention

According to an embodiment of the present invention, when shaping an object by changing a material in a liquid form into a solid, the burden of placing the material in a liquid form can be reduced.

DETAILED DESCRIPTION OF THE PREFERRED EMBODIMENTS

First Embodiment

Hereinafter, a first embodiment of the present invention will be described, but the following first embodiment does not limit the invention according to the claims. Further, not all combinations of features described in the first embodiment are essential to the means of solving the invention.

Figure 1:
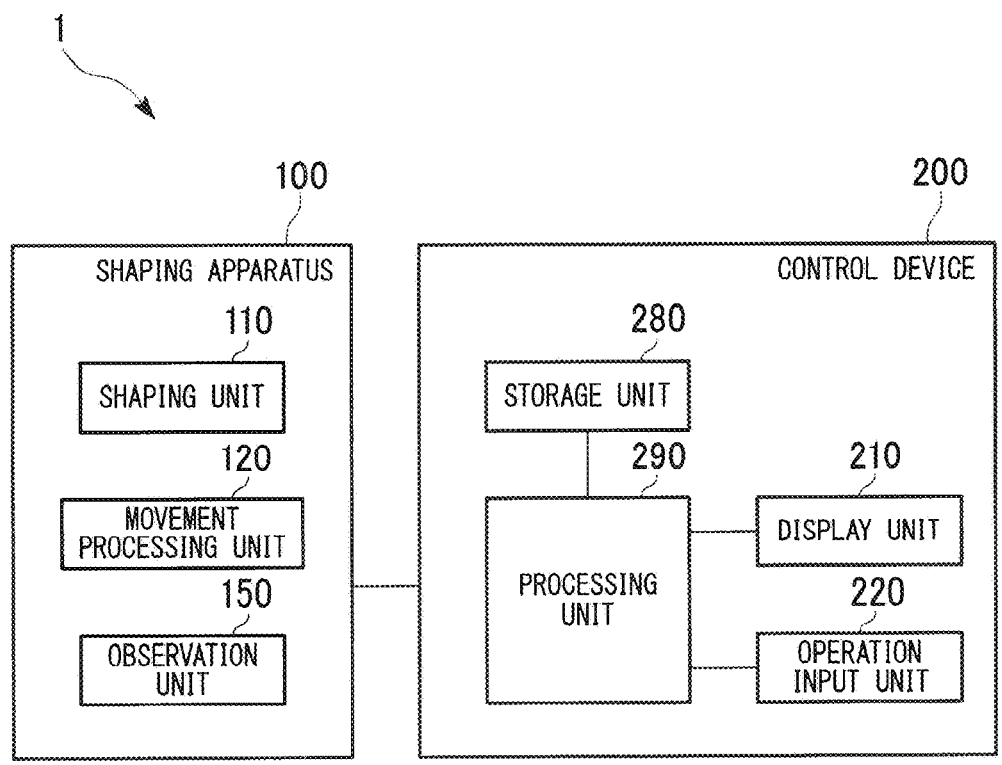
FIG. 1 is a schematic block diagram showing a functional configuration of a shaping system according to an embodiment.

FIG. 1 is a schematic block diagram showing a functional configuration of a shaping system according to the first embodiment. As shown in FIG. 1, the shaping system 1 includes a shaping apparatus 100 and a control device 200. The shaping apparatus 100 includes a shaping unit 110, a movement processing unit 120, and an observation unit 150. The control device 200 includes a display unit 210, an operation input unit 220, a storage unit 280, and a processing unit 290.

The shaping system 1 produces an object by partially changing a material in a liquid form into a solid.

The shaping apparatus 100 is an apparatus that executes the production of an object. In particular, the shaping apparatus 100 shapes the object by partially changing each droplet of one or more materials into a solid. The droplet referred to here is a mass of liquid that is collected by surface tension. The shaping referred to here is to make something with a shape.

The shaping unit 110 performs shaping by partially changing a droplet of a material in a shaping area into a solid. Specifically, by irradiating the droplet with laser light and forming a focal point of the laser light inside the droplet, the material in a liquid form is changed into a solid at a position of the focal point. The shaping area referred to here is an area in which the shaping unit 110 can change the material into a solid. Specifically, the shaping area is an area in which the focal point of the laser light can be formed by the shaping unit 110.

In the following, a case where the material is a photocurable resin and the shaping unit 110 cures the photocurable resin from liquid into a solid by using stereolithography will be described as an example.

However, the method in which the shaping unit 110 performs shaping is not limited to a specific method as long as the droplet of the material can be partially changed into a solid. For example, the method in which the shaping unit 110 performs shaping may be any one of photopolymerization, photocrosslink, photoreduction, or a combination thereof.

Further, the laser light used for shaping by the shaping unit 110 may be any laser light capable of curing the material and is not limited to the laser light having a specific wavelength. For example, the shaping unit 110 may use ultraviolet laser light or may use blue laser light. Alternatively, the shaping unit 110 may perform the shaping with a two-photon shaping method using two-photon absorption by using near-infrared femtosecond-pulse laser light.

Figure 2:
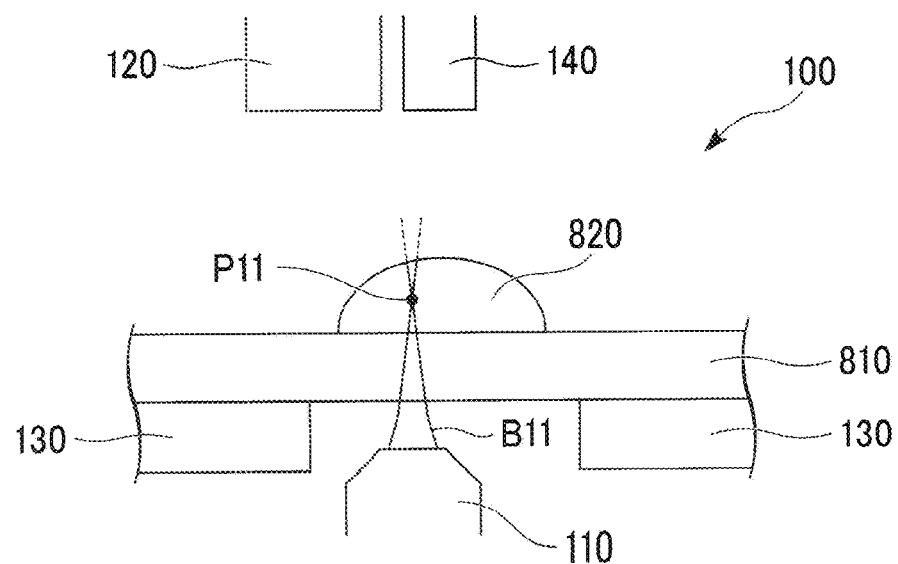
FIG. 2 is a diagram showing an example of a position where a focal point of laser light is formed by a shaping unit according to the embodiment.

FIG. 2 is a diagram showing an example of a position where a focal point of the laser light is formed by the shaping unit 110. In FIG. 2, a laser light emitting portion of each of the shaping unit 110 and the movement processing unit 120 is shown. Further, the shaping apparatus 100 includes a support stand 130 and a dropping port 140 in addition to the movement processing unit 120 and the shaping unit 110. On the support stand 130, a substrate 810 with a glass plate that is used as a substrate for shaping an object, is placed. The support stand 130 supports the substrate 810.

Further, the droplet 820 is placed on the substrate 810. The laser light applied by the shaping unit 110 is also referred to as a shaping beam B11.

FIG. 2 shows an example in which the laser light emitting portion of each of the shaping unit 110 and the movement processing unit 120, the support stand 130, the substrate 810, and the droplet 820 are viewed from the side (horizontal direction).

The droplet 820 shown in FIG. 2 is a droplet of the material. The droplet 820 is placed on the substrate 810.

The shaping unit 110 irradiates the droplet 820, through which the shaping beam B11 passes, with the shaping beam B11 from below the substrate 810 so as to form a focal point in the droplet 820. The shaping beam B11 that is applied by the shaping unit 110 forms the focal point at a point P11. Therefore, a portion of the point P11 of the droplet 820 changes into a solid from liquid.

The laser light emitting portion of the shaping unit 110 can be moved back and forth, and left and right in FIG. 2. Further, the shaping unit 110 can move the position of the focal point of the shaping beam B11 up and down in FIG. 2. Therefore, the shaping unit 110 can three-dimensionally move the position of the focal point of the shaping beam B11 up, down, left and right, and back and forth in FIG. 2.

By the shaping unit 110 to move the position of the focal point of the shaping beam B11 along the shape of the object in the droplet 820, the material can be processed into the shape of the object.

Further, as shown in FIG. 2, the shaping unit 110 applies the shaping beam B11 from the lower side of the substrate 810 so that the shaping beam B11 reaches an upper surface of the droplet 820 after forming the focal point. Therefore, the position where the shaping beam B11 forms the focal point is not affected by the refraction according to the shape of the droplet 820 due to a surface tension. In this respect, the shaping system 1 can perform positioning of the focal point of the shaping beam B11 with high accuracy.

However, the shaping unit 110 may apply the shaping beam B11 from the upper side of the droplet 820. As a result, even when the droplet 820 is positioned on an opaque article such as when the droplet 820 is dropped on an upper surface of an opaque board, the material can be partially changed into a solid by irradiating the droplet 820 with the shaping beam B11.

The cleaning liquid is dropped from the dropping port 140. The cleaning liquid is liquid for removing the material in a liquid form adhering to the solidified material after processing the material in a liquid form. The dropping port 140 cleans the material in a solid form positioned in a shaping area by dropping the cleaning liquid toward the shaping area. That is, the dropping port 140 removes the material in a liquid form adhering to the solidified material positioned in the shaping area.

However, the method of cleaning the material in a solid form by the shaping system 1 is not limited to the method of dropping the cleaning liquid from the dropping port 140. By moving the cleaning liquid that is prepared in advance in the form of droplets 820, the material in a solid form is immersed in the cleaning liquid by the shaping system 1. Thereby, the material in a solid form may be cleaned.

Figure 3:
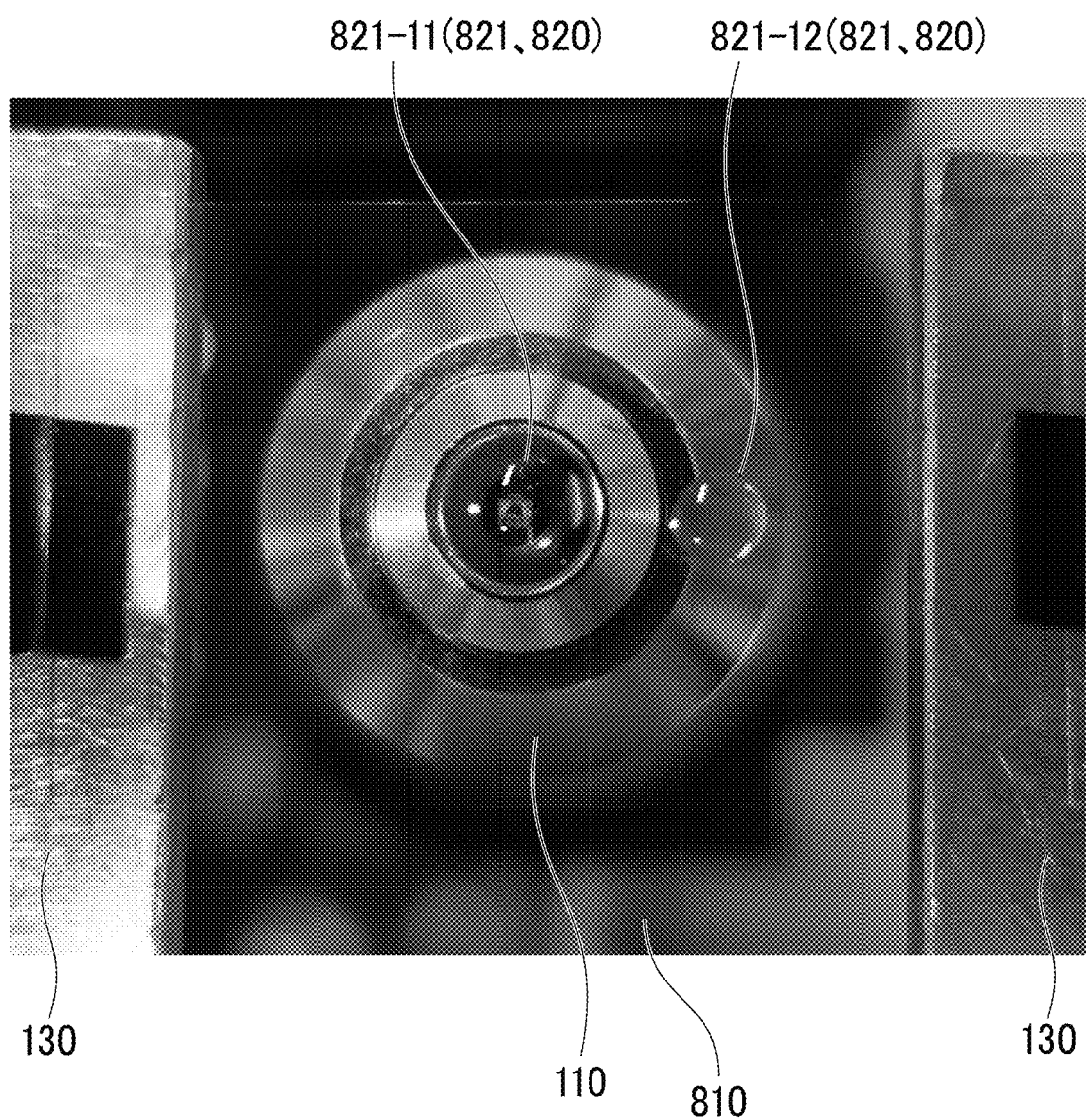
FIG. 3 is a diagram showing an example of a positional relationship between a laser light emitting portion of the shaping unit and a droplet according to the embodiment.

FIG. 3 is a diagram showing an example of a positional relationship between the laser light emitting portion of the shaping unit 110 and the droplet 820. FIG. 3 shows an example in which the laser light emitting portion of the shaping unit 110 is viewed from the upper side. In this example, the substrate 810 that is supported by the support stand 130 is positioned on the laser light emitting portion of the shaping unit 110, and two droplets 820 of different materials are placed on the substrate 810. The two droplets 820 are a droplet of a first material 821-11 and a droplet of a second material 821-12. In order to distinguish between the droplet of the material and the droplet of the cleaning liquid, the droplet of the material is designated by reference numeral 821.

Among the droplets of the materials 821, the droplet of the first material 821-11 is positioned on the laser light emitting portion of the shaping unit 110. By the shaping unit 110 to apply the shaping beam B11 to form the focal point in the droplet of the first material 821-11, a portion of the focal point of the droplet 821-11 changes into a solid from liquid.

By performing a first material process by using the droplet of the first material 821-11 and performing a second material process by using the droplet of the second material 821-12, the shaping system 1 can produce an object that includes both the first material and the second material. In order to perform such processes, the movement processing unit 120 moves the droplet 820.

The movement processing unit 120 moves the droplet 820. For example, the movement processing unit 120 moves the droplet 820 by generating a temperature gradient in the droplet 820 using an electromagnetic wave.

The shaping apparatus 100 including the movement processing unit 120 corresponds to an example of a droplet moving device.

The movement processing unit 120 applies the electromagnetic wave for heating (for example, an infrared laser light) so as to surround the periphery of the droplet 820 in the horizontal direction. As a result, the movement processing unit 120 generates the temperature gradient so that regarding the temperature of the droplet 820 in the horizontal direction, the temperature on a peripheral side becomes higher than the temperature on a center side. The peripheral side and the center side referred to here are the side closer to and the side farther from a boundary between the droplet 820 and the outside thereof, of the inside of the droplet 820.

The temperature gradient can prevent the droplet 820 from spreading in the horizontal direction when the droplet 820 is heated.

In the following, when explaining the positional relationship of the droplet 820 in the horizontal direction, the description that the droplet 820 is in the horizontal direction may be omitted. For example, the periphery of the droplet 820 in the horizontal direction is also simply referred to as the periphery of the droplet 820. The peripheral side of the droplet 820 in the horizontal direction is also simply referred to as the peripheral side of the droplet 820. The center side of the droplet 820 in the horizontal direction is also simply referred to as the center side of the droplet 820. The spread of the droplet 820 in the horizontal direction is also simply referred to as the spread of the droplet 820.

Further, the electromagnetic wave applied by the movement processing unit 120 is also referred to as a heating beam.

Figure 4:
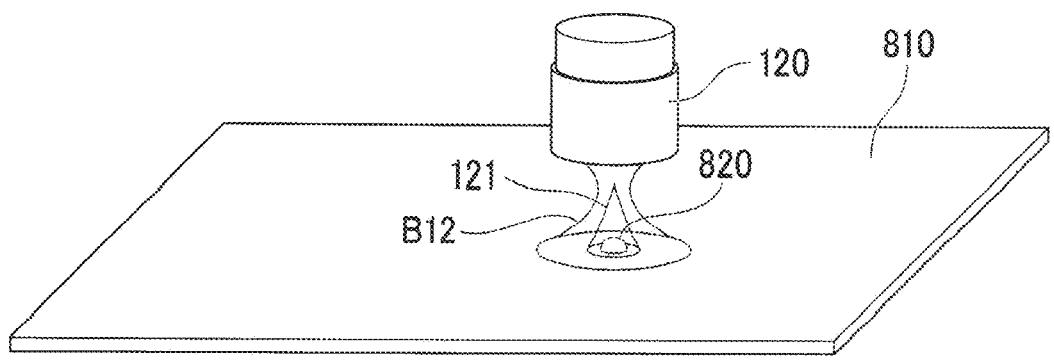
FIG. 4 is a diagram showing an example of a shape of a heating beam applied by the movement processing unit according to the embodiment.

FIG. 4 is a diagram showing an example of a shape of the heating beam applied by the movement processing unit 120. In the example in FIG. 4, the droplet 820 is positioned on the substrate 810, and the movement processing unit 120 applies the heating beam B12 toward the droplet 820.

However, the movement processing unit 120 does not directly irradiate the droplet 820 with the heating beam B12 but irradiates the periphery of the droplet 820. A cavity (a portion that is not irradiated with the heating beam B12) is formed inside the heating beam B12, and the droplet 820 is positioned in the portion of the cavity. The cavity of the heating beam B12 is formed by a mask 121 blocking part of the heating beam B12 that is applied by the movement processing unit 120.

Even when the movement processing unit 120 irradiates the periphery of the droplet 820 with the heating beam B12 as in the example in FIG. 4, it is described that the movement processing unit 120 irradiates the droplet 820 with the heating beam B12.

Figure 5:
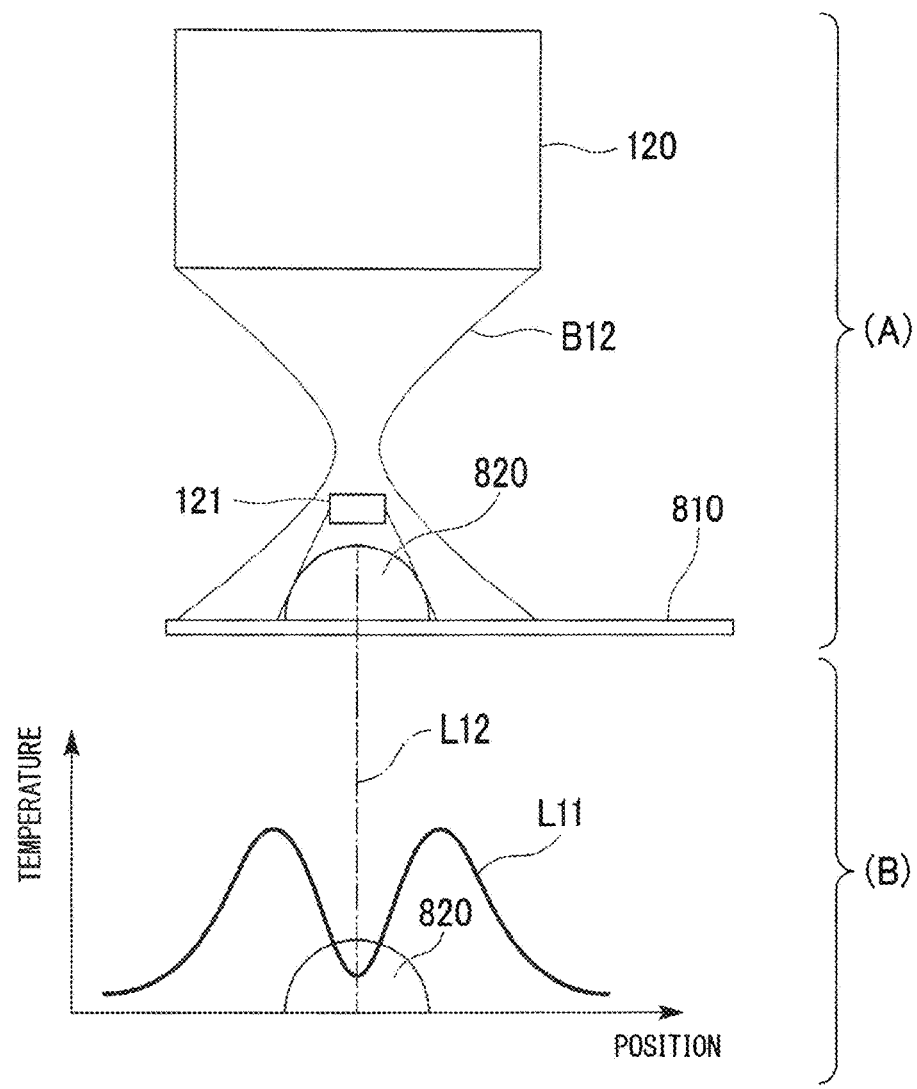
FIG. 5 is a first diagram showing an example of a temperature gradient generated by irradiation of the heating beam according to the embodiment.

FIG. 5 is a first diagram showing an example of the temperature gradient generated by irradiation of the heating beam B12. The upper side figure in FIG. 5 shows a cross-sectional view of the heating beam B12, which is applied by the movement processing unit 120, cut in the vertical direction along the center (optical axis) thereof. A line L12 indicates the center of the heating beam B12. The upper side figure in FIG. 5 is referred to as FIG. 5(A).

In the example in FIG. 5(A), the mask 121 is provided at the center of the heating beam B12 so that the cavity is formed inside (in the vicinity of the center) of the heating beam B12. The droplet 820 is positioned in the cavity.

The lower side figure in FIG. 5 shows an example of a temperature gradient generated at a position of the cross-section by the irradiation of the heating beam B12 shown on the upper side figure. The lower side figure in FIG. 5 is referred to as FIG. 5(B).

The horizontal axis of the graph in FIG. 5(B) indicates a position (a position in a cross-section in the horizontal direction). The vertical axis indicates the temperature. A line L11 indicates a temperature distribution of the substrate 810 and the droplet 820 in a cross-section. That is, the line L11 indicates the relationship between the position shown on the horizontal axis and the temperatures of the substrate 810 and the droplet 820.

Further, in FIG. 5(B), the position of the droplet 820 is shown by showing the droplet 820. As shown in FIG. 5(A), the movement processing unit 120 irradiates the periphery of the droplet 820 with the heating beam B12 so that the temperature gradient is generated in which the temperature of the droplet 820 on the peripheral side is higher than that on the center side as shown in the line L11.

Figure 6:
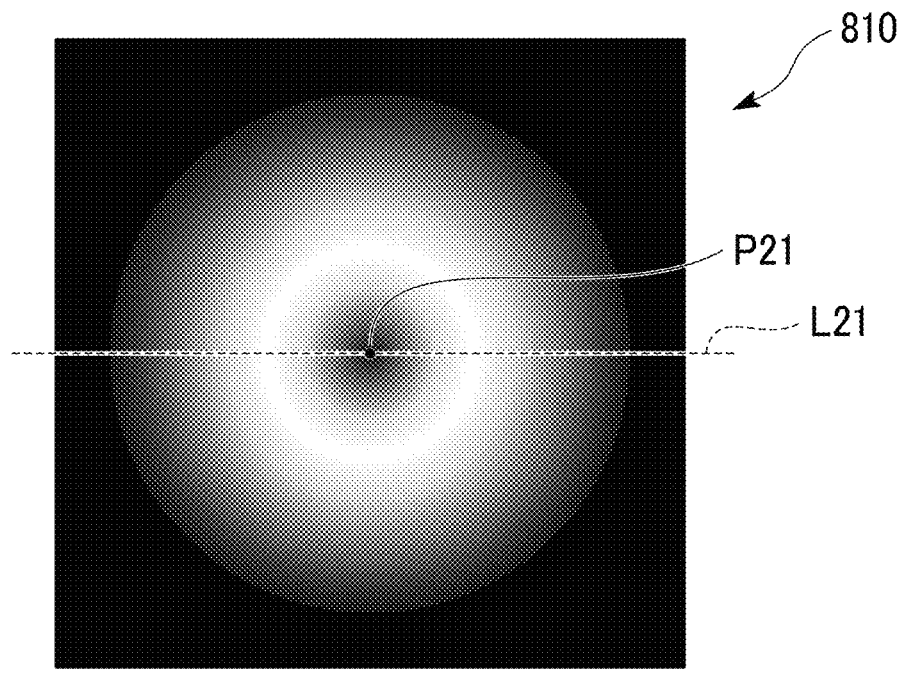
FIG. 6 is a second diagram showing an example of a temperature gradient generated by irradiation of the heating beam according to the embodiment.

FIG. 6 is a second diagram showing an example of the temperature gradient generated by irradiation of the heating beam B12. FIG. 6 shows an example of the temperature of the substrate 810 with a heat map when the irradiation of the heating beam B12 is performed in the example in FIG. 5. The brighter (white) indicates that the temperature is higher, and the darker (black) indicates that the temperature is lower.

A line L21 indicates the position of the cross-section in FIG. 5 on the heat map. A point P21 indicates the position of the center of the heating beam B12.

In the example in FIG. 6, the movement processing unit 120 applies the heating beam B12 as in the example in FIG. 4 so as to surround the periphery of the droplet 820 in a circular form (a doughnut shape). As a result, the heat map in FIG. 6 shows the temperature distribution obtained by developing the temperature distribution indicated by the line L11 in FIG. 5 on a plane. Specifically, in the heat map in FIG. 6, a concentric circle shaped temperature distribution centered on the point P21 (the center of the heating beam B12) is generated. As the distance from the point P21 increases, the temperature rises once, and the temperature becomes lower as the distance from the point P21 further increases beyond the peak.

The movement processing unit 120 moves the heating beam B12 while surrounding the periphery of the droplet 820 with the heating beam B12. As a result, the movement processing unit 120 moves the droplet 820 while preventing the droplet 820 from spreading. This point will be described with reference to FIGS. 7 to 9.

Figure 7:
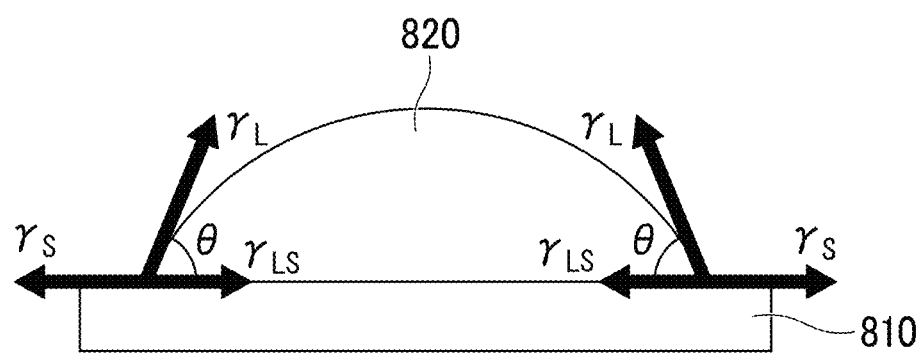
FIG. 7 is a diagram showing an example of a relationship of a force in the droplet when a temperature gradient is not generated.

FIG. 7 is a diagram showing an example of a relationship of the forces in the droplet 820 when the droplet 820 is in a normal temperature state where the movement processing unit 120 does not irradiate the droplet 820 with the heating beam B12. In the example in FIG. 7, $\gamma_L$ indicates the surface tension at the droplet 820. $\gamma_S$ indicates the surface tension of the solid (the surface tension on the substrate 810). $\gamma_{LS}$ indicates a solid liquid interfacial tension. $\theta$ indicates a contact angle of the droplet 820 with respect to the substrate 810.

In the case of FIG. 7, Young's equation is expressed as Equation (1).

$$\gamma_S = \gamma_L \cos\theta + \gamma_{LS} \qquad (1)$$

In FIG. 7, the forces in the droplet 820 are balanced, and the droplet 820 does not move.

Further, as in the examples in FIGS. 4 to 6, the movement processing unit 120 applies the heating beam B12 so as to surround the periphery of the droplet 820 to generate the temperature gradient, and even when the heating beam B12 is not moved, the forces in the droplet 820 are balanced and the droplet 820 does not move.

In this case, the temperature of the droplet 820 on the peripheral side rises higher than that on the center side due to the irradiation of the heating beam B12. Therefore, the surface tension of the droplet 820 on the center side becomes larger than the surface tension on the peripheral side, and a force acts on the droplet 820 in the direction of maintaining the shape of the droplet.

In contrast to this, by raising the entire temperature of the droplet 820 by the irradiation of the heating beam B12, the surface tension of the droplet 820 ($\gamma_L$ in FIG. 7) becomes smaller, the contact angle (angle θ) of the droplet 820 with respect to the substrate 810 becomes smaller, and the force acts in the direction in which the droplet 820 spreads.

When the force that the droplet 820 tries to spread due to the temperature rise of the droplet 820 and the force to maintain the shape of the droplet 820 due to the increase in the surface tension of the droplet 820 on the center side described above are balanced, the droplet 820 remains without spreading any further.

Figure 8:
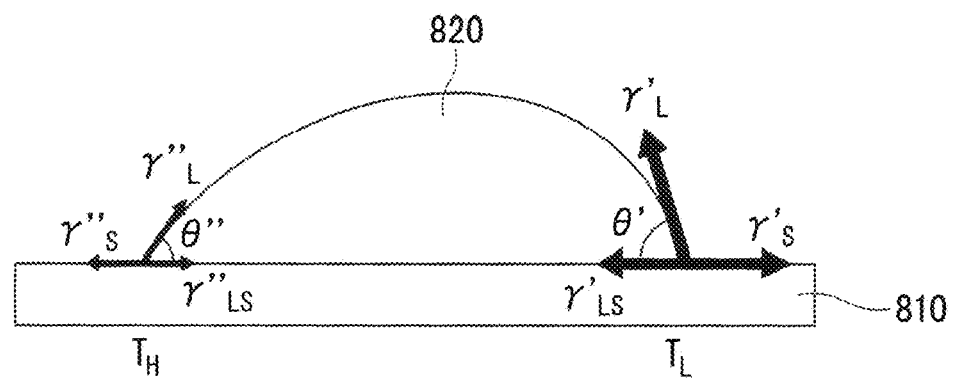
FIG. 8 is a diagram showing an example of a relationship of a force in the droplet when a temperature gradient is generated.

FIG. 8 shows an example of the relationship of forces in the droplet 820 when the movement processing unit 120 moves the heating beam B12 and a temperature difference occurs at the end part of the droplet 820. FIG. 8 shows an example in which the movement processing unit 120 moves the heating beam B12 on the right side when facing FIG. 8, and between the left and right end parts of the droplet 820, the left end part when facing FIG. 8 has a higher temperature than the right end part when facing FIG. 8.

The force on the side where the temperature is relatively low (on the right side when facing FIG. 8) is indicated by a variable name in which "'" is added to a variable name used in FIG. 7.

Specifically:

$\gamma'_L$ indicates the surface tension of the droplet 820.

$\gamma'_S$ indicates the surface tension of the solid (the surface tension on the substrate 810).

$\gamma'_{LS}$ indicates a solid liquid interfacial tension.

θ' indicates a contact angle of the droplet 820 with respect to the substrate 810.

On the other hand, the force on the side where the temperature is relatively high (on the left side when facing FIG. 8) is indicated by adding "''" to the variable name. Specifically:

$\gamma''_L$ indicates the surface tension of the droplet 820.

$\gamma''_S$ indicates the surface tension of the solid (the surface tension on the substrate 810).

$\gamma''_{LS}$ indicates a solid liquid interfacial tension.

θ'' indicates a contact angle of the droplet 820 with respect to the substrate 810.

In the example in FIG. 8, a temperature difference occurs between the temperature $T_H$ on the high temperature side and the temperature $T_L$ on the low temperature side ($T_H$>$T_L$). Due to the temperature difference, the contact angle and surface tension on each of the high temperature side and the low temperature side are changed from the case where the movement processing unit 120 does not move the heating beam B12.

On the low temperature side, the contact angle θ' is larger than when the heating beam B12 is not moved, and the horizontal component of the surface tension between the liquid and the gas γ'L is reduced. The force F' that acts on the interface on the low temperature side is expressed as in Equation (2) with the direction of the surface tension of the solid $\gamma'_S$ as positive.

$$F'=\gamma'_S-(\gamma'_{LS}+\gamma'_L \cos \theta')>0 \qquad (2)$$

wherein "F'>0", and a direction of the force F' is the same as the direction of the surface tension of the solid $\gamma'_S$ and is the right direction when facing FIG. 8 (a direction from the end part on the high temperature side to the end part on the low temperature side of the droplet 820).

On the other hand, on the high temperature side, the contact angle θ'' is smaller than when the heating beam B12 is not moved, and the horizontal component of the surface tension between the liquid and the gas $\gamma''_L$ is increased. The force F'' that acts on the interface on the high temperature side is expressed as in Equation (3) with the direction of the surface tension of the solid $\gamma''_{LS}$ as positive.

$$F''=-\gamma''_S+(\gamma''_{LS}+\gamma''_L \cos \theta'')>0 \qquad (3)$$

wherein "F''>0", and a direction of the force F'' is opposite to the direction of the surface tension of the solid $\gamma''_S$ and is the right direction when facing FIG. 8. (The direction of the force F'' is the same as the direction of the surface tension of the solid $\gamma'_{LS}$ and is the right direction when facing FIG. 8).

Figure 9:
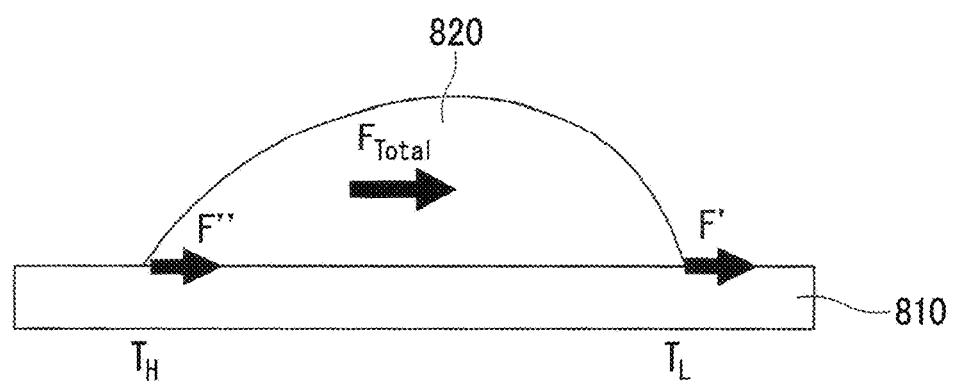
FIG. 9 is a diagram showing an example of a direction of the force generated in the droplet in the embodiment.

FIG. 9 shows an example of a direction of the force generated in the droplet. As described above, both the direction of the force F' and the direction of the force F'' are the right directions (a direction from the end part on the high temperature side to the end part on the low temperature side of the droplet 820) when facing FIG. 9. A force $F_{Total}$, which is a combination of the force F' and the force F'', is expressed as in Equation (4).

$$F_{Total}=F'+F'' \qquad (4)$$

Since both the direction of the force F' and the direction of the force F'' are the right directions when facing FIG. 9, the direction of the force $F_{Total}$ is also the right direction when facing FIG. 9. The droplet 820 is moved to the right direction when facing FIG. 9 (a direction in which the movement processing unit 120 moves the heating beam B12) using the force $F_{Total}$ as a driving force. Specifically, the droplet 820 moves so as to continue to be positioned in the cavity inside the heating beam B12 in response to the movement of the heating beam B12.

Regarding the shape of the mask 121 for generating the cavity inside the heating beam B12, the experimental results have shown that it is preferable that the conical shape is better than the planar shape, and the mask 121 having a conical shape is placed relatively close to the droplet 820 for increasing the temperature gradient of the droplet 820.

Figure 10:
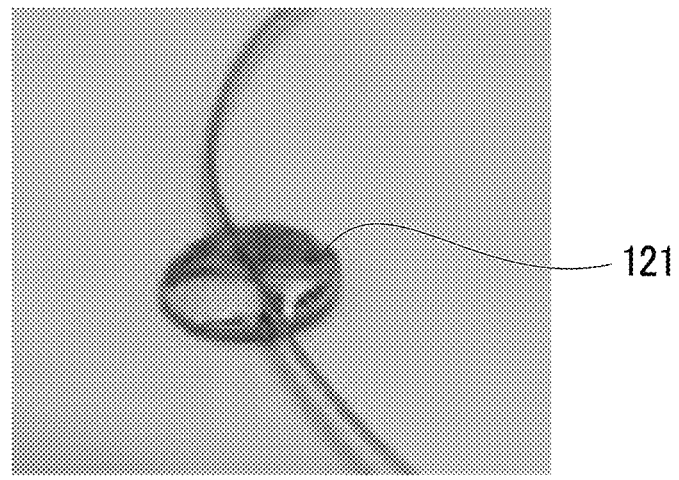
FIG. 10 is a diagram showing a first example of a shape of a mask according to the embodiment.

FIG. 10 is a diagram showing a first example of the shape of the mask 121. FIG. 10 shows an example of the mask 121 having a planar shape. The mask 121 having a planar shape is disposed between the movement processing unit 120 and the droplet 820 in a horizontal manner.

Figure 11:
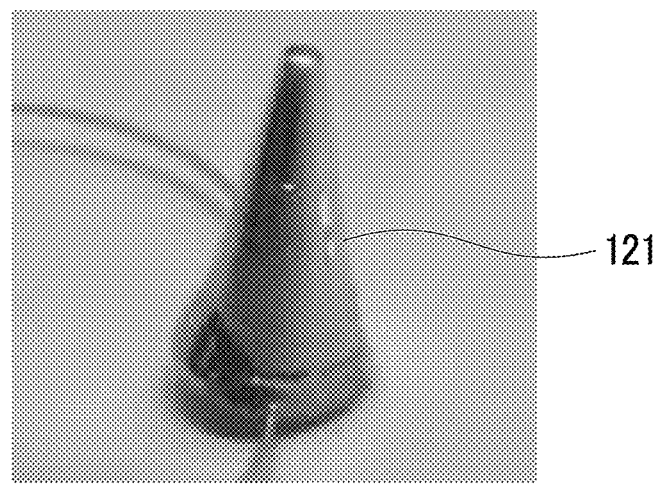
FIG. 11 is a diagram showing a second example of a shape of the mask according to the embodiment.

FIG. 11 is a diagram showing a second example of the shape of the mask 121. FIG. 11 shows an example of the mask 121 having a conical shape. The mask 121 having a conical shape is disposed between the movement processing unit 120 and the droplet 820 with the apex of the cone on the upper side and the bottom surface on the lower side.

Figure 12:
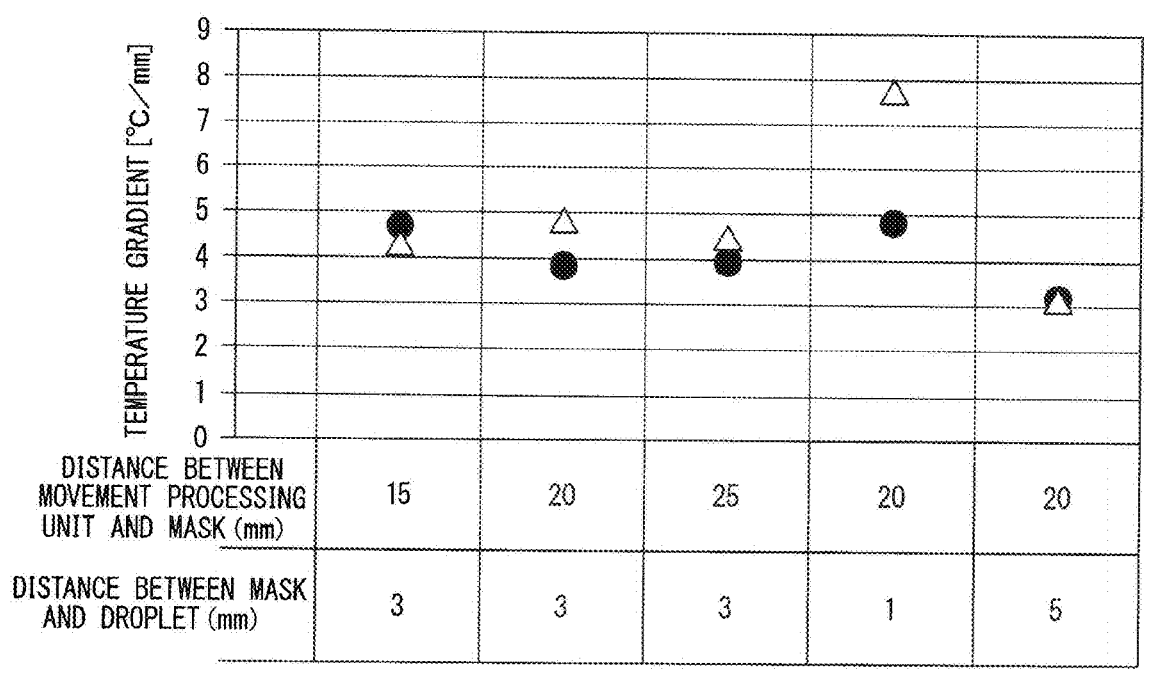
FIG. 12 is a diagram showing an example of a relationship between the shape and a disposition of the mask and the generated temperature gradient according to the embodiment.

FIG. 12 is a diagram showing an example of a relationship between the shape and disposition of the mask 121 and the generated temperature gradient. FIG. 12 shows each of the five dispositions of (a distance between the movement processing unit 120 and the mask 121, a distance between the mask 121 and the droplet 820)=(15, 3), (20, 3), (25, 3), (20, 1), (20, 5), and the experimental results (measurement results) of the temperature gradients generated in each of the cases where the shape of the mask 121 is a planar shape and where the mask 121 is a conical shape. The distance between the movement processing unit 120 and the mask 121 referred to here is the distance between an irradiation port of the heating beam B12 of the movement processing unit 120 and the mask 121.

As the temperature gradient, as shown by the line L11 in FIG. 5, the temperature at the center of the heating beam B12 shows a relatively low temperature distribution, and the temperature gradient between a point where the temperature becomes maximum and a point where the temperature becomes minimum at the center of the heating beam B12 is shown. The temperature gradient when the shape of the mask 121 is a planar shape is indicated by a circle, and the temperature gradient when the shape of the mask 121 is a conical shape is indicated by a triangle.

When the shape of the mask 121 is a conical shape, the position of the bottom surface of the cone is used as the position of the mask 121.

Referring to FIG. 12, when the mask 121 is disposed near the droplet 820 such that the shape of the mask 121 is set to a conical shape, the distance between the movement processing unit 120 and the mask 121 is set to 20 mm, and the distance between the mask 121 and the droplet 820 is set to 1 mm, the temperature gradient becomes the largest at 8° C./mm.

However, the method in which the movement processing unit 120 applies the heating beam B12 so as to surrounds the droplet 820, is not limited to the method of providing the mask 121. For example, the irradiation port of the heating beam B12 in the movement processing unit 120 may be formed in a circular form, and the irradiation may be performed with the heating beam B12 having a cavity at the center.

Further, the electromagnetic wave used by the movement processing unit 120 for heating the droplet 820 may be infrared laser light as described above, but anything other than changing a material in a liquid form into a solid may be used, and the electromagnetic wave is not limited to an electromagnetic wave having a specific frequency and an electromagnetic wave with a specific type. Further, the electromagnetic wave used by the movement processing unit 120 for heating the droplet 820 is not limited to the laser.

Further, the method in which the movement processing unit 120 heats the droplet 820 is not limited to the method of irradiation with the electromagnetic wave. As a method for heating the droplet 820, various methods can be used in which the movement processing unit 120 can generate the temperature gradient where the temperature of the droplet 820 on the peripheral side is higher than that on the center side and can move the heating position. For example, a movable circular form heater may be provided on the substrate 810.

Figure 13:
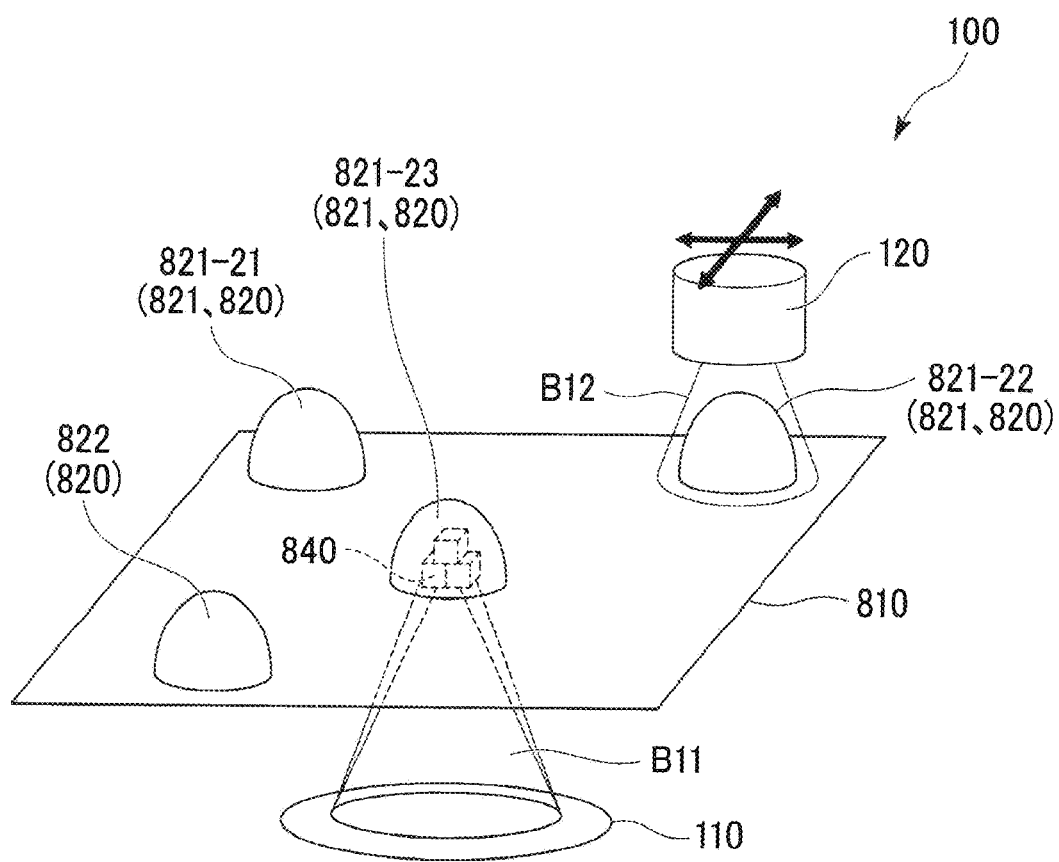
FIG. 13 is a diagram showing an example of a disposition of the droplet according to the embodiment.

FIG. 13 shows an example of a disposition of the droplet 820. FIG. 13 shows an example when the substrate 810 is viewed from diagonally above. In this example, a droplet of a third material 821-21, a droplet of a fourth material 821-22, a droplet of a fifth material 821-23, and a droplet of the cleaning liquid are positioned on the substrate 810. In order to distinguish between the droplet of the material and the droplet of the cleaning liquid, the droplet of the cleaning liquid is designated by reference numeral 822.

Each of the droplet of the third material 821-21, the droplet of the fourth material 821-22, and the droplet of the fifth material 821-23 is positioned in the shaping area and partially changed to a solid so that the shaping system 1 can produce an object that includes the third material, the fourth material, and the fifth material.

Further, each time the shaping system 1 partially changes each of the droplet of the third material 821-21, the droplet of the fourth material 821-22, and the droplet of the fifth material 821-23 into a solid, the shaping system 1 moves the droplet of the cleaning liquid 822 to the shaping area to clean the material in a solid form. As described above, as a method for cleaning the material in a solid form, a method of dropping the cleaning liquid from the dropping port 140 may be used instead of the method of moving the droplet of the cleaning liquid 822.

In the example in FIG. 13, the shaping unit 110 applies the shaping beam B11 from below the substrate 810.

On the other hand, the movement processing unit 120 applies the heating beam B12 from above the substrate 810.

In FIG. 13, both the shaping beam B11 and the heating beam B12 are shown for the sake of explanation. However, while applying the shaping beam B11 by the shaping unit 110, the movement processing unit 120 may not irradiate the droplet 820 with the heating beam B12. After the shaping unit 110 ends the process on the material that is positioned in the shaping area, the movement processing unit 120 irradiates the material that is positioned in the shaping area with the heating beam B12 to move the material as in a liquid form to the outside of the shaping area.

A pattern for disposing and moving the droplet 820 may be provided on the substrate 810.

Figure 14:
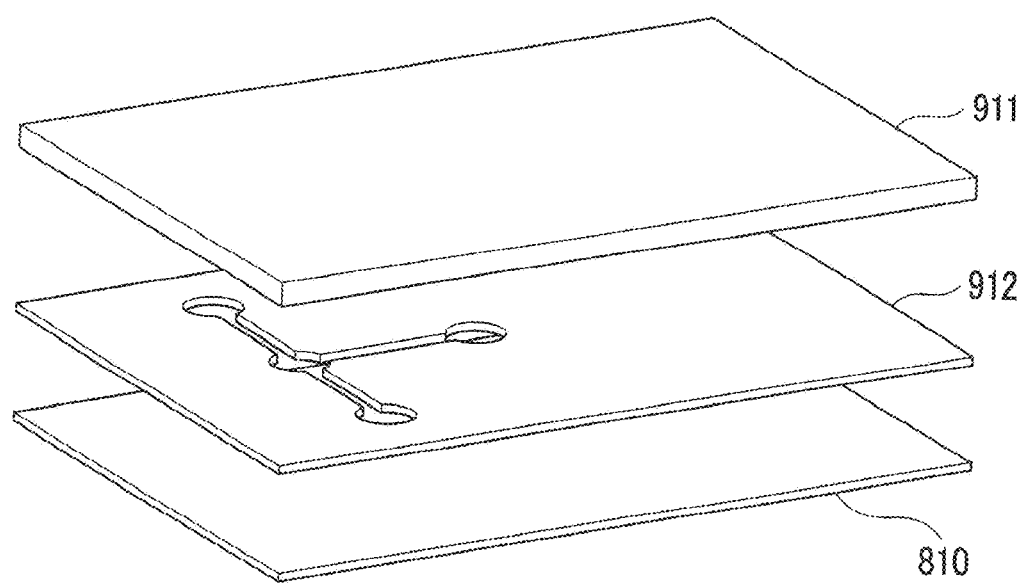
FIG. 14 is a diagram showing an example of a configuration for providing a pattern on a substrate according to the embodiment.

FIG. 14 is a diagram showing an example of a configuration for providing the pattern on the substrate 810. In the example in FIG. 14, a glass substrate is used as the substrate 810. The portion of the substrate 810 other than the portion where the wettability is desired to be improved is covered with the mask 912, and an excimer light (VUV light) is applied from an excimer lamp light source 911. The excimer light changes the atmospheric oxygen into active oxygen such as ozone and breaks the bonds on the glass surface. By the chemical reaction between the active oxygen and the surface of the glass substrate, a functional group having a high affinity with the resin such as "—OH" or "—COOH" is imparted so that the wettability is improved.

However, the method of providing the pattern on the substrate 810 is not limited to the method of irradiation with the excimer light. For example, the substrate 810 made of a material having a relatively low wettability may be used, and a coating having a relatively high hydrophilicity may be provided on a portion of the pattern. Alternatively, the substrate 810 made of a material having a relatively high wettability may be used, and a coating having a water-repellent may be provided on a portion other than the pattern.

Further, for example, by applying a pattern with a fluorine coat to the portion of the surface of the substrate 810 other than the portion through which the droplet 820 passes, a path of movement of the droplet 820 may be patterned. Since the droplet 820 is moved away from the fluorine coated portion, the droplet 820 can be moved along a specific path (a path that is not fluorine coated) by using the pattern with a fluorine coat. In this way, the movement processing unit 120 may move the droplet 820 on the surface on which the water-repellent material is partially disposed.

Figure 15:
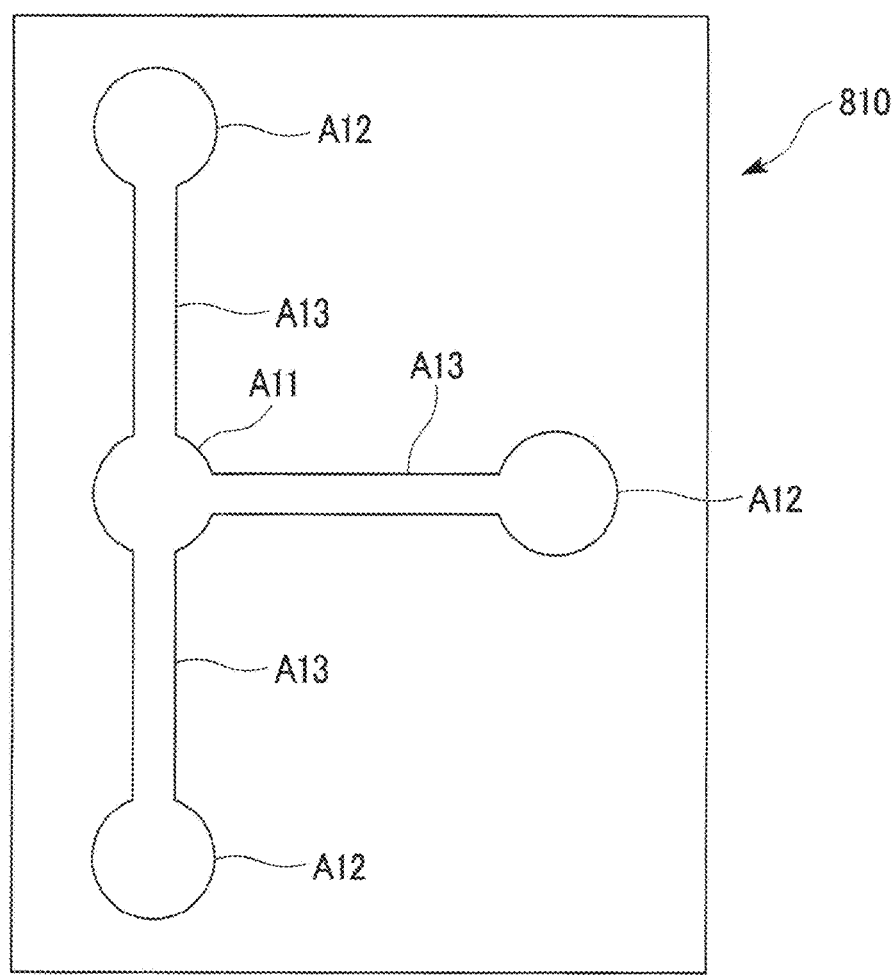
FIG. 15 is a diagram showing a first example of a pattern of the substrate according to the embodiment.

FIG. 15 is a diagram showing a first example of the pattern of the substrate 810. In the example in FIG. 15, the substrate 810 is provided with a pattern including an area A11, which is a shaping area, an area A12, which is a retreating area of the droplet 820 other than the droplet 820 being used for shaping, and an area A13 that connects the area A11 and the area A12. By making the wettability of these areas A11 to A13 higher than those of other portions, the movement processing unit 120 can move the droplet 820 relatively easily and can prevent or reduce the spread of the droplet 820.

The size of the pattern depends on the material of the droplet, but for example, the area A11 and the area A12 may be formed in a circular form having a diameter of substantially 4 mm to 5 mm. When the width of the area A13 is too thin, it becomes difficult to move the droplet 820, and when the width is too thick, the droplet 820 may flow back to the area A13 when the droplet 820 is moved to the area A11 or the area A12. The width of the area A13 may be, for example, substantially 2 mm. The length of the area A13 may be, for example, substantially 10 mm.

Figure 16:
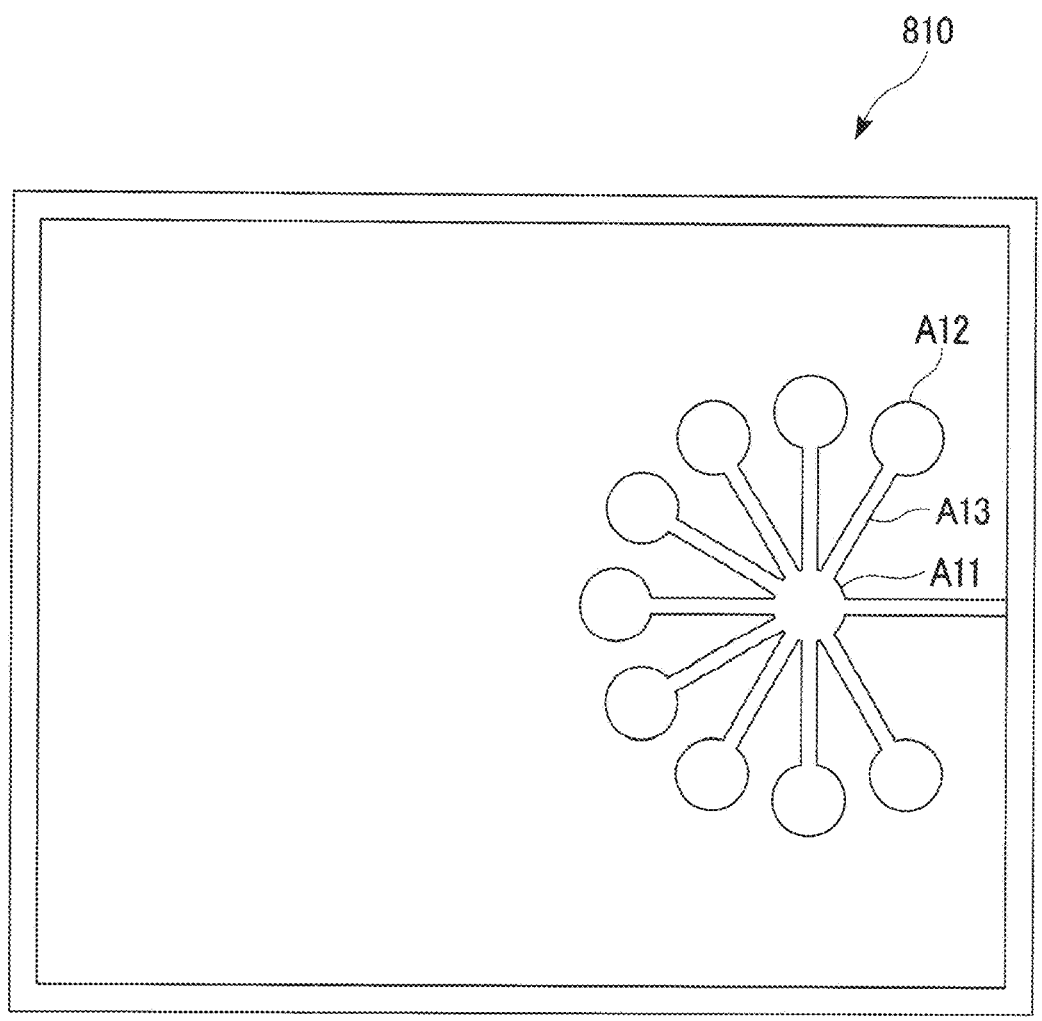
FIG. 16 is a diagram showing a second example of a pattern of the substrate according to the embodiment.

FIG. 16 is a diagram showing a second example of the pattern of the substrate 810. In the example in FIG. 15, three areas A12 are provided, whereas in the example in FIG. 16, nine areas A12 are provided. As described above, the number of areas A12 in the pattern of the substrate 810 is not limited to a specific number and may be any number. By providing a large number of areas A12, it is possible to cope with a large number of types of droplets 820 used for shaping.

Figure 17:
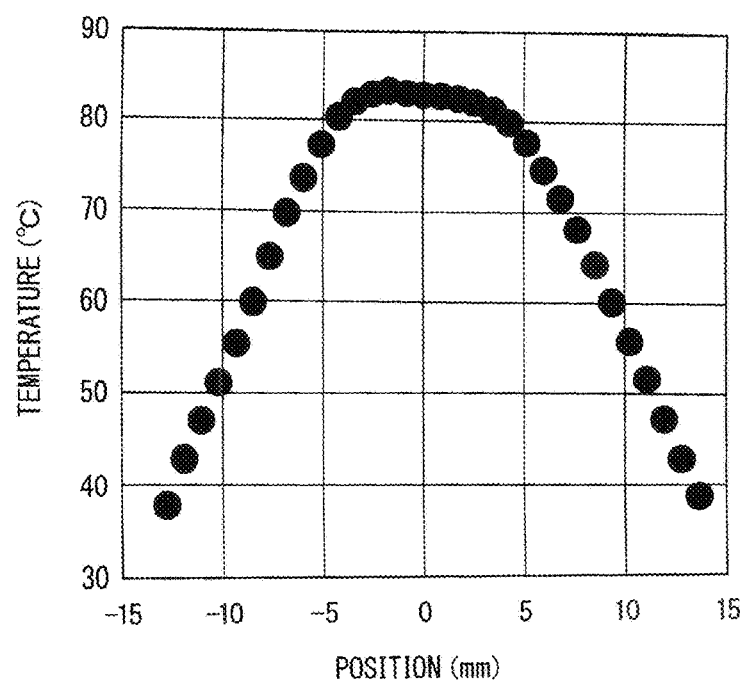
FIG. 17 is a diagram showing an example of temperature distribution on the substrate when the irradiation of an electromagnetic wave by the movement processing unit according to the embodiment is ended.

FIG. 17 is a diagram showing an example of temperature distribution on the substrate 810 when the irradiation of an electromagnetic wave by the movement processing unit 120 is ended. The horizontal axis of the graph in FIG. 17 indicates the position on the substrate 810. The vertical axis indicates the temperature. FIG. 17 shows the temperature distribution in a cross-section cut in the vertical direction along the center of the heating beam B12 when the movement processing unit 120 applies the heating beam B12, as in the case in FIG. 5. The position corresponding to the center of the heating beam B12 is used as a reference (0 mm), and the distance from the reference is shown in millimeters.

As shown in FIG. 17, when the movement processing unit 120 ends the irradiation of the heating beam B12 as it is after the movement of the droplet 820 is completed, the temperature gradient at which the temperature of the droplet 820 on the peripheral side is higher than that on the center side disappears. When in a stage where the temperature of the droplet 820 is high, the wettability of the droplet 820 with respect to the substrate 810 is relatively high. At this stage, when the temperature gradient at which the temperature of the droplet 820 on the peripheral side is higher than that on the center side disappears, the droplet 820 spreads.

Therefore, the movement processing unit 120 ends the irradiation of the heating beam B12 after lowering the temperature of the droplet 820.

Figure 18:
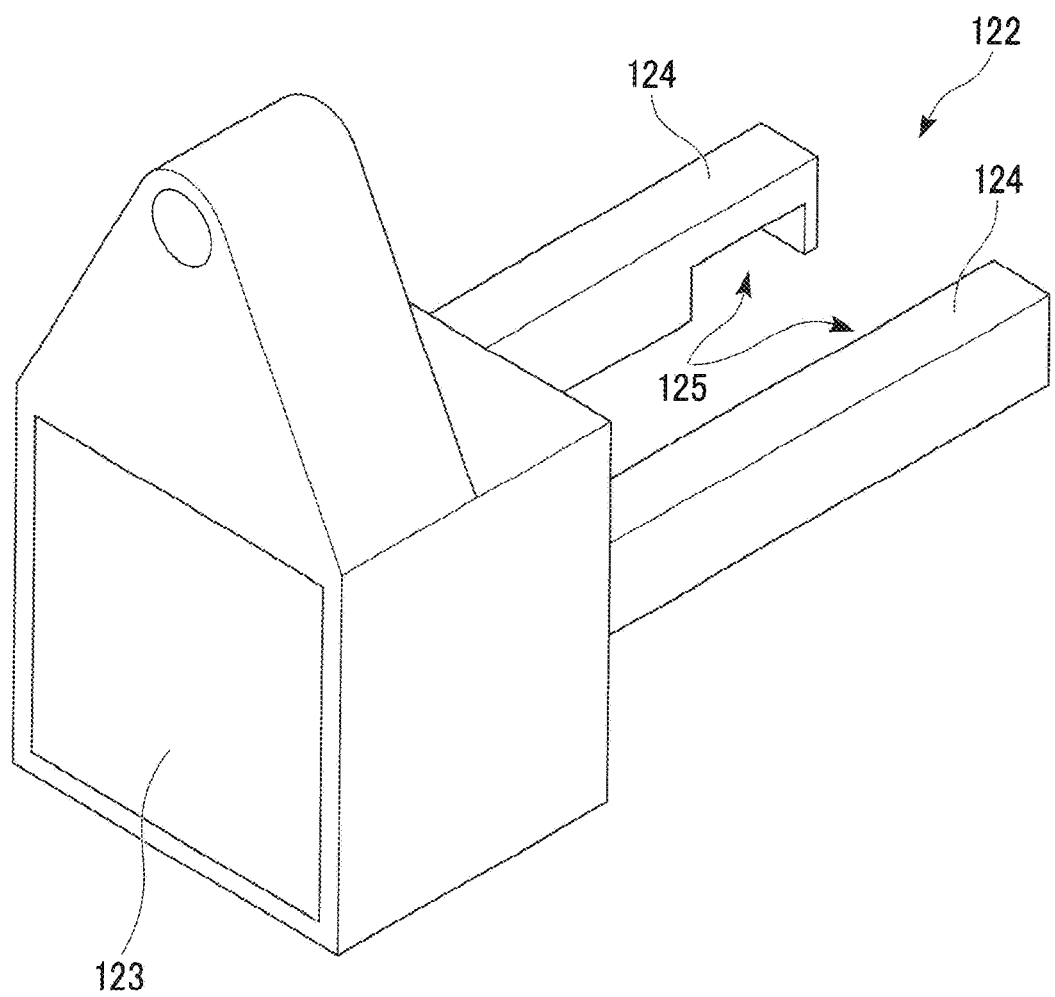
FIG. 18 is a diagram showing an example of a cooling device included in the movement processing unit according to the embodiment.

FIG. 18 is a diagram showing an example of a cooling device included in the movement processing unit 120. In the example in FIG. 18, the cooling device 122 includes a fan 123 and a duct 124, and the duct 124 is provided with an air blowing port 125.

The air blown by the fan 123 is blown diagonally downward from the air blowing port 125 via the duct 124.

The movement processing unit 120 cools the droplet 820 by disposing the cooling device 122 such that the air blown from the air blowing port 125 hits the droplet 820 and blowing the air to the cooling device 122. After the temperature of the droplet 820 drops to some extent (for example, 40° C. or less), for example, the movement processing unit 120 ends the irradiation of the heating beam B12 100 seconds after the start of cooling by the cooling device 122, the irradiation of the heating beam B12 is ended.

As a result, the temperature of the droplet 820 lowers while the temperature gradient at which the temperature of the droplet 820 on the peripheral side is higher than that on the center side is generated. As a result, it is possible to prevent or reduce the spread of the droplet 820, for example, the droplet 820 flows back on the pattern of the substrate 810.

The observation unit 150 captures an image of the object.

Figure 19:
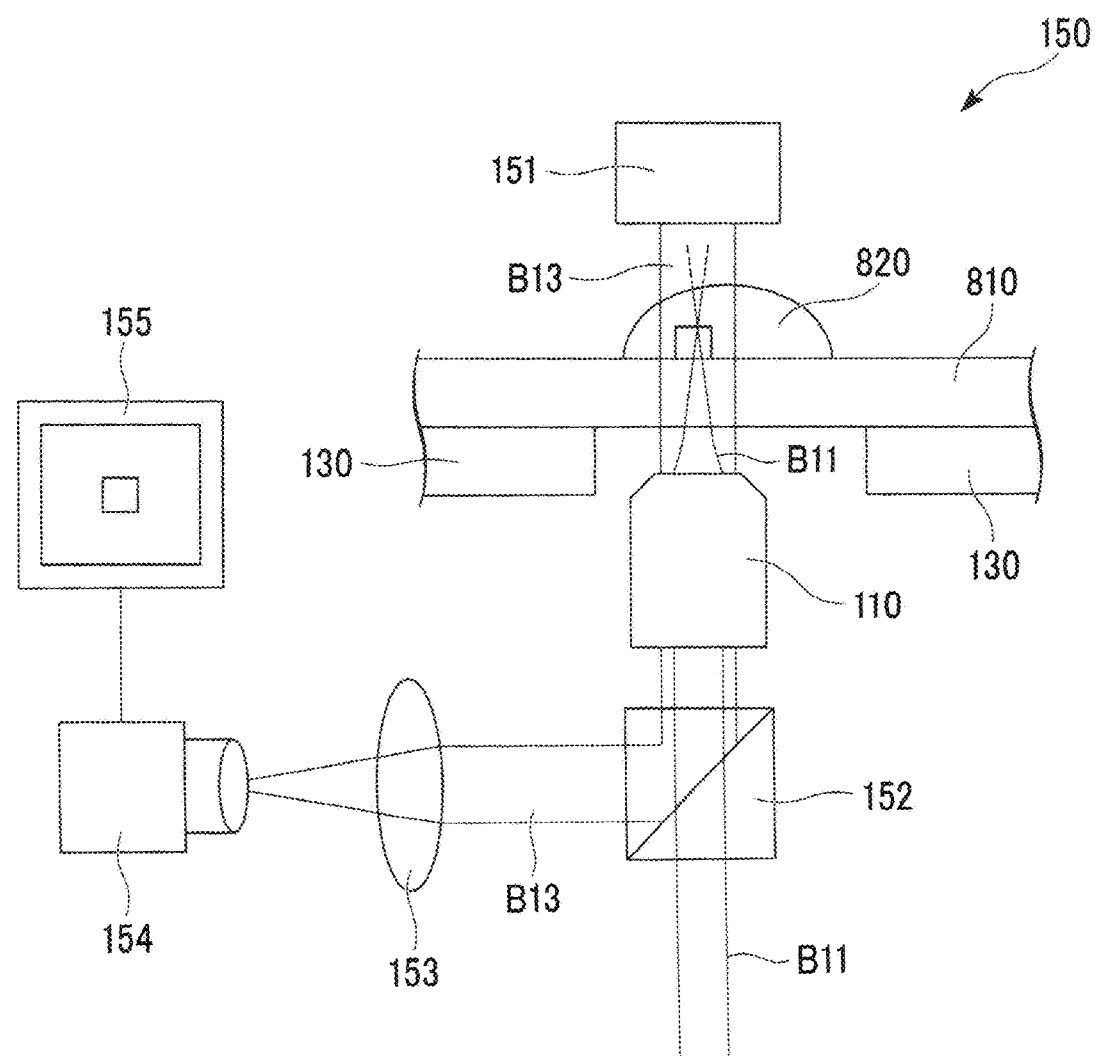
FIG. 19 is a diagram showing an example of a configuration of an observation unit according to the embodiment.

FIG. 19 shows an example of a configuration of the observation unit 150. In the example in FIG. 19, the observation unit 150 includes an observation light-light source 151, a beam splitter 152, an observation lens 153, a CCD camera 154, and a display device 155.

The observation light-light source 151 emits an illumination light B13 for imaging the object. The object referred to here may be an object in the process of being shaped. The object is irradiated with the illumination light B13. After part of the illumination light B13 is reflected or absorbed, the remaining light is incident on the beam splitter 152 via the laser light emitting portion of the shaping unit 110.

In the example in FIG. 19, the observation light-light source 151 is positioned above the shaping area, similar to the dropping port 140 in FIG. 2. While the observation light-light source 151 emits the illumination light B13, a disposition position of the dropping port 140 and a disposition position of the observation light-light source 151 may be exchanged. Alternatively, the dropping port 140 may be disposed such that the position of the dropping port 140 and the position of the observation light-light source 151 do not overlap with each other, for example, cleaning liquid or a material in a liquid form drops from diagonally above the shaping area toward the shaping area.

The beam splitter 152 includes a half mirror and reflects the illumination light B13. The beam splitter 152 receives not only the incident of the illumination light B13 but also the incident of the shaping beam B11. The beam splitter 152 allows the shaping beam B11 to pass through and advance toward the laser light emitting portion of the shaping unit 110. Due to the reflection of the illumination light B13, the beam splitter 152 redirects the illumination light B13, which passed through the same path as the shaping beam B11 in the opposite direction to the shaping beam B11, in a direction different from the direction of the path of the shaping beam B11.

The observation lens 153 refracts the illumination light B13 such that the illumination light B13 forms an image at a position of an image sensor of the CCD camera 154.

The CCD camera 154 generates image data of the object by receiving the illumination light B13 and performing the photoelectric conversion.

The display device 155 has a display screen such as a liquid crystal panel or an LED panel, for example, and displays an image of the object. Specifically, the display device 155 receives an input of the image data of the object produced by the CCD camera and displays the image indicated by the image data.

However, the configuration and the disposition of the observation unit 150 are not limited to those shown in FIG. 19. For example, the observation unit 150 may image the object from the upward direction and may image the object from the obliquely upward direction or the obliquely downward direction.

The control device 200 controls the shaping apparatus 100 to produce the object. For example, the control device 200 controls the timing, at which the shaping beam B11 is applied by the shaping unit 110, and the position of a focal point of the shaping beam B11. Further, the control device 200 controls the timing and the irradiation position at which the heating beam B12 is applied by the movement processing unit 120. Further, the control device 200 controls the timing at which the dropping port 140 drops the cleaning liquid.

Further, the control device 200 functions as a user interface of the shaping system 1.

The control device 200 is configured with a computer such as a personal computer or a workstation, for example.

The display unit 210 has a display screen such as a liquid crystal panel or an LED panel, for example, and displays various images. In particular, the display unit 210 presents information related to the shaping system 1 to a user.

The display unit 210 may be configured with the display device 155 or may be configured separately from the display device 155.

The operation input unit 220 includes an input device such as a keyboard and a mouse, for example, and receives a user operation. In particular, the operation input unit 220 receives the user operation for performing settings related to the shaping system 1.

The storage unit 280 stores various data. The storage unit 280 is configured with a storage device included in the control device 200.

The processing unit 290 controls each unit of the control device 200 to execute various processes. The processing unit 290 is configured such that a central processing unit (CPU) included in the control device 200 reads a program from the storage unit 280 and executes the program.

The control device 200 may automatically control the shaping apparatus 100 based on a program or the like set in advance. Alternatively, the user may input an instruction to the control device 200 online, and the control device 200 may control the shaping apparatus 100 according to the instruction of the user.

Next, the exchange of the droplet 820 positioned in the shaping area will be described with reference to FIGS. 20 to 29.

Figure 20:
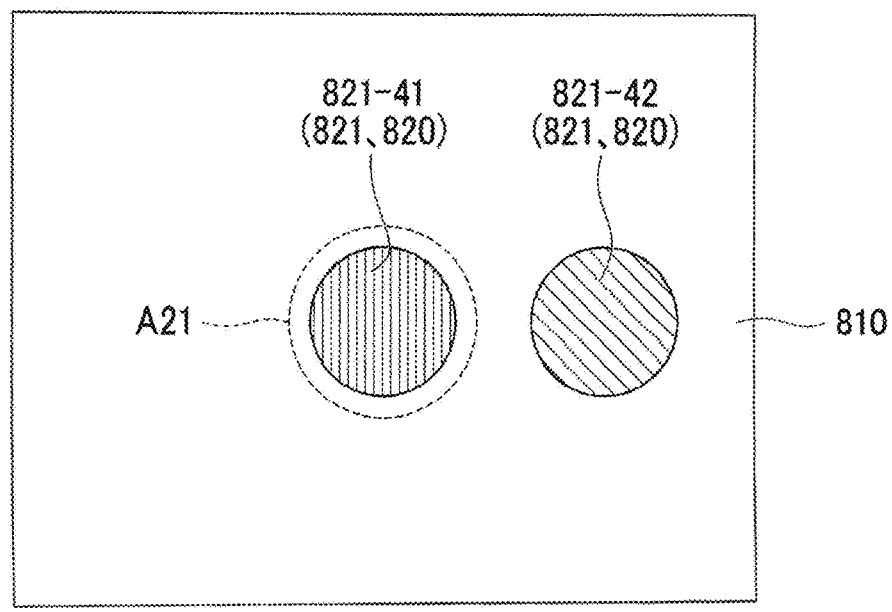
FIG. 20 is a diagram showing a first example of a disposition of a material according to the embodiment.

FIG. 20 shows a first example of the disposition of the material. FIG. 20 shows an example of the disposition of the material at the start of the process in which the shaping system 1 produces the object. In the example in FIG. 20, a droplet of a seventh material 821-41 and a droplet of an eighth material 821-42, which is different from the seventh material, are placed on the substrate 810. Further, the area A21 indicates the shaping area.

From the state shown in FIG. 20, the shaping unit 110 irradiates the droplet of the seventh material 821-41, which is positioned in the shaping area (area A21), with the shaping beam B11 to change part of the droplet of the seventh material 821-41 into a solid from the liquid.

Figure 21:
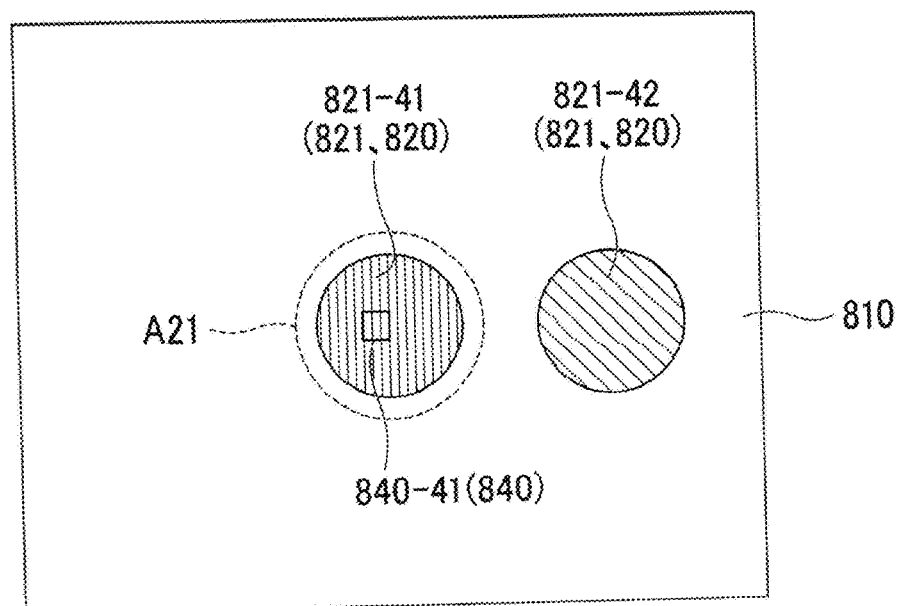
FIG. 21 is a diagram showing a second example of a disposition of the material according to the embodiment.

FIG. 21 shows a second example of the disposition of the material. In the example in FIG. 21, the positions of the substrate 810, the droplet of the seventh material 821-41, the droplet of the eighth material 821-42, and the area A21 are the same as in the case in FIG. 20. On the other hand, the example in FIG. 21 is different from the case in FIG. 20 in that a solid article 840 is included in the droplet of the seventh material 821-41.

The solid article 840 in FIG. 21 is a solid article of the seventh material 840-41 and corresponds to an example of the object in the process of being produced. Specifically, from the state shown in FIG. 20, the shaping unit 110 irradiates the droplet of the seventh material 821-41 with the shaping beam B11 to change part of the droplet of the seventh material 821-41 into a solid from the liquid. The generated solid is the solid article of the seventh material 840-41 in FIG. 21.

Figure 22:
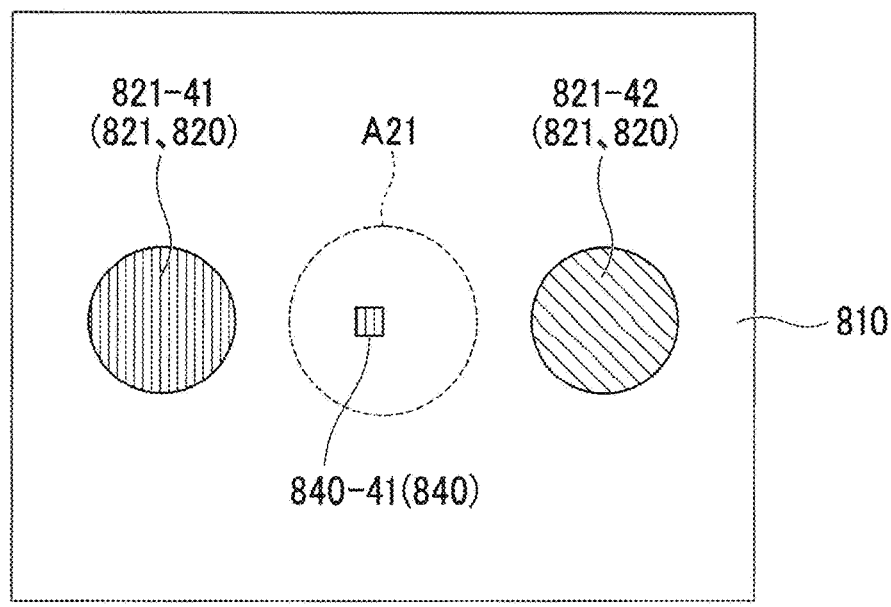
FIG. 22 is a diagram showing a third example of a disposition of the material according to the embodiment.

FIG. 22 shows a third example of the disposition of the material. In the example in FIG. 22, the positions of the substrate 810, the droplet of the eighth material 821-42, the solid article of the seventh material 840-41, and the area A21 are the same as in the case in FIG. 21. On the other hand, the example in FIG. 22 is different from the case in FIG. 21 in that the droplet of the seventh material 821-41 moves from the inside to the outside of the area A21.

FIG. 21 shows an example of a state in which a process of the droplet of the seventh material 821-41 by the shaping unit 110 is ended. The movement processing unit 120 moves the droplet of the seventh material 821-41, in which the usage thereof is ended, from the inside to the outside of the area A21 so that the state shown in FIG. 22 is obtained. The movement processing unit 120 moves the droplet but does not move the material in a solid form. In the example in FIG. 22, the droplet of the seventh material 821-41 moves from the inside to the outside of the area A21 while the solid article of the seventh material 840-41 remains in the area A21.

Figure 23:
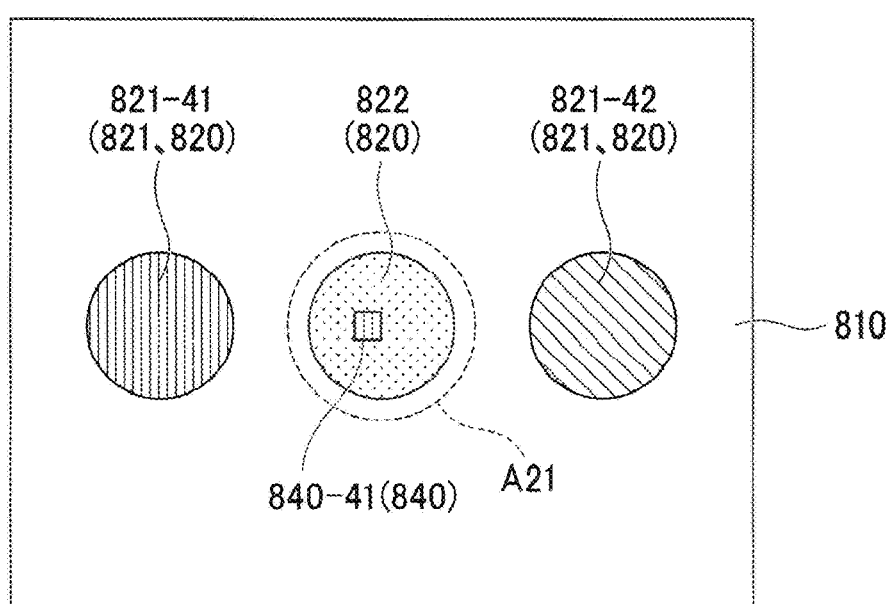
FIG. 23 is a diagram showing a fourth example of a disposition of the material according to the embodiment.

FIG. 23 shows a fourth example of the disposition of the material. In the example in FIG. 23, the positions of the substrate 810, the droplet of the seventh material 821-41, the droplet of the eighth material 821-42, the solid article of the seventh material 840-41, and the area A21 are the same as in the case in FIG. 22. On the other hand, FIG. 23 is different from the case in FIG. 22 in that there is the droplet of the cleaning liquid 822 in the area A21.

From the state shown in FIG. 22, the dropping port 140 drops the cleaning liquid into the shaping area (area A21) so that the state shown in FIG. 23 is obtained. In the state in FIG. 22, the droplet of the seventh material 821-41 is moved to the outside of the area A21, but the seventh material in a liquid form remains on the surface of the solid article of the seventh material 840-41. Therefore, the dropping port 140 drops the cleaning liquid into the area A21, and the solid article of the seventh material 840-41 is immersed in the cleaning liquid. As a result, the shaping system 1 cleans the surface of the solid article of the seventh material 840-41. Specifically, the shaping system 1 removes the seventh material in a liquid form adhering to the surface of the solid article of the seventh material 840-41.

Figure 24:
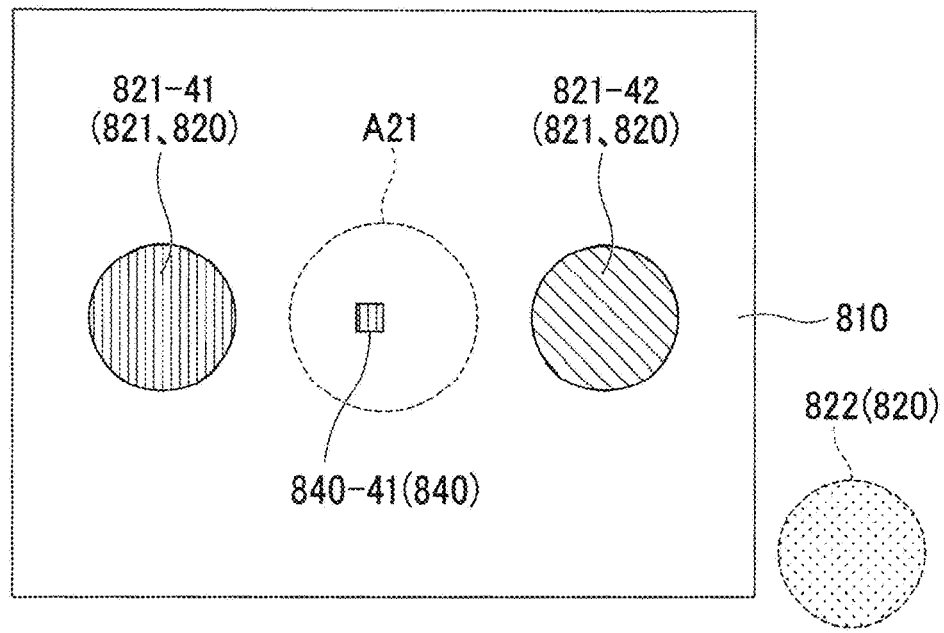
FIG. 24 is a diagram showing a fifth example of a disposition of the material according to the embodiment.

FIG. 24 shows a fifth example of the disposition of the material. In the example in FIG. 24, the positions of the substrate 810, the droplet of the seventh material 821-41, the droplet of the eighth material 821-42, the solid article of the seventh material 840-41, and the area A21 are the same as in the case in FIG. 23. On the other hand, FIG. 24 is different from the case in FIG. 23 in that the droplet of the cleaning liquid 822 is removed from the substrate 810.

From the state shown in FIG. 23, the movement processing unit 120 moves the droplet of the cleaning liquid 822 from the inside of the area A21 to the outside of the upper surface of the substrate 810 so that the droplet of the cleaning liquid 822 is removed from the substrate 810, and the state shown in FIG. 24 is obtained.

Figure 25:
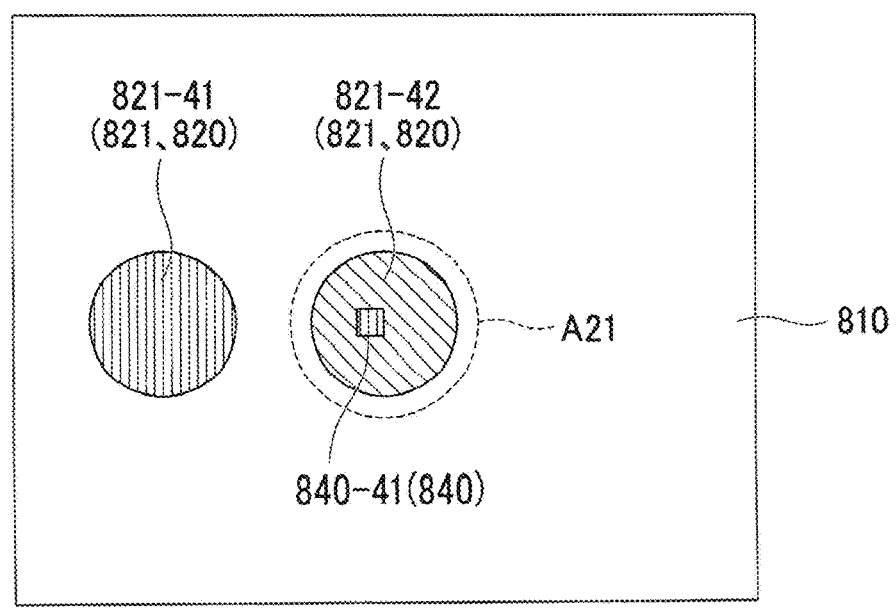
FIG. 25 is a diagram showing a sixth example of a disposition of the material according to the embodiment.

FIG. 25 shows a sixth example of the disposition of the material. In the example in FIG. 25, the positions of the substrate 810, the droplet of the seventh material 821-41, the solid article of the seventh material 840-41, and the area A21 are the same as in the case in FIG. 24. On the other hand, FIG. 25 is different from the case in FIG. 24 in that the droplet of the eighth material 821-42 moves from the outside to the inside of the area A21.

From the state shown in FIG. 24, the movement processing unit 120 moves the droplet of the eighth material 821-42 into the area A21 so that the state shown in FIG. 25 is obtained.

Figure 26:
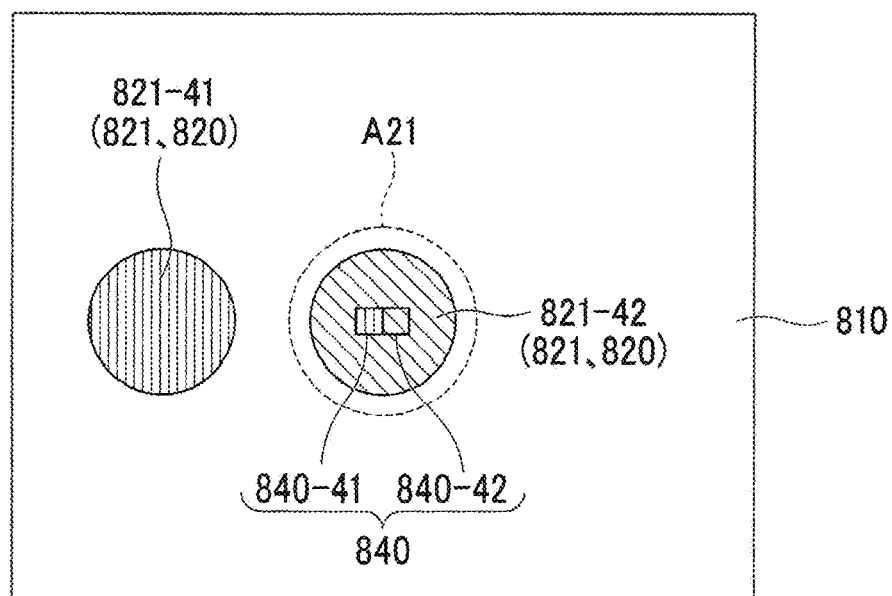
FIG. 26 is a diagram showing a seventh example of a disposition of the material according to the embodiment.

FIG. 26 shows a seventh example of the disposition of the material. In the example in FIG. 26, the positions of the substrate 810, the droplet of the seventh material 821-41, the droplet of the eighth material 821-42, the solid article of the seventh material 840-41, and the area A21 are the same as in the case in FIG. 25. On the other hand, FIG. 26 is different from the case in FIG. 25 in that the solid article of the eighth material 840-42 is included in the droplet of the eighth material 821-42 in addition to the solid article of the seventh material 840-41. In the example in FIG. 26, the solid article of the seventh material 840-41 and the solid article of the eighth material 840-42 constitute the solid article 840.

From the state shown in FIG. 25, the shaping unit 110 irradiates the droplet of the eighth material 821-42 with the shaping beam B11 to change part of the droplet of the eighth material 821-42 into a solid from the liquid. The generated solid is the solid article of the eighth material 840-42 in FIG. 26.

Figure 27:
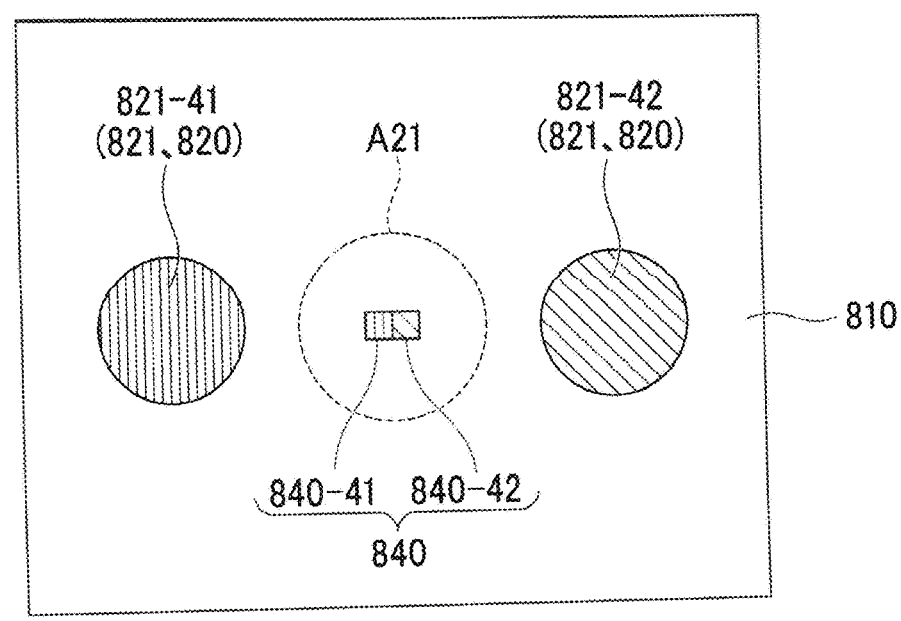
FIG. 27 is a diagram showing an eighth example of a disposition of the material according to the embodiment.

FIG. 27 shows an eighth example of the disposition of the material. In the example in FIG. 27, the positions of the substrate 810, the droplet of the seventh material 821-41, the solid article of the seventh material 840-41, the solid article of the eighth material 840-42, and the area A21 are the same as in the case in FIG. 26. On the other hand, the example in FIG. 27 is different from the case in FIG. 26 in that the droplet of the eighth material 821-42 moves from the inside to the outside of the area A21.

FIG. 26 shows an example of a state in which a process of the droplet of the eighth material 821-42 by the shaping unit 110 is ended. The movement processing unit 120 moves the droplet of the eighth material 821-42, in which the usage thereof is ended, from the inside to the outside of the area A21 so that the state shown in FIG. 27 is obtained. As described above, the movement processing unit 120 moves the droplet but does not move the material in a solid form. In the example in FIG. 27, the droplet of the eighth material 821-42 moves from the inside to the outside of the area A21 while the solid article of the eighth material 840-42 remains in the area A21.

Figure 28:
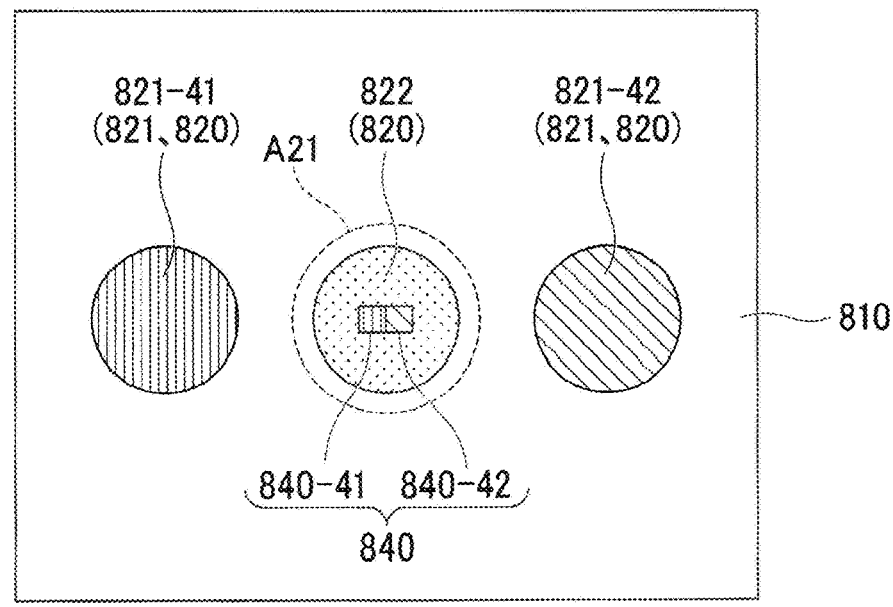
FIG. 28 is a diagram showing a ninth example of a disposition of the material according to the embodiment.

FIG. 28 shows a ninth example of the disposition of the material. In the example in FIG. 28, the positions of the substrate 810, the droplet of the seventh material 821-41, the droplet of the eighth material 821-42, the solid article of the seventh material 840-41, the solid article of the eighth material 840-42, and the area A21 are the same as in the case in FIG. 27. On the other hand, FIG. 28 is different from the case in FIG. 27 in that there is the droplet of the cleaning liquid 822 in the area A21.

From the state shown in FIG. 27, the dropping port 140 drops the cleaning liquid into the shaping area (area A21) so that the state shown in FIG. 28 is obtained. In the state in FIG. 27, the droplet of the eighth material 821-42 is moved to the outside of the area A21, but the eighth material in a liquid form remains on the surface of the solid article 840. Therefore, the dropping port 140 drops the cleaning liquid into the area A21 and the solid article 840 is immersed in the cleaning liquid. As a result, the shaping system 1 cleans the surface of the solid article 840. Specifically, the shaping system 1 removes the eighth material in a liquid form adhering to the surface of the solid article of the seventh material 840-41 and the solid article of the eighth material 840-42.

Figure 29:
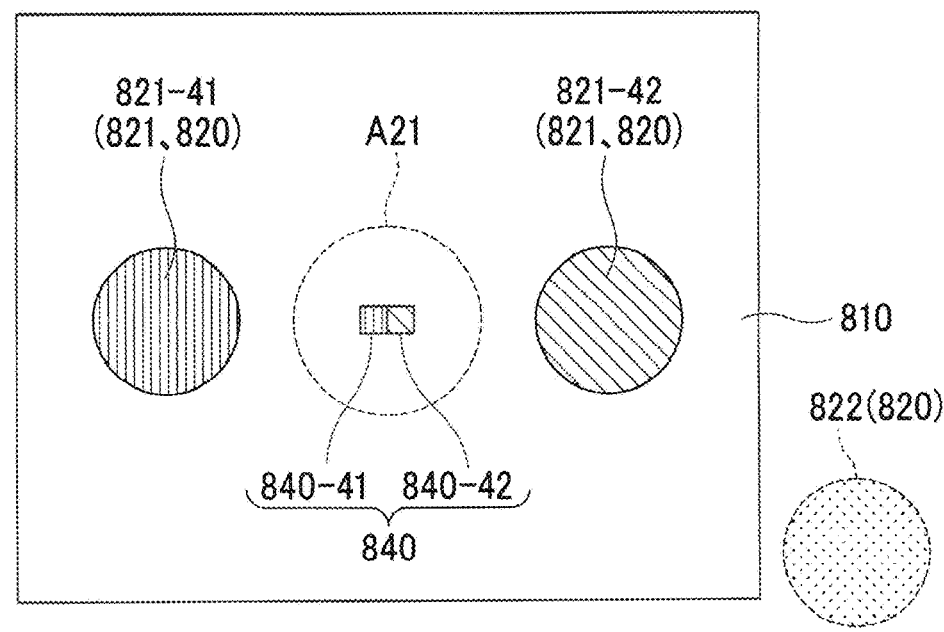
FIG. 29 is a diagram showing a tenth example of a disposition of the material according to the embodiment.

FIG. 29 shows a tenth example of the disposition of the material. In the example in FIG. 29, the positions of the substrate 810, the droplet of the seventh material 821-41, the droplet of the eighth material 821-42, the solid article of the seventh material 840-41, the solid article of the eighth material 840-42, and the area A21 are the same as in the case in FIG. 28. On the other hand, FIG. 29 is different from the case in FIG. 28 in that the droplet of the cleaning liquid 822 is removed from the substrate 810.

From the state shown in FIG. 28, the movement processing unit 120 moves the droplet of the cleaning liquid 822 from the inside of the area A21 to the outside of the upper surface of the substrate 810 so that the droplet of the cleaning liquid 822 is removed from the substrate 810, and the state shown in FIG. 29 is obtained.

The solid article 840 in FIG. 29 corresponds to an example of the completed object. As described above, in the examples in FIGS. 20 to 29, the shaping system 1 produces a multi material object by using a plurality of materials such as the seventh material and the eighth material.

Next, the operation of the shaping system 1 will be described with reference to FIG. 30.

Figure 30:
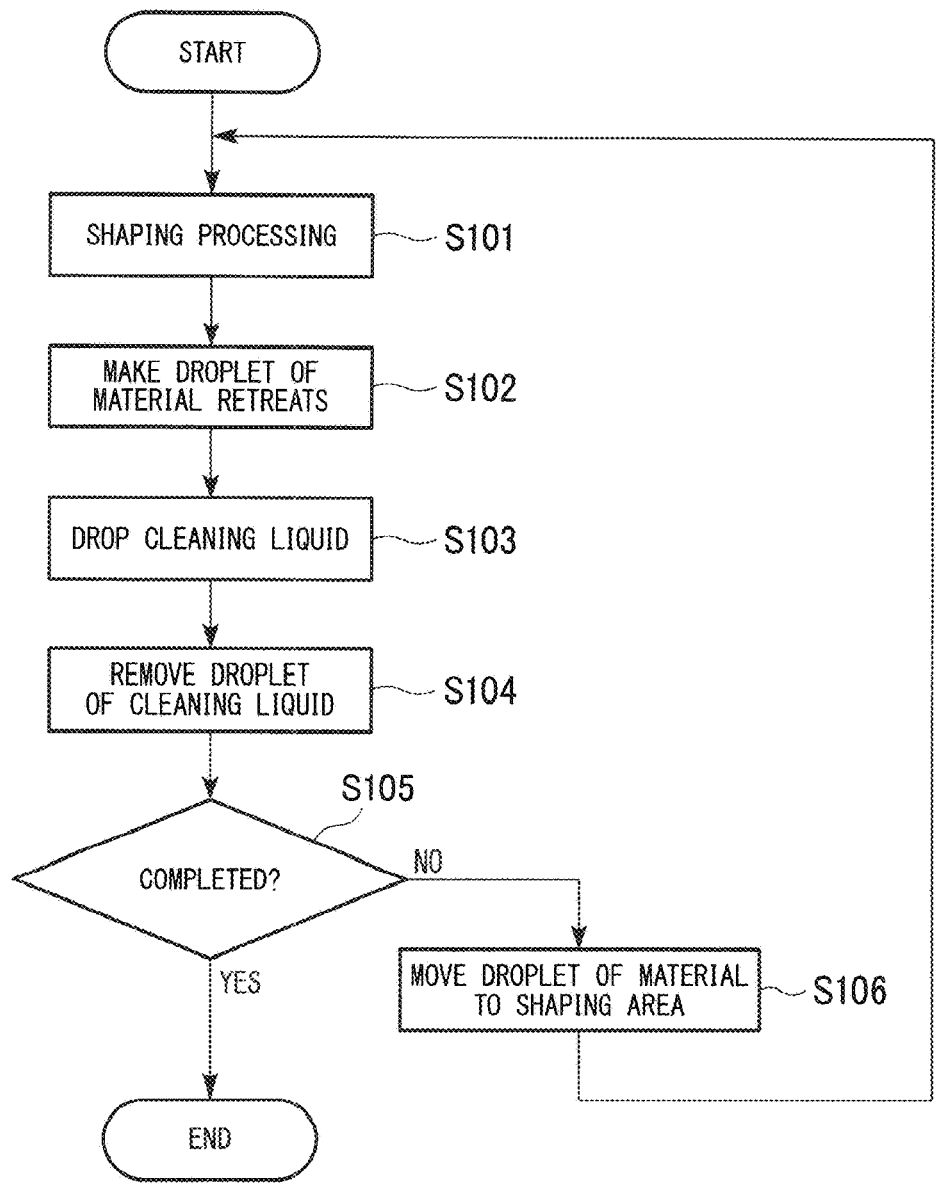
FIG. 30 is a flowchart showing an example of a processing procedure in which a control device according to the embodiment controls the shaping apparatus to produce an object.

FIG. 30 is a flowchart showing an example of a processing procedure in which the control device 200 controls the shaping apparatus 100 to produce an object.

In the process in FIG. 30, the control device 200 controls the shaping unit 110 to perform shaping processing (step S101). The shaping unit 110 irradiates the droplet of the material 821 in the shaping area with the shaping beam B11 under the control of the control device 200 to form the focal point of the shaping beam B11 in the droplet of the material 821. The material changes from liquid to solid at the position of the focal point.

Next, the control device 200 controls the movement processing unit 120 to make the droplet of the material 821 retreats to the outside of the shaping area (retreating area) (step S102). The movement processing unit 120 moves the droplet of the material 821 in the shaping area to the outside of the shaping area under the control of the control device 200.

Next, the control device 200 controls the dropping port 140 to drop the cleaning liquid (step S103). The dropping port 140 drops the cleaning liquid into the shaping area under the control of the control device 200. This dropping cleans the material in a solid form within the shaping area.

Next, the control device 200 controls the movement processing unit 120 to remove the droplet of the cleaning liquid 822 (step S104). The movement processing unit 120 moves the droplet of the cleaning liquid 822 in the shaping area to the outside of the substrate 810 under the control of the control device 200. By this movement, the movement processing unit 120 removes the droplet of the cleaning liquid 822 from the substrate 810.

Next, the control device 200 determines whether or not the object is completed (step S105). When it is determined that the object is completed (step S105: YES), the control device 200 ends the process in FIG. 30.

On the other hand, when it is determined that the object is not completed (step S105: NO), the control device 200 controls the movement processing unit 120 to move the droplet of the material 821 to be used for the next to the shaping area (step S106). The movement processing unit 120 moves the droplet of the material 821 to be used for the next from the outside of the shaping area to the inside of the shaping area under the control of the control device 200.

After step S106, the process returns to step S101.

Next, an example of a shaped article using the shaping apparatus 100 will be described with reference to FIGS. 31 and 32.

Figure 31:
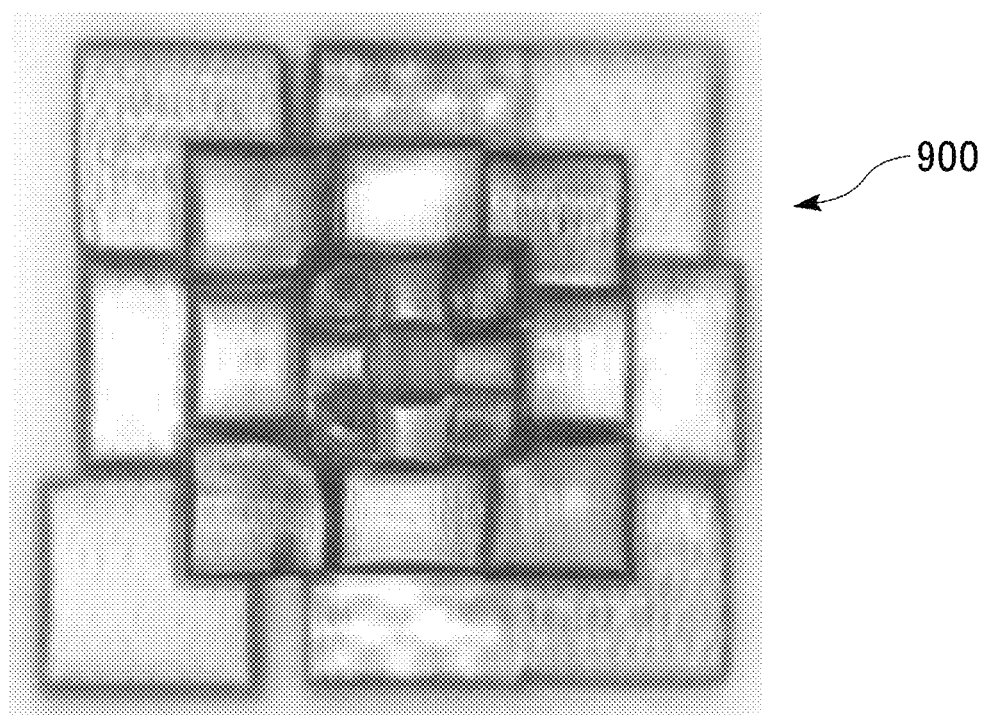
FIG. 31 is a diagram showing an example of a shaped article obtained by using the shaping apparatus according to the embodiment.

FIG. 31 is a diagram showing an example of a shaped article obtained by using the shaping apparatus 100. The shaped article 900 shown in FIG. 31 is configured with three types of resins, SR499+SR368, SR348, and SR499+SR348.

Figure 32:
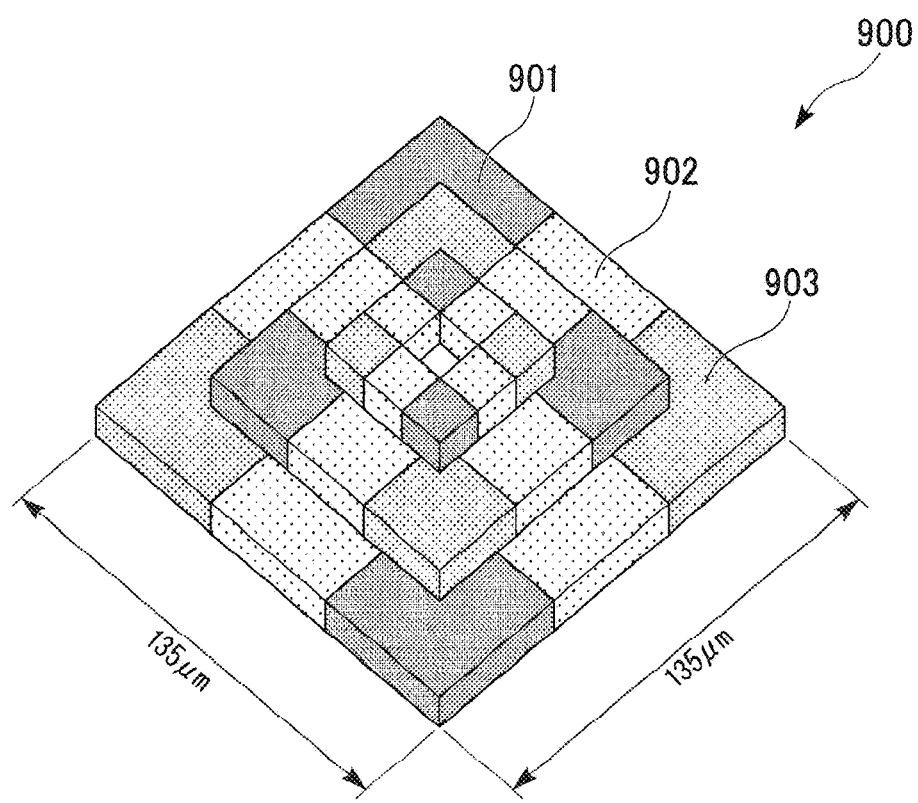
FIG. 32 is a diagram for explaining a configuration of a shaped article according to the embodiment.

FIG. 32 is a diagram for explaining the configuration of the shaped article 900. As shown in FIG. 32, the shaped article 900 has a three-layer pyramid shape with a side length of 135 microns (μm) and is configured to include three types of resins of SR499+SR368 (reference numeral 901), SR348 (reference numeral 902), and SR499+SR348 (reference numeral 903).

In this way, a fine article can be shaped by using the shaping apparatus 100. Further, among the resins configuring the shaped article 900, SR499+SR368 is an acrylate-based resin, SR348 is a methacrylate-based resin, and SR499+SR348 is an acrylate-based+methacrylate-based resin. Among these resins, copper plating can be performed only with SR499+SR368, which is an acrylate-based resin. Therefore, the copper plating can be selectively performed with respect to the shaped article 900.

As described above, the movement processing unit 120 heats the droplet 820 such that the temperature of the droplet 820 on the peripheral side in the horizontal direction becomes higher than that on the center side and moves the droplet 820 by moving a heating area. The shaping unit 110 performs shaping by partially changing the droplet 820 in the predetermined shaping area into a solid.

As described above, the movement processing unit 120 heats the droplet 820 so as to generate a temperature gradient in which the temperature of the droplet 820 on the peripheral side in the horizontal direction is higher than that on the center side and moves the heating area so that the droplet 820 moves without spreading as the heating area moves. According to the movement processing unit 120, since the droplet 820 can be moved by the amount of moving the heating area and the droplet 820 does not spread, the movement of the droplet 820 can be controlled with high accuracy.

Further, the movement processing unit 120 heats the droplet 820 by using the electromagnetic wave.

According to the movement processing unit 120, the droplet 820 can be heated by a relatively simple method of irradiating the periphery of the droplet 820 with the electromagnetic wave.

Further, the movement processing unit 120 heats the droplet 820 such that the temperature of the droplet 820 on the peripheral side in the horizontal direction is higher than that on the center side by blocking part of the electromagnetic waves with the mask 121 having a conical shape.

According to the movement processing unit 120, the droplet 820 can be heated by a relatively simple method of irradiating the droplet 820 with the electromagnetic waves and blocking part of the electromagnetic waves with the mask. Further, as described above, when the movement processing unit 120 uses the mask 121 having a conical shape, a larger temperature gradient can be generated in the droplet 820 as compared with the case where the mask 121 having a planar shape is used, for example.

Further, after moving the droplet 820, the movement processing unit 120 cools the moved droplet 820 and ends heating, which makes the temperature of the droplet 820 on the peripheral side in the horizontal direction higher than that on the center side.

According to the movement processing unit 120, it is possible to prevent the temperature gradient, in which the temperature of the droplet 820 on the peripheral side in the horizontal direction is higher than that on the center side, from disappearing while the temperature of the droplet 820 is high. As a result, according to the movement processing unit 120, it is possible to prevent or reduce the spread of the droplet 820.

Further, the movement processing unit 120 moves the droplet 820 on the surface where a patterning process that changes wettability is applied.

The movement processing unit 120 moves the droplet 820 to a part having a relatively high wettability on the surface (for example, on the substrate 810) so that the movement processing unit 120 can move the droplet 820 relatively easily. Further, since the wettability of the periphery of the portion, where the droplet 820 is positioned, is relatively low, the spread of the droplet 820 can be prevented or reduced.

The method of changing the position where the shaping beam B11 forms the focal point is not limited to the method of changing the position of the laser light emitting portion of the shaping unit 110. Instead of the laser light emitting portion of the shaping unit 110, the support stand 130 may be moved.

Alternatively, the angle at which the laser light emitting portion of the shaping unit 110 emits the shaping beam B11 may be changed.

Figure 33:
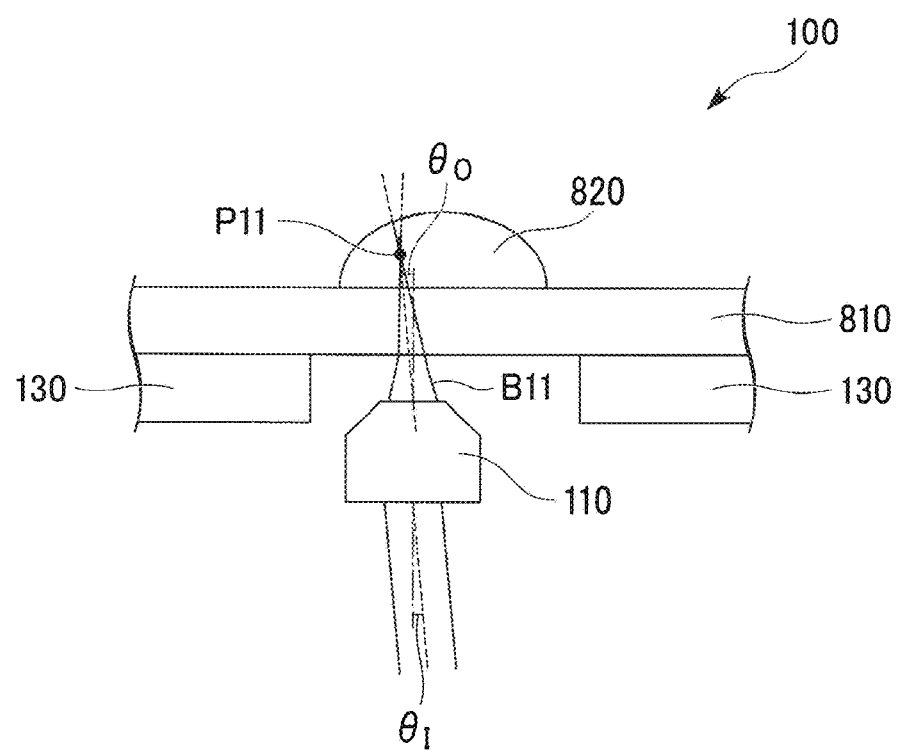
FIG. 33 is a diagram showing an example of a relationship between an angle of a shaping beam and a position of the focal point according to the embodiment.

FIG. 33 shows an example of the relationship between the angle of the shaping beam B11 and the position of the focal point.

In the example in FIG. 33, the laser light emitting portion of the shaping unit 110 functions as an objective lens, refracts the shaping beam incident from the side opposite to the droplet 820 (lower side in FIG. 33), and irradiates the side of the droplet 820 (upper side in FIG. 33) with the refracted shaping beam.

An incident angle of the shaping beam B11 to the laser light emitting portion of the shaping unit 110 is indicated by $\theta_I$. An emission angle of the shaping beam B11 from the laser light emitting portion of the shaping unit 110 is indicated by $\theta_O$. The emission angle $\theta_O$ changes according to the incident angle $\theta_I$. As the emission angle $\theta_O$ changes, the position of the point P11 where the shaping beam B11 forms the focal point also changes. Therefore, By the shaping unit 110 to change the incident angle $\theta_I$ of the shaping beam B11 to the laser light emitting portion, the position where the shaping beam B11 forms the focal point can be changed without having to change either the position of the laser light emitting portion or the position of the substrate 810.

As a method of changing the incident angle $\theta_I$, for example, a method of providing a mirror between the light source of the shaping beam B11 and the laser light emitting portion of the shaping unit 110, and changing the direction of the mirror can be used.

Second Embodiment

Hereinafter, a second embodiment will be described in detail with reference to the drawings.

Figure 34:
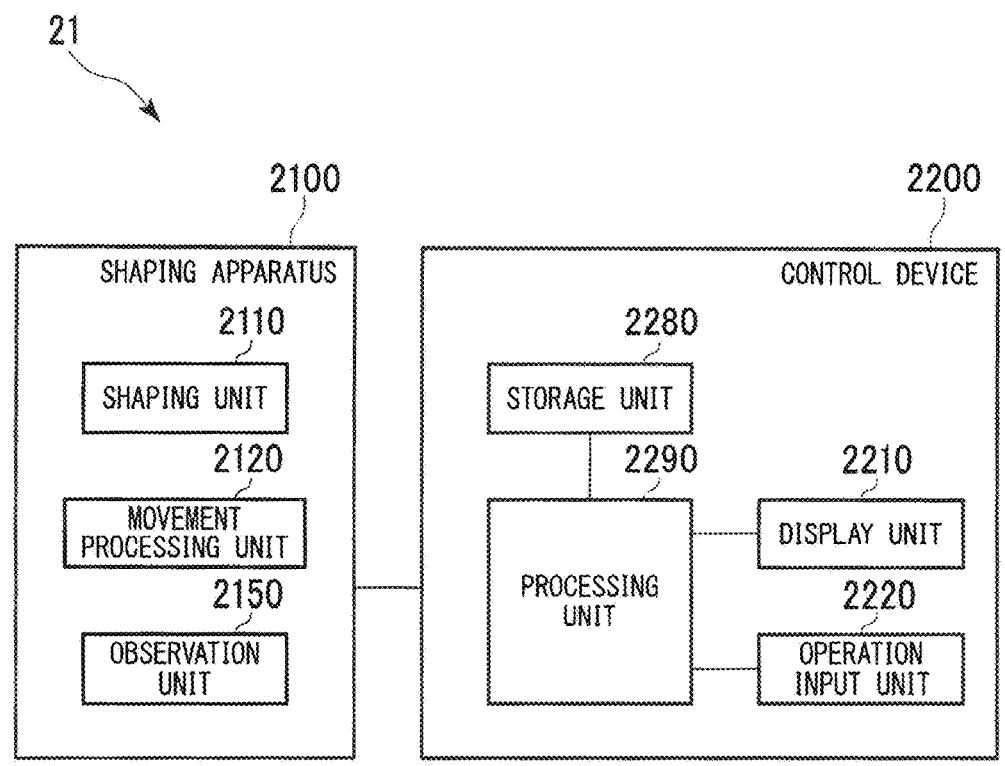
FIG. 34 is a diagram showing a shaping system according to one embodiment.

FIG. 34 is a diagram showing a shaping system 21 according to the second embodiment.

As shown in FIG. 34, the shaping system 21 according to the second embodiment includes a shaping apparatus 2100 and a control device 2200. The shaping apparatus 2100 includes a shaping unit 2110, a movement processing unit 2120, and an observation unit 2150.

The control device 2200 includes a display unit 2210, an operation input unit 2220, a storage unit 2280, and a processing unit 2290.

The shaping system 21 produces an object by partially changing a material in a liquid form into a solid.

The shaping apparatus 2100 is an apparatus that executes the production of an object. In particular, the shaping apparatus 2100 shapes the object by partially changing each droplet of one or more materials into a solid. The droplet referred to here is a mass of liquid that is collected by a surface tension. The shaping referred to here is to make something with a shape.

The shaping unit 2110 performs shaping by partially changing a droplet of a material in a shaping area into a solid. Specifically, by irradiating the droplet with laser light and forming a focal point of the laser light inside the droplet, the material in a liquid form is changed into a solid at a position of the focal point. The shaping area referred to here is an area in which the shaping unit 2110 can change the material into a solid. Specifically, the shaping area is an area in which the focal point of the laser light can be formed by the shaping unit 2110.

The laser light is also simply referred to as a laser.

In the following, a case where the material is a photocurable resin and the shaping unit 2110 cures the photocurable resin from liquid into a solid by using stereolithography will be described as an example.

However, the method in which the shaping unit 2110 performs shaping is not limited to a specific method as long as the droplet of the material can be partially changed into a solid. For example, the method in which the shaping unit 2110 performs shaping may be any of photopolymerization, photocrosslink, photoreduction, or a combination thereof.

Further, the laser light used for shaping by the shaping unit 2110 may be any laser light capable of curing the material and is not limited to the laser light having a specific wavelength. For example, the shaping unit 2110 may use ultraviolet laser light or may use blue laser light. Alternatively, the shaping unit 2110 may perform the shaping with a two-photon shaping method using two-photon absorption by using near-infrared femtosecond-pulse laser light.

Figure 35:
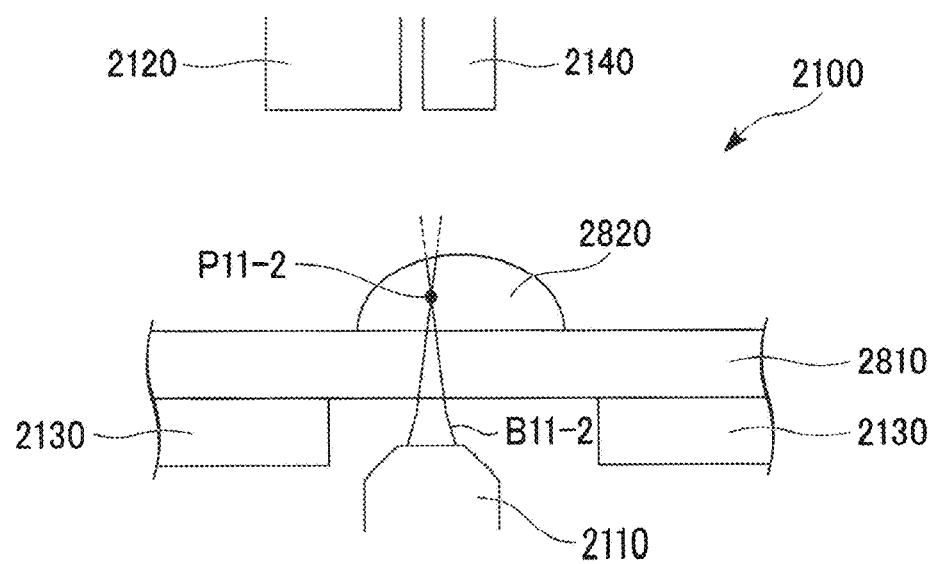
FIG. 35 is a diagram showing an example of a position where a focal point of laser light is formed by a shaping unit according to the one embodiment.

FIG. 35 is a diagram showing an example of a position where a focal point of the laser light is formed by the shaping unit 2110. In FIG. 35, a laser light emitting portion of each of the shaping unit 2110 and the movement processing unit 2120 is shown. Further, the shaping apparatus 2100 includes a support stand 2130 and a dropping port 2140 in addition to the movement processing unit 2120 and the shaping unit 2110. On the support stand 2130, a substrate 2810 with a glass plate that is used as a substrate for shaping an object, is placed. The support stand 2130 supports the substrate 2810.

Further, the droplet 2820 is placed on the substrate 2810. The laser light applied by the shaping unit 2110 is also referred to as a shaping beam B11-2.

FIG. 35 shows an example in which the laser light emitting portion of each of the shaping unit 2110 and the movement processing unit 2120, the support stand 2130, the substrate 2810, and the droplet 2820 are viewed from the side (horizontal direction).

The droplet 2820 shown in FIG. 35 is a droplet of the material. The droplet 2820 is placed on the substrate 2810.

The shaping unit 2110 irradiates the droplet 2820, through which the shaping beam B11-2 passes, with the shaping beam B11-2 from below the substrate 2810 so as to form a focal point in the droplet 2820. The shaping beam B11-2 that is applied by the shaping unit 2110 forms the focal point at a point P11-2. Thereby, the portion of the droplet 2820 at point P11-2 changes from liquid to a solid.

The laser light emitting portion of the shaping unit 2110 can be moved back and forth, and left and right in FIG. 35. Further, the shaping unit 2110 can move the position of the focal point of the shaping beam B11-2 up and down in FIG. 35. Therefore, the shaping unit 2110 can three-dimensionally move the position of the focal point of the shaping beam B11-2 up, down, left and right, and back and forth in FIG. 35.

By the shaping unit 2110 to move the position of the focal point of the shaping beam B11-2 along the shape of the object in the droplet 2820, the material can be processed into the shape of the object.

The focal point position of the shaping beam B11-2 may be changed by using a galvano mirror without moving the shaping unit 2110. Further, by moving the substrate 2810 without moving the shaping unit 2110, alternatively, by moving the lens that collects the laser light in the optical axis direction, the focal point position of the shaping beam B11-2 on the substrate 2810 may be changed.

Further, as shown in FIG. 35, the shaping unit 2110 applies the shaping beam B11-2 from the lower side of the substrate 2810 so that the shaping beam B11-2 reaches an upper surface of the droplet 2820 after forming the focal point. Therefore, the position where the shaping beam B11-2 forms the focal point is not affected by the refraction according to the shape of the droplet 2820 due to a surface tension. In this respect, the shaping system 21 can perform positioning of the focal point of the shaping beam B11-2 with high accuracy.

However, the shaping unit 2110 may apply the shaping beam B11-2 from the upper side of the droplet 2820. As a result, even when the droplet 2820 is positioned on an opaque article such as when the droplet 2820 is dropped on an upper surface of an opaque substrate 2810, the material can be partially changed into a solid by irradiating the droplet 2820 with the shaping beam B11-2.

Cleaning liquid is dropped from the dropping port 2140. The cleaning liquid is liquid for removing the material in a liquid form adhering to the solidified material after processing the material in a liquid form. The dropping port 2140 cleans the material in a solid form positioned in a shaping area by dropping the cleaning liquid toward the shaping area. That is, the dropping port 2140 removes the material in a liquid form adhering to the solidified material positioned in the shaping area.

However, the method of cleaning the material in a solid form by the shaping system 21 is not limited to the method of dropping the cleaning liquid from the dropping port 2140. By moving the cleaning liquid that is prepared in advance in the form of droplets 2820, the material in a solid form is immersed in the cleaning liquid by the shaping system 21. Thereby, the material in a solid form may be cleaned.

Figure 36:
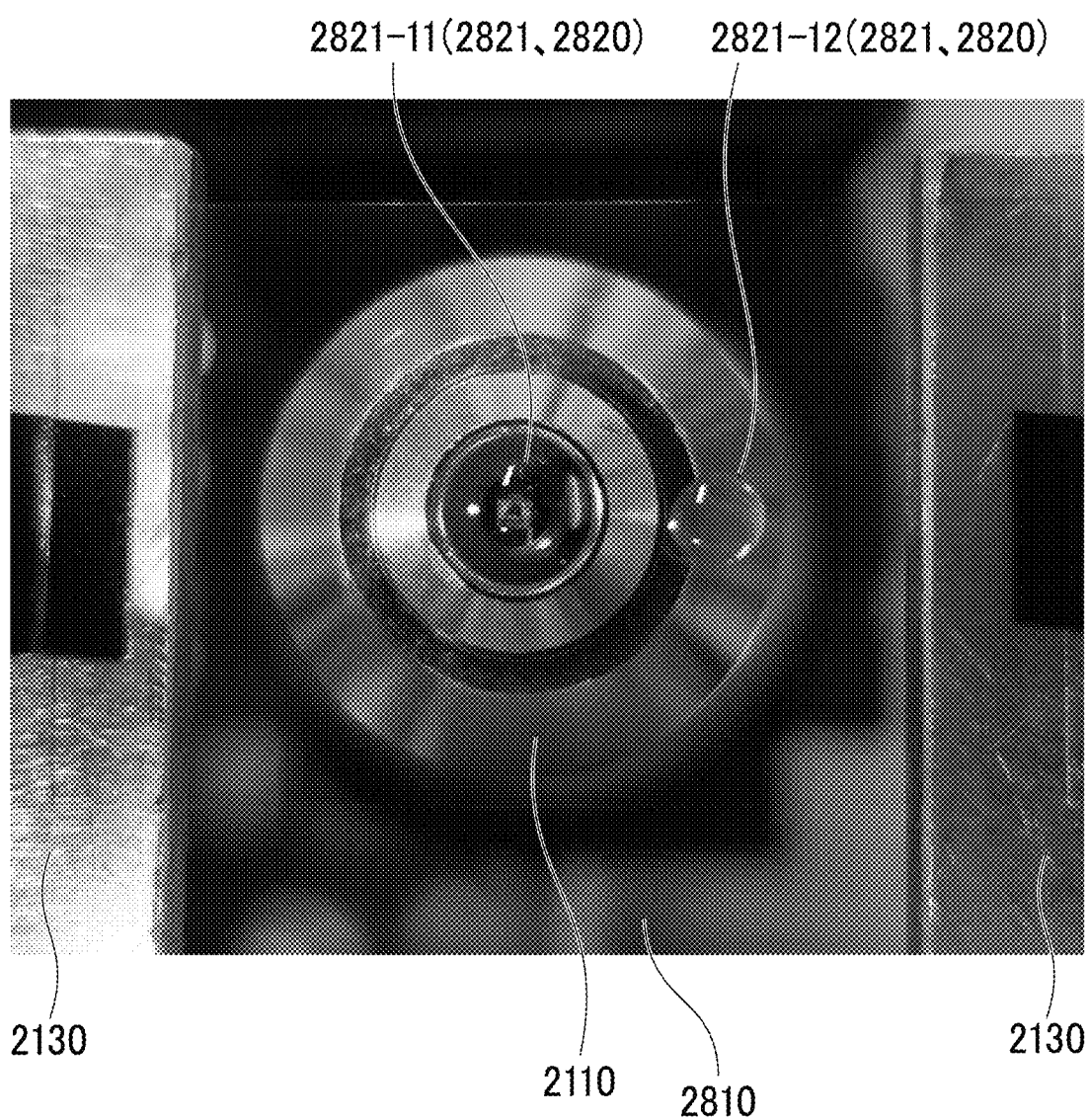
FIG. 36 is a diagram showing an example of a positional relationship between a laser light emitting portion of the shaping unit and a droplet according to the one embodiment.

FIG. 36 is a diagram showing an example of a positional relationship between the laser light emitting portion of the shaping unit 2110 and the droplet 2820. FIG. 36 shows an example in which the laser light emitting portion of the shaping unit 2110 is viewed from the upper side. In this example, the substrate 2810 that is supported by the support stand 2130 is positioned on the laser light emitting portion of the shaping unit 2110, and two droplets 2820 of different materials are placed on the substrate 2810. The two droplets 2820 are a droplet of a first material 2821-11 and a droplet of a second material 2821-12. In order to distinguish between the droplet of the material and the droplet of the cleaning liquid, the droplet of the material is designated by reference numeral 2821.

Among the droplets of the materials 2821, the droplet of the first material 2821-11 is positioned on the laser light emitting portion of the shaping unit 2110. By the shaping unit 2110 to apply the shaping beam B11-2 to form the focal point in the droplet of the first material 2821-11, a portion of the focal point of the droplet 2821-11 changes into a solid from liquid.

By performing a first material process by using the droplet of the first material 2821-11 and performing a second material process by using the droplet of the second material 2821-12, the shaping system 21 can produce an object that includes both the first material and the second material. In order to perform such processes, the movement processing unit 2120 moves the droplet 2820.

The movement processing unit 2120 moves the droplet 2820. For example, the movement processing unit 2120 applies the laser C-2 (see FIG. 37) to generate a temperature gradient having a predetermined shape, and moves the droplet based on the temperature gradient.

The shaping apparatus 2100 including the movement processing unit 2120 corresponds to an example of a droplet moving device.

Figure 37:
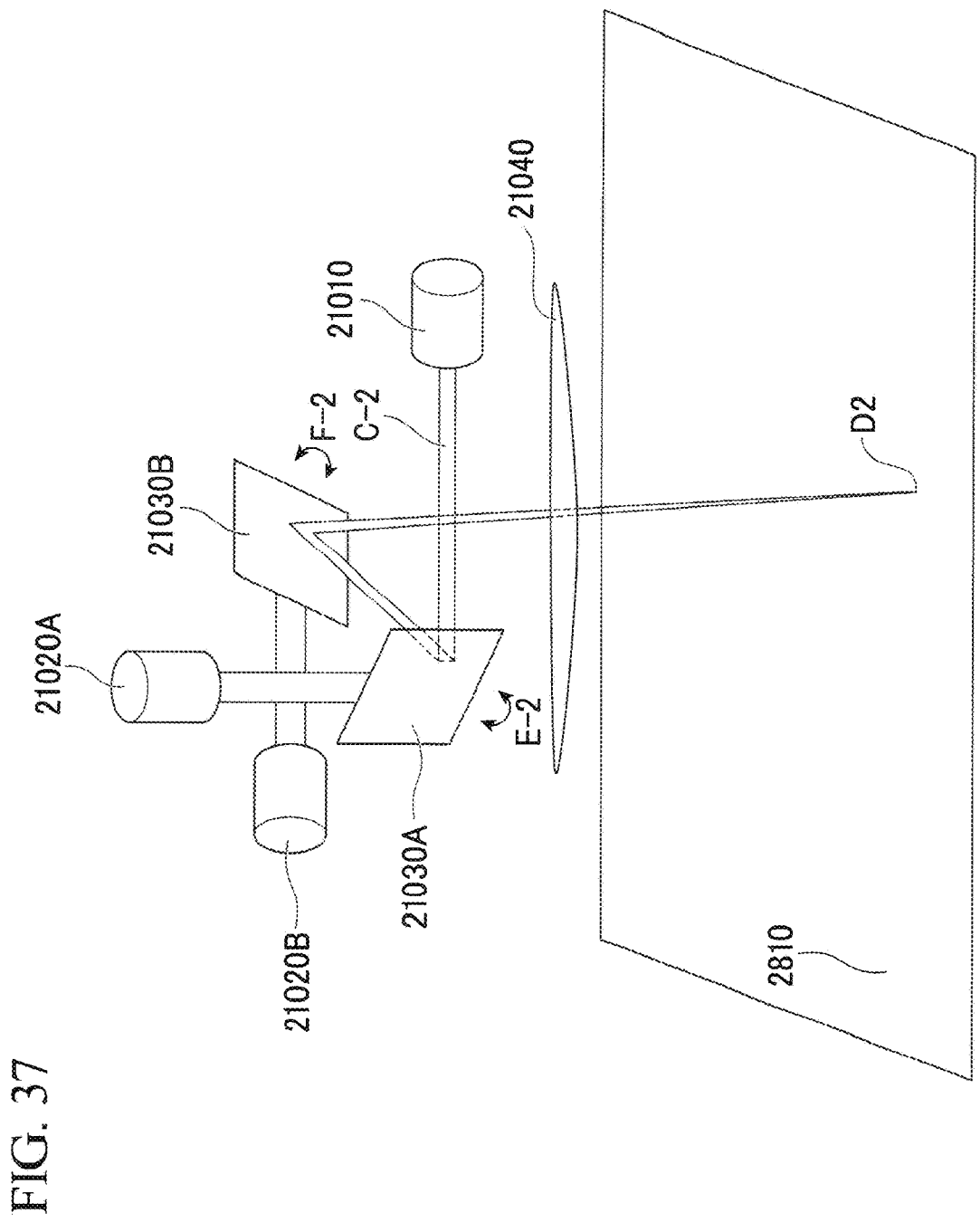
FIG. 37 is a diagram showing a state in which a movement processing unit according to the one embodiment irradiates a substrate with a laser.

The movement processing unit 2120 generates the above described temperature gradient by moving the irradiation area of the laser C-2 with the galvano mirror 21030 (see FIG. 37).

In particular, the movement processing unit 2120 generates a steady temperature gradient (particularly, a temperature gradient that is substantially small that the temperature pulsation is negligible) by moving the irradiation area of the laser C-2 at high speed and repeatedly heating the same place.

FIG. 37 is a diagram showing a state in which the movement processing unit 2120 irradiates the substrate 2810 with the laser C-2. The movement processing unit 2120 includes a laser irradiation device 21010, a galvano mirror rotation device 21020, a galvano mirror 21030, and a condensing lens 21040. In FIG. 37, the galvano mirror rotation devices 21020A and 21020B are shown as the galvano mirror rotation device 21020. Further, the galvano mirrors 21030A and 21030B are shown as the galvano mirror 21030.

The laser irradiation device 21010 is a device that applies the laser C-2. An infrared ray that heats the irradiated irradiation area is an exemplary example of the laser C-2 applied by the laser irradiation device 21010.

The galvano mirror rotation device 21020A and the galvano mirror rotation device 21020B each rotates in an E-2 direction and an F-2 direction so that the galvano mirror 21030A and the galvano mirror 21030B are rotated. Rotation angles of the galvano mirror rotation device 21020A and the galvano mirror rotation device 21020B may be angles at which any places within a predetermined area that is set on the substrate 2810 as an area for moving the droplet can be irradiated with the laser C-2. For example, each of the galvano mirror rotation device 21020A and the galvano mirror rotation device 21020B may be provided so as to be rotatable 360 degrees, but the present embodiment is not limited to this.

The galvano mirror rotation device 21020A and the galvano mirror rotation device 21020B are provided so as to be perpendicular to each other. In the example in FIG. 37, the galvano mirror rotation device 21020A is disposed such that the rotation axis faces the vertical direction (the direction orthogonal to the substrate 2810). The galvano mirror rotation device 21020A is disposed such that the rotation axis faces the horizontal direction (the direction parallel to the substrate 2810). The galvano mirror rotation device 21020A and the galvano mirror rotation device 21020B may be provided such that the rotation axes of the rotation devices intersect or may be provided such that the rotation axes of the rotation devices are in a twisted position.

The galvano mirror 21030A reflects the laser C-2 that is applied from the laser irradiation device 21010. The galvano mirror 21030B is irradiated with the laser C-2 that is reflected by the galvano mirror 21030A. The galvano mirror 21030B reflects the laser C-2 that is applied by the galvano mirror 21030A.

The condensing lens 21040 is irradiated with the laser C-2 that is reflected by the galvano mirror 21030B. The condensing lens 21040 collects the laser C-2 that is applied by the galvano mirror 21030B and incident on the condensing lens 21040.

The substrate 2810 is irradiated with the laser C-2 that is collected by the condensing lens 21040. On the substrate 2810, a place that is irradiated with the laser C-2 is referred to as an irradiation area D2.

The galvano mirror 21030A and the galvano mirror 21030B are provided so as to be perpendicular to each other, and the galvano mirrors are each rotated by the galvano mirror rotation device 21020A and the galvano mirror rotation device 21020B. The galvano mirror 21030A rotates about the rotation axis of the galvano mirror rotation device 21020A as a rotation axis. The galvano mirror 21030B rotates about the rotation axis of the galvano mirror rotation device 21020B as a rotation axis.

The laser C-2 can be applied by the user of the shaping system 21 by rotating the galvano mirror 21030A and the galvano mirror 21030B while changing the position of the irradiation area D2.

Figure 38:
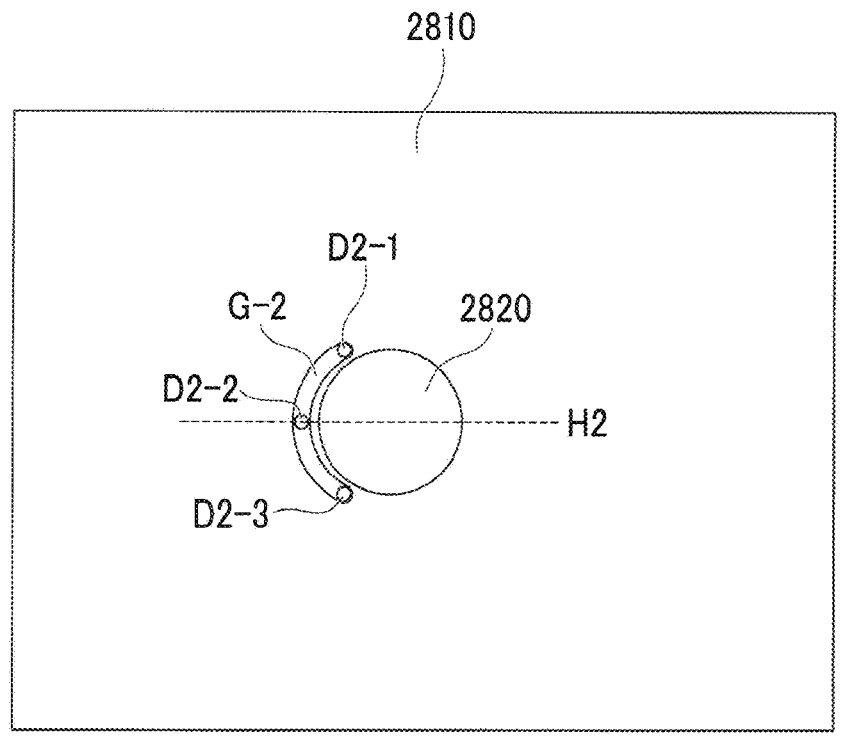
FIG. 38 is a diagram showing an irradiation area and a droplet when the movement processing unit according to the one embodiment irradiates the substrate with the laser.

FIG. 38 is a diagram showing an irradiation area D2 and the droplet 2820 when the movement processing unit 2120 irradiates the substrate 2810 with the laser C-2.

The irradiation area D2-1, the irradiation area D2-2, and the irradiation area D2-3 on the substrate 2810 are irradiated by the movement processing unit 2120. The movement processing unit 2120 moves the irradiation area D2 of the laser C-2 to the irradiation area D2-1, the irradiation area D2-2, and the irradiation area D2-3 at a high speed. That is, the irradiation area D2 of the laser C-2 of the movement processing unit 2120 is moved at high speed in a locus G-2.

The movement processing unit 2120 may continuously apply the laser C-2 to irradiate the entire locus G-2 with the laser C-2. Alternatively, the movement processing unit 2120 may irradiate only part of the locus G-2 such as the irradiation area D2-1, the irradiation area D2-2, and the irradiation area D2-3 with the laser C-2 by blinking the laser C-2.

In the example shown in FIG. 38, the irradiation area D2 of the laser C-2 of the movement processing unit 2120 is not in contact with the droplet 2820, but the irradiation area D2 may be in contact with the droplet 2820. The movement processing unit 2120 may irradiate the substrate 2810 with the laser C-2 or may irradiate the droplet 2820 with the laser C-2. Alternatively, the movement processing unit 2120 may irradiate both the substrate 2810 and the droplet 2820 with the laser C-2.

Figure 39:
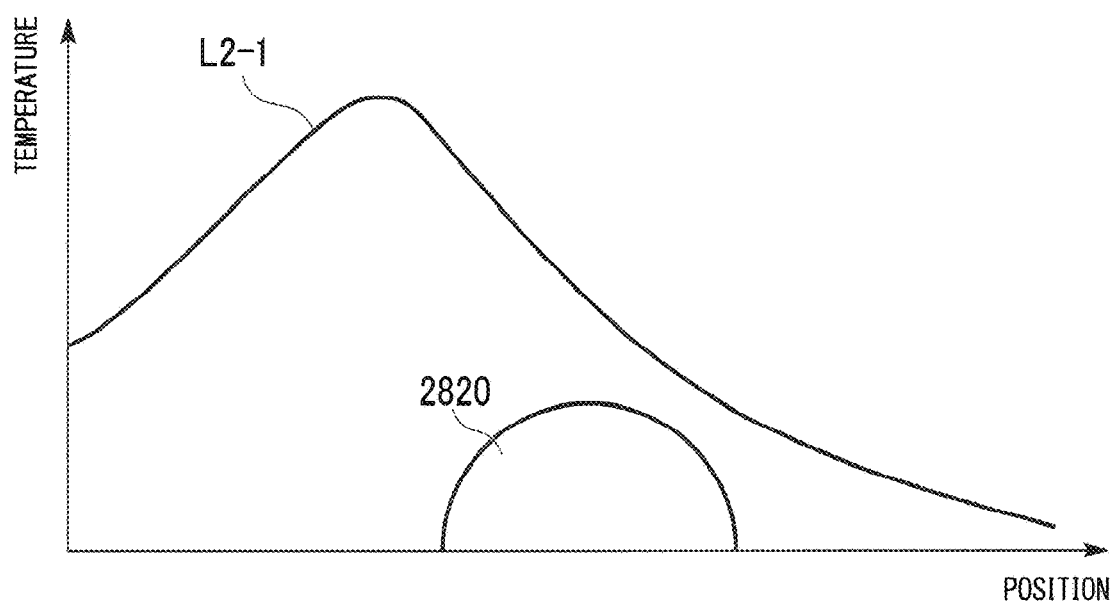
FIG. 39 is a diagram showing an example of a temperature gradient generated by irradiation of a laser C-2 according to the one embodiment.

FIG. 39 is a diagram showing an example of the temperature gradient generated by the irradiation of the laser C-2. FIG. 39 shows the temperature gradient at the position of line H2 on the surface (upper surface) of the substrate 2810 in FIG. 38. The horizontal axis of the graph in FIG. 39 indicates the position on the line H2. The vertical axis indicates the temperature. The line L2-1 shows the temperature for each position indicated by the horizontal axis of the graph. Further, in FIG. 39, the position of the droplet 2820 is shown by showing the droplet 2820.

In the example in FIG. 39, the temperature gradient (line L2-1) shows the maximum temperature at the position corresponding to the position of the irradiation area D2-2, and the temperature gradient has a shape in which the temperature decreases as the distance from the irradiation area D2-2 increases. As described above, the temperature gradient generated by the irradiation of the laser C-2 in the example in FIG. 38 reaches the maximum temperature at the position corresponding to the locus G-2 of the irradiation area D2, and the temperature gradient has a shape in which the temperature decreases as the distance from the locus G-2 increases.

The movement processing unit 2120 moves the droplet 2820 by moving the irradiation area D2 of the laser C-2 while irradiating the periphery of the droplet 2820 with the laser C-2. This point will be described with reference to FIGS. 40 to 42.

Figure 40:
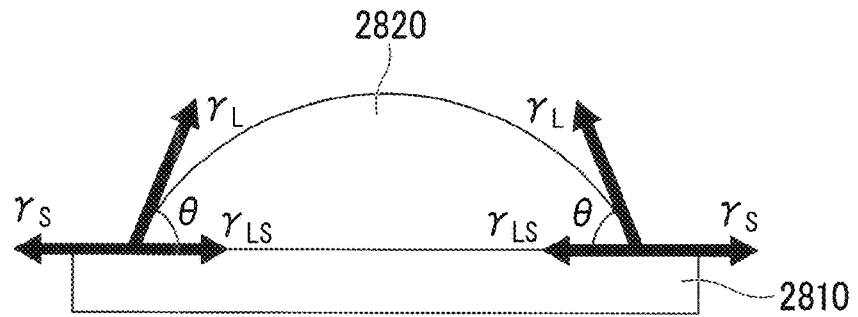
FIG. 40 is a diagram showing an example of a relationship of forces in a droplet when the droplet is in a normal temperature state where the movement processing unit according to the one embodiment does not irradiate the droplet with the laser.

FIG. 40 is a diagram showing an example of a relationship of the forces in the droplet 2820 when the droplet 2820 is in a normal temperature state where the movement processing unit 2120 does not irradiate the droplet 2820 with the laser C-2. In the example in FIG. 40, $\gamma_L$ indicates the surface tension at the droplet 2820. $\gamma_S$ indicates the surface tension of the solid (the surface tension on the substrate 2810). $\gamma_{LS}$ indicates a solid liquid interfacial tension. θ indicates a contact angle of the droplet 2820 with respect to the substrate 2810.

In the case of FIG. 40, Young's equation is expressed as Equation (5).

$$\gamma_S = \gamma_L \cos\theta + \gamma_{LS} \quad (5)$$

In FIG. 40, the forces in the droplet 2820 are balanced, and the droplet 2820 does not move.

Figure 41:
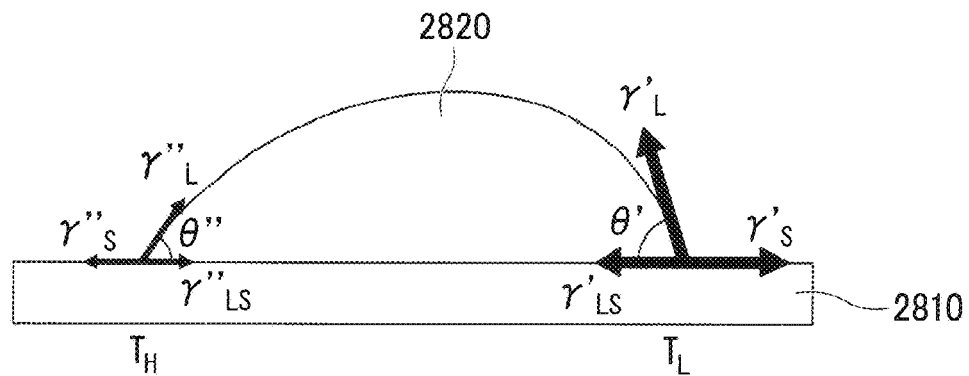
FIG. 41 is a diagram showing an example of a relationship of forces in a droplet when the movement processing unit according to the one embodiment applies the laser C-2 and a temperature gradient is generated.

FIG. 41 shows an example of a relationship of the forces in the droplet 2820 when the movement processing unit 2120 applies the laser C-2 and the temperature gradient L2-1 is generated as shown in FIG. 39. Of the left and right sides of the droplet 2820, the temperature on the left side when facing FIG. 41 is higher than that on the right side when facing FIG. 41.

The force on the side where the temperature is relatively low (on the right side when facing FIG. 41) is indicated by a variable name in which "'" is added to a variable name used in FIG. 40.

Specifically:
$\gamma'_L$ indicates the surface tension of the droplet 2820.
$\gamma'_S$ indicates the surface tension of the solid (the surface tension on the substrate 2810).
$\gamma'_{LS}$ indicates a solid liquid interfacial tension.
θ' indicates a contact angle of the droplet 2820 with respect to the substrate 2810.

On the other hand, the force on the side where the temperature is relatively high (on the left side when facing FIG. 41) is indicated by adding "''" to the variable name.

Specifically:
$\gamma''_L$ indicates the surface tension of the droplet 2820.
$\gamma''_S$ indicates the surface tension of the solid (the surface tension on the substrate 2810).
$\gamma''_{LS}$ indicates a solid liquid interfacial tension.
θ'' indicates a contact angle of the droplet 2820 with respect to the substrate 2810.

In the example in FIG. 41, a temperature difference occurs between the temperature $T_H$ on the high temperature side and the temperature $T_L$ on the low temperature side ($T_H > T_L$). Due to the temperature difference, the contact angle and surface tension on each of the high temperature side and the low temperature side are changed from the case in FIG. 40, which is the case where the movement processing unit 2120 does not apply the laser C-2.

On the low temperature side, the contact angle θ' is larger than in the case in FIG. 40, and the horizontal component of the surface tension between the liquid and the gas $\gamma'_L$ is reduced. The force F' that acts on the interface on the low temperature side is expressed as in Equation (6) with the direction of the surface tension of the solid $\gamma'_S$ as positive.

$$F' = \gamma'_S - (\gamma'_{LS} + \gamma'_L \cos\theta') > 0 \quad (6)$$

wherein "F'>0", and a direction of the force F' is the same as the direction of the surface tension of the solid $\gamma'_S$ and is the right direction when facing FIG. 41 (a direction from the high temperature side to the low temperature side of the droplet 2820).

On the other hand, on the high temperature side, the contact angle θ'' is smaller than when the laser C-2 is not applied, and the horizontal component of the surface tension between the liquid and the gas $\gamma''_L$ is increased. The force F'' that acts on the interface on the high temperature side is expressed as in Equation (7) with the direction of the surface tension of the solid $\gamma''_{LS}$ as positive.

$$F'' = -\gamma''_S + (\gamma''_{LS} + \gamma''_L \cos\theta'') > 0 \quad (7)$$

wherein "F''>0", and a direction of the force F'' is opposite to the direction of the surface tension of the solid $\gamma''_S$ and is the right direction when facing FIG. 41. (The direction of the force F'' is the same as the direction of the surface tension of the solid $\gamma'_{LS}$ and is the right direction when facing FIG. 41).

Figure 42:
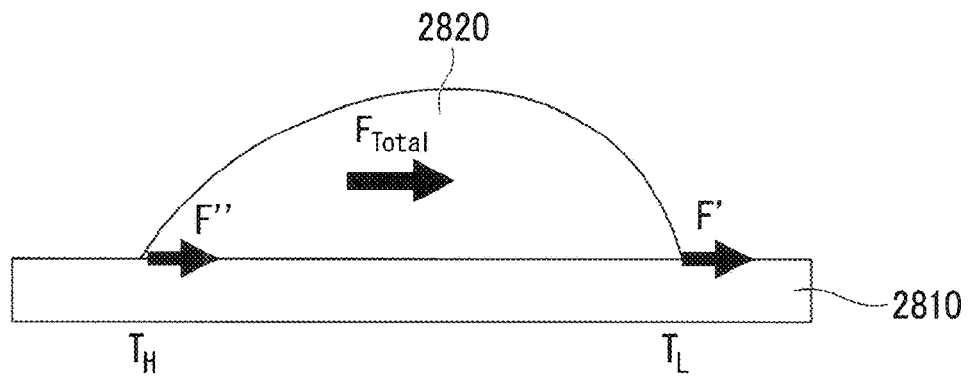
FIG. 42 is a diagram showing an example of a direction of a force generated in the droplet according to the one embodiment.

FIG. 42 shows an example of a direction of the force generated in the droplet 2820. As described above, both the direction of the force F' and the direction of the force F'' are the right directions (a direction from the high temperature side to the low temperature side of the droplet 2820) when facing FIG. 42. A force $F_{Total}$, which is a combination of the force F' and the force F'', is expressed as in Equation (8).

$$F_{Total} = F' + F'' \quad (8)$$

Since both the direction of the force F' and the direction of the force F'' are the right directions when facing FIG. 42, the direction of the force $F_{Total}$ is also the right direction when facing FIG. 42. In the droplet 2820, the force $F_{Total}$ is moved to the right direction when facing FIG. 42 as a driving force.

As described above, the droplet 2820 moves due to the temperature gradient. By moving the irradiation area D2 of the laser C-2 of the movement processing unit 2120 in accordance with the movement of the droplet 2820, the droplet 2820 can be continuously moved.

Figure 43:
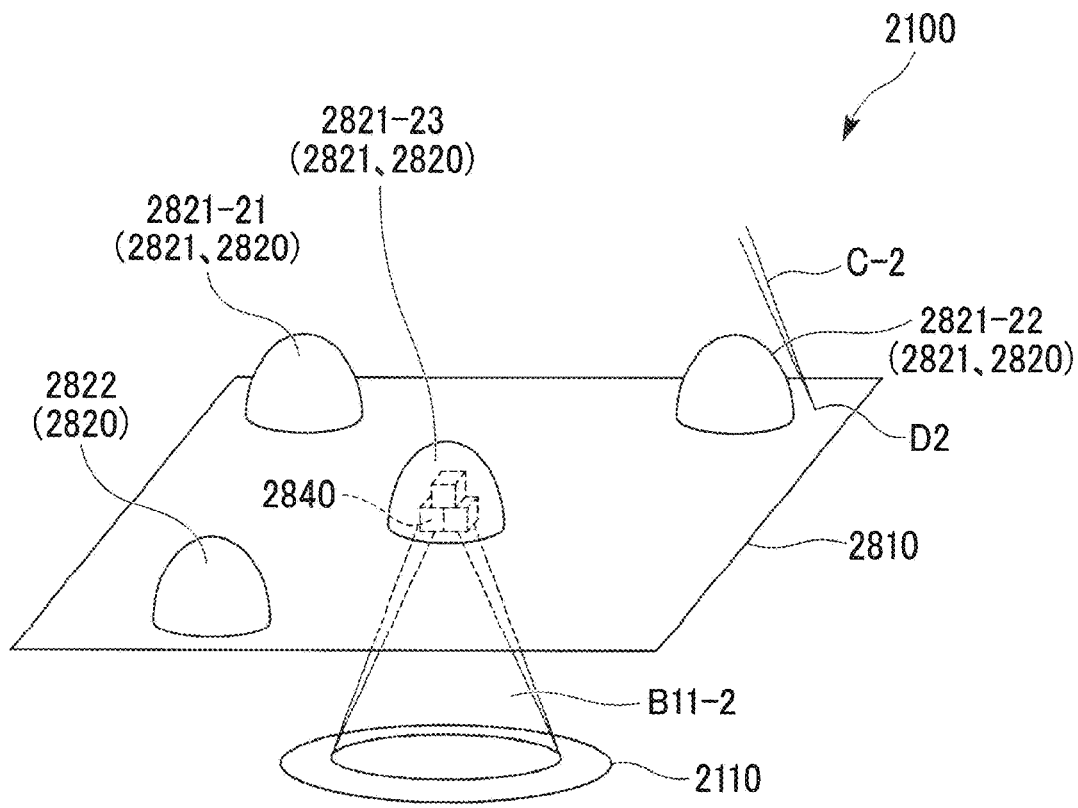
FIG. 43 is a diagram showing an example of a disposition of the droplet according to the one embodiment.

FIG. 43 shows an example of a disposition of the droplet 2820. FIG. 43 shows an example when the substrate 2810 is viewed from diagonally above. In this example, a droplet of a third material 2821-21, a droplet of a fourth material 2821-22, a droplet of a fifth material 2821-23, and a droplet of the cleaning liquid are positioned on the substrate 2810. In order to distinguish between the droplet of the material and the droplet of the cleaning liquid, the droplet of the cleaning liquid is designated by reference numeral 2822.

Each of the droplet of the third material 2821-21, the droplet of the fourth material 2821-22, and the droplet of the fifth material 2821-23 is positioned in the shaping area and partially changed to a solid so that the shaping system 21 can produce an object that includes the third material, the fourth material, and the fifth material.

Further, each time the shaping system 21 partially changes each of the droplet of the third material 2821-21, the droplet of the fourth material 2821-22, and the droplet of the fifth material 2821-23 into a solid, the shaping system 21 moves the droplet of the cleaning liquid 2822 to the shaping area to clean the material in a solid form. As described above, as a method for cleaning the material in a solid form, a method of dropping the cleaning liquid from the dropping port 2140 may be used instead of the method of moving the droplet of the cleaning liquid 2822.

In the example in FIG. 43, the shaping unit 2110 applies the shaping beam B11-2 from below the substrate 2810.

On the other hand, the movement processing unit 2120 applies the laser C-2 from above the substrate 2810.

In FIG. 43, both the shaping beam B11-2 and the laser C-2 are shown for the sake of explanation. However, while applying the shaping beam B11-2 by the shaping unit 2110, the movement processing unit 2120 may not irradiate the droplet 2820 with the laser C-2.

After the shaping unit 2110 ends the process on the material that is positioned in the shaping area, the movement processing unit 2120 irradiates the material that is positioned in the shaping area with the laser C-2 to move the material as in a liquid form to the outside of the shaping area.

A pattern for disposing and moving the droplet 2820 may be provided on the substrate 2810.

Figure 44:
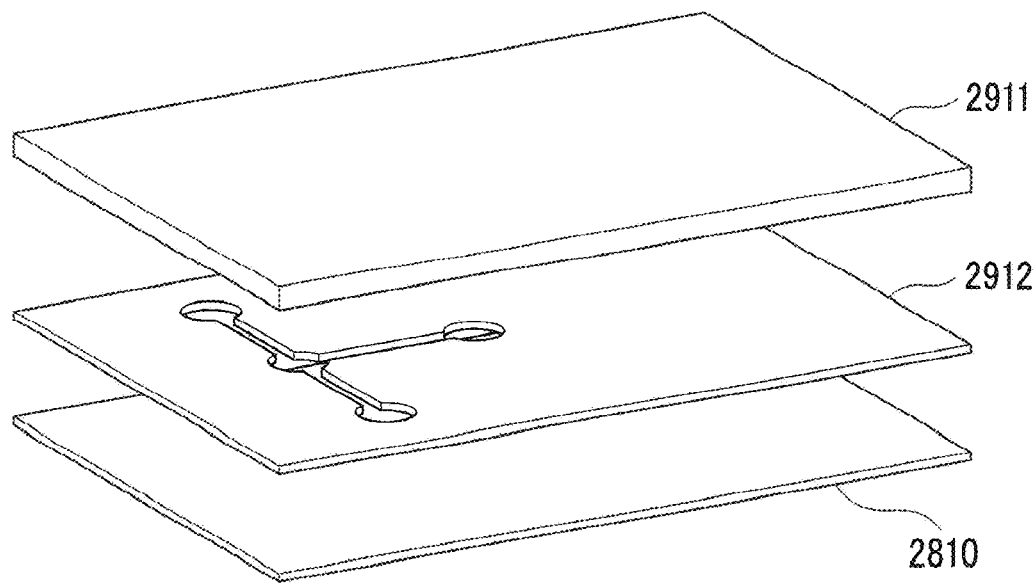
FIG. 44 is a diagram showing an example of a configuration for providing a pattern on the substrate according to the one embodiment.

FIG. 44 is a diagram showing an example of a configuration for providing the pattern on the substrate 2810. In the example in FIG. 44, a glass substrate is used as the substrate 2810. The portion of the substrate 2810 other than the portion where the wettability is desired to be improved is covered with the mask 2912, and an excimer light (VUV light) is applied from an excimer lamp light source 2911. The excimer light changes the atmospheric oxygen into active oxygen such as ozone and breaks the bonds on the glass surface. By the chemical reaction between the active oxygen and the surface of the glass substrate, a functional group having a high affinity with the resin such as "—OH" or "—COOH" is imparted so that the wettability is improved.

However, the method of providing the pattern on the substrate 2810 is not limited to the method of irradiation with the excimer light. For example, the substrate 2810 made of a material having a relatively low wettability may be used, and a coating having a relatively high hydrophilicity may be provided on a portion of the pattern. Alternatively, the substrate 2810 made of a material having a relatively high wettability may be used, and a coating having a water-repellent may be provided on a portion other than the pattern.

Further, for example, by applying a pattern with a fluorine coat to the portion of the surface of the substrate 2810 other than the portion through which the droplet 2820 passes, a path of movement of the droplet 2820 may be patterned. Since the droplet 2820 is moved away from the fluorine coated portion, the droplet 2820 can be moved along a specific path (a path that is not fluorine coated) by using the pattern with a fluorine coat. In this way, the movement processing unit 2120 may move the droplet 2820 on the surface on which the water-repellent material is partially disposed.

Figure 45:
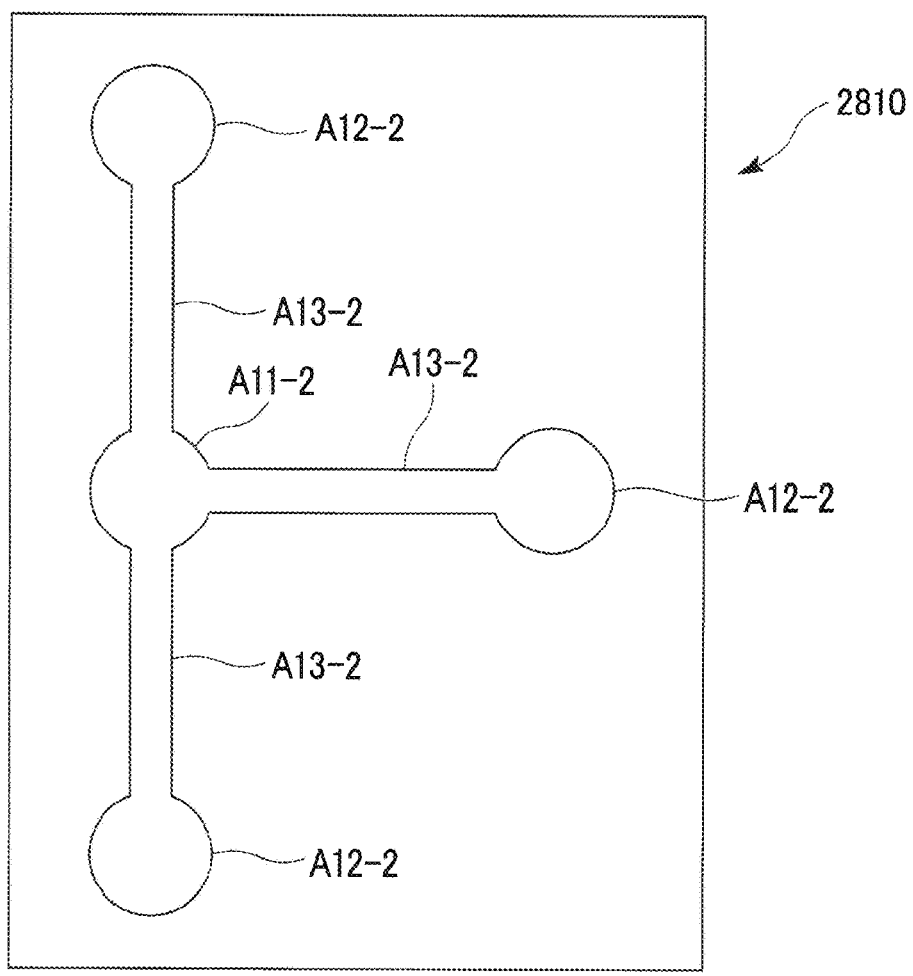
FIG. 45 is a diagram showing an example of a pattern of the substrate according to the one embodiment.

FIG. 45 is a diagram showing a first example of the pattern of the substrate 2810. In the example in FIG. 45, the substrate 2810 is provided with a pattern including an area A11-2, which is a shaping area, an area A12-2, which is a retreating area of the droplet 2820 other than the droplet 2820 being used for shaping, and an area A13-2 that connects the area A11-2 and the area A12-2. By making the wettability of these areas A11-2 to A13-2 higher than those of other portions, the movement processing unit 2120 can move the droplet 2820 relatively easily and can prevent or reduce the spread of the droplet 2820.

The size of the pattern depends 2820 on the material of the droplet, but for example, the area A11-2 and the area A12-2 may be formed in a circular form having a diameter of substantially 4 mm to 5 mm. When the width of the area A13-2 is too thin, it becomes difficult to move the droplet 2820, and when the width is too thick, the droplet 2820 may flow back to the area A13-2 when the droplet 2820 is moved to the area A11-2 or the area A12-2. The width of the area A13-2 may be, for example, substantially 2 mm. The length of the area A13-2 may be, for example, substantially 10 mm.

Figure 46:
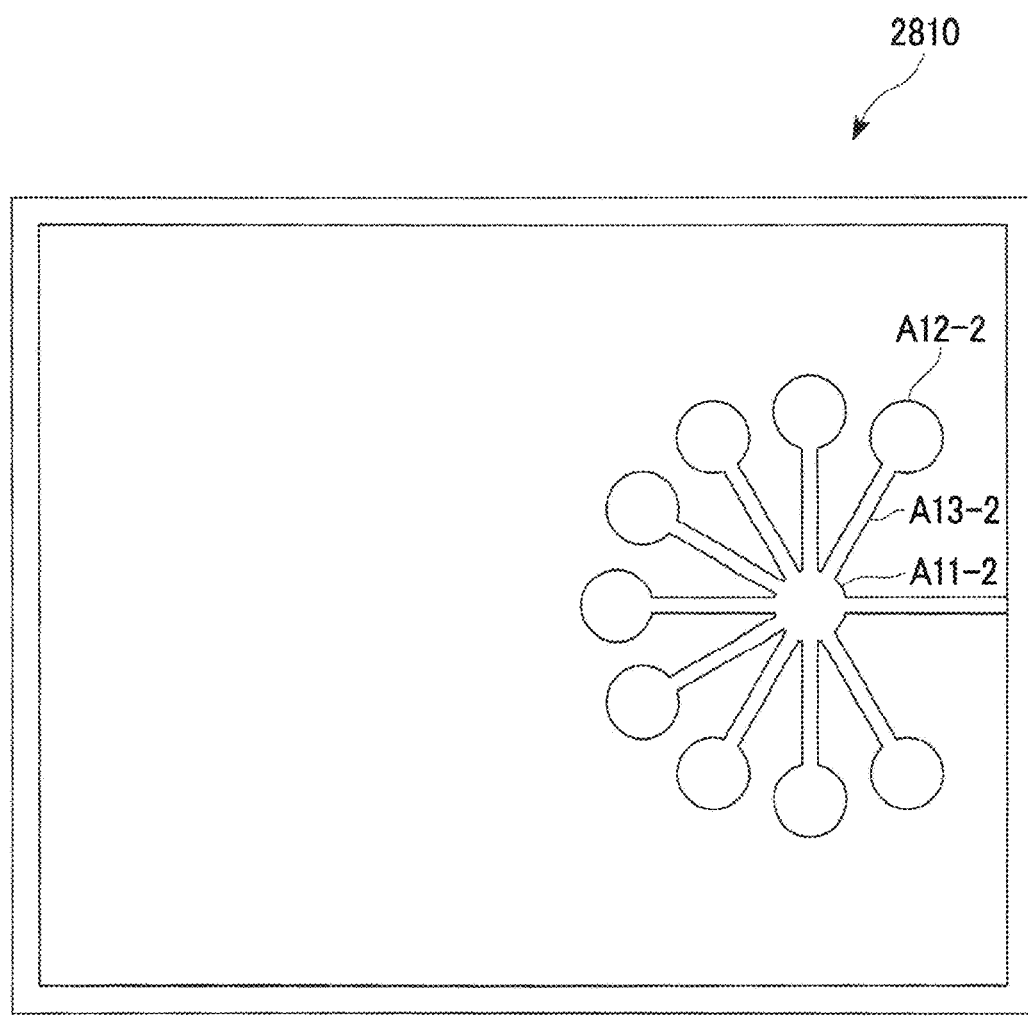
FIG. 46 is a diagram showing an example of a pattern of the substrate according to the one embodiment.

FIG. 46 is a diagram showing a second example of the pattern of the substrate 2810. In the example in FIG. 45, three areas A12-2 are provided, whereas in the example in FIG. 46, nine areas A12-2 are provided. As described above, the number of areas A12-2 in the pattern of the substrate 2810 is not limited to a specific number and may be any number. By providing a large number of areas A12-2, it is possible to cope with a large number of types of droplets 2820 used for shaping.

The observation unit 2150 captures an image of the object.

Figure 47:
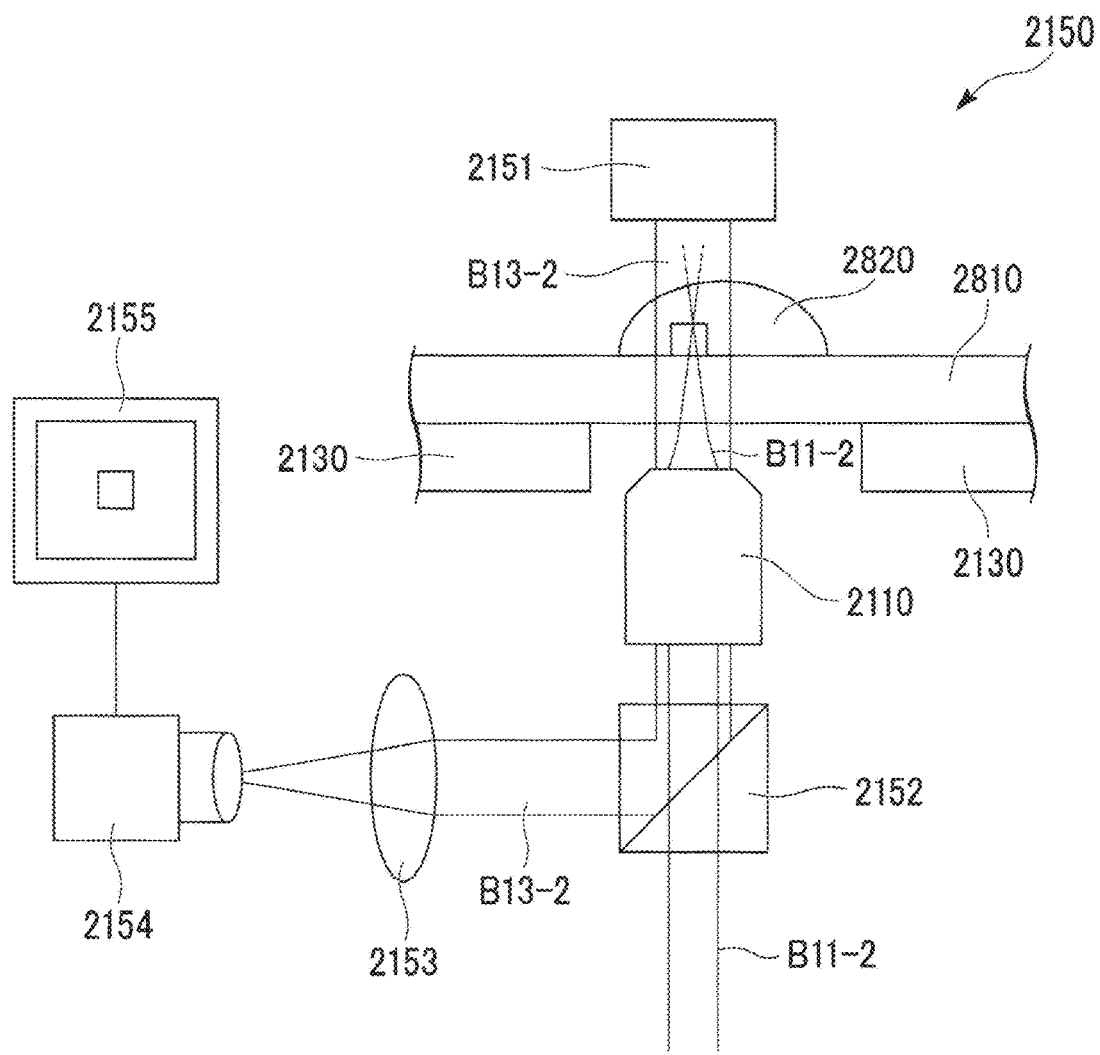
FIG. 47 is a diagram showing an example of a configuration of an observation unit according to the one embodiment.

FIG. 47 shows an example of a configuration of the observation unit 2150. In the example in FIG. 47, the observation unit 2150 includes an observation light-light source 2151, a beam splitter 2152, an observation lens 2153, a CCD camera 2154, and a display device 2155.

The observation light-light source 2151 emits an illumination light B13-2 for imaging the object. The object referred to here may be an object in the process of being shaped. The object is irradiated with the illumination light B13-2. After part of the illumination light B13-2 is reflected or absorbed, the remaining light is incident on the beam splitter 2152 via the laser light emitting portion of the shaping unit 2110.

In the example in FIG. 47, the observation light-light source 2151 is positioned above the shaping area, similar to the dropping port 2140 in FIG. 35. While the observation light-light source 2151 emits the illumination light B13-2, a disposition position of the dropping port 2140 and a disposition position of the observation light-light source 2151 may be exchanged. Alternatively, the dropping port 2140 may be arranged so that the position of the dropping port 2140 and the position of the observation light-light source 2151 do not overlap, such as dropping the cleaning liquid or a material in a liquid form from diagonally above the shaping area toward the shaping area.

The beam splitter 2152 includes a half mirror and reflects the illumination light B13-2. The beam splitter 2152 receives not only the incident of the illumination light B13-2 but also the incident of the shaping beam B11-2. The beam splitter 2152 allows the shaping beam B11-2 to pass through and advance toward the laser light emitting portion of the shaping unit 2110. Due to the reflection of the illumination light B13, the beam splitter 2152 redirects the illumination light B13-2, which passed through the same path as the shaping beam B11-2 in the opposite direction to the shaping beam B11-2, in a direction different from the direction of the path of the shaping beam B11-2.

The observation lens 2153 refracts the illumination light B13-2 such that the illumination light B13-2 forms an image at a position of an image sensor of the CCD camera 2154.

The CCD camera 2154 generates image data of the object by receiving the illumination light B13-2 and performing the photoelectric conversion.

The display device 2155 has a display screen such as a liquid crystal panel or an LED panel, for example, and displays an image of the object. Specifically, the display device 2155 receives an input of the image data of the object produced by the CCD camera and displays the image indicated by the image data.

However, the configuration and the disposition of the observation unit 2150 are not limited to those shown in FIG. 47. For example, the observation unit 2150 may image the object from the upward direction and may image the object from the obliquely upward direction or the obliquely downward direction.

The control device 2200 controls the shaping apparatus 2100 to produce the object. For example, the control device 2200 controls the timing, at which the shaping beam B11-2 is applied by the shaping unit 2110, and the position of a focal point of the shaping beam B11-2. Further, the control device 2200 controls the timing and the position of the irradiation area D at which the laser C-2 is applied by the movement processing unit 2120. Further, the control device 2200 stores the locus G-2 of the irradiation area D2 and moves the laser C-2 at high speed based on the locus G-2.

Further, the control device 2200 controls the timing at which the dropping port 2140 drops the cleaning liquid. Further, the control device 2200 functions as a user interface of the shaping system 21. The control device 2200 is configured to use a computer such as a personal computer or a workstation.

The display unit 2210 has a display screen such as a liquid crystal panel or an LED panel, for example, and displays various images. In particular, the display unit 2210 presents information related to the shaping system 21 to a user.

The display unit 2210 may be configured with the display device 2155 or may be configured separately from the display device 2155.

The operation input unit 2220 includes an input device such as a keyboard and a mouse, for example, and receives a user operation. In particular, the operation input unit 2220 receives the user operation for performing settings related to the shaping system 21.

The storage unit 2280 stores various data. The storage unit 2280 is configured with a storage device included in the control device 2200.

The processing unit 2290 controls each unit of the control device 2200 to execute various processes. The processing unit 2290 is configured with a CPU included in the control device 2200 reading a program from the storage unit 2280 and executing the program.

The control device 2200 may automatically control the shaping apparatus 2100 based on a program or the like set in advance. Alternatively, the user may input an instruction to the control device 2200 online, and the control device 2200 may control the shaping apparatus 2100 according to the instruction of the user.

Next, the exchange of the droplet 2820 positioned in the shaping area will be described with reference to FIGS. 48 to 57.

Figure 48:
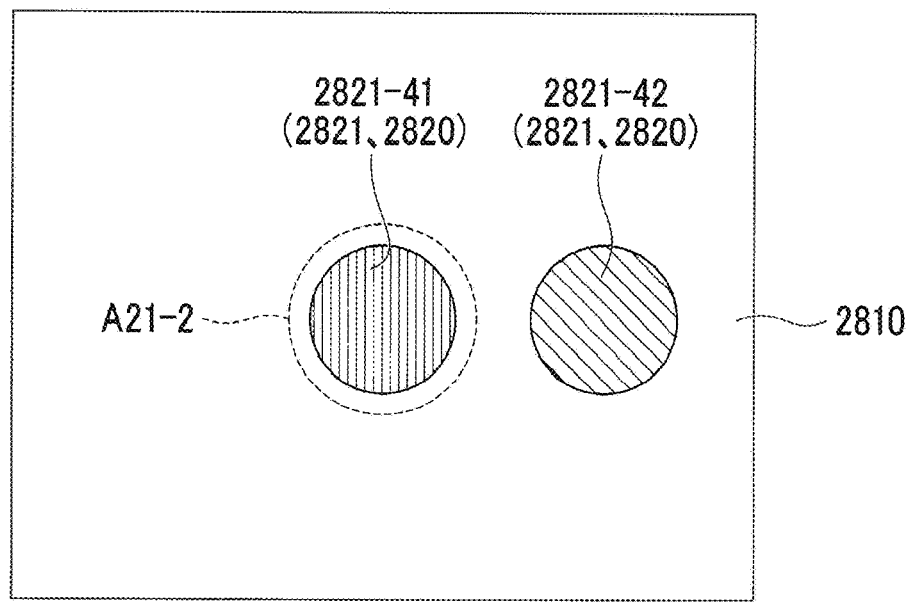
FIG. 48 is a diagram showing an example of a disposition of a material according to the one embodiment.

FIG. 48 shows a first example of the disposition of the material. FIG. 48 shows an example of the disposition of the material at the start of the process in which the shaping system 21 produces the object. In the example in FIG. 48, a droplet of a sixth material 2821-41 and a droplet of a seventh material 2821-42, which is different from the sixth material, are placed on the substrate 2810. Further, the area A21-2 indicates the shaping area.

From the state shown in FIG. 48, the shaping unit 2110 irradiates the droplet of the sixth material 2821-41, which is positioned in the shaping area (area A21-2), with the shaping beam B11-2 to change part of the droplet of the sixth material 2821-41 into a solid from the liquid.

Figure 49:
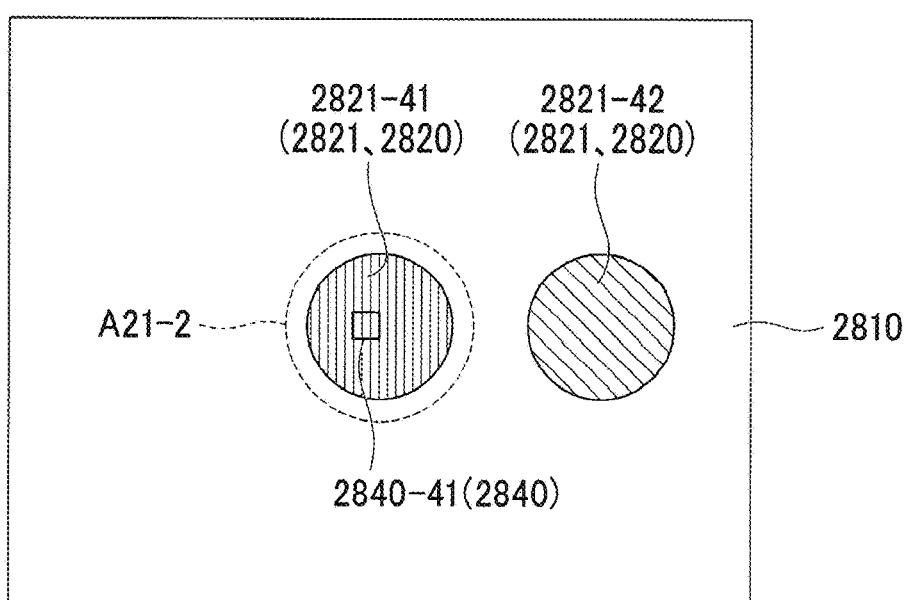
FIG. 49 is a diagram showing an example of a disposition of the material according to the one embodiment.

FIG. 49 shows a second example of the disposition of the material. In the example in FIG. 49, the positions of the substrate 2810, the droplet of the sixth material 2821-41, the droplet of the seventh material 2821-42, and the area A21-2 are the same as in the case in FIG. 49. On the other hand, the example in FIG. 49 is different from the case in FIG. 48 in that a solid article 2840 is included in the droplet of the sixth material 2821-41.

The solid article 2840 in FIG. 49 is a solid article of the sixth material 2840-41 and corresponds to an example of the object in the process of being produced. Specifically, from the state shown in FIG. 48, the shaping unit 2110 irradiates the droplet of the sixth material 2821-41 with the shaping beam B11-2 to change part of the droplet of the sixth material 2821-41 into a solid from the liquid. The generated solid is the solid article of the sixth material 2840-41 in FIG. 49.

Figure 50:
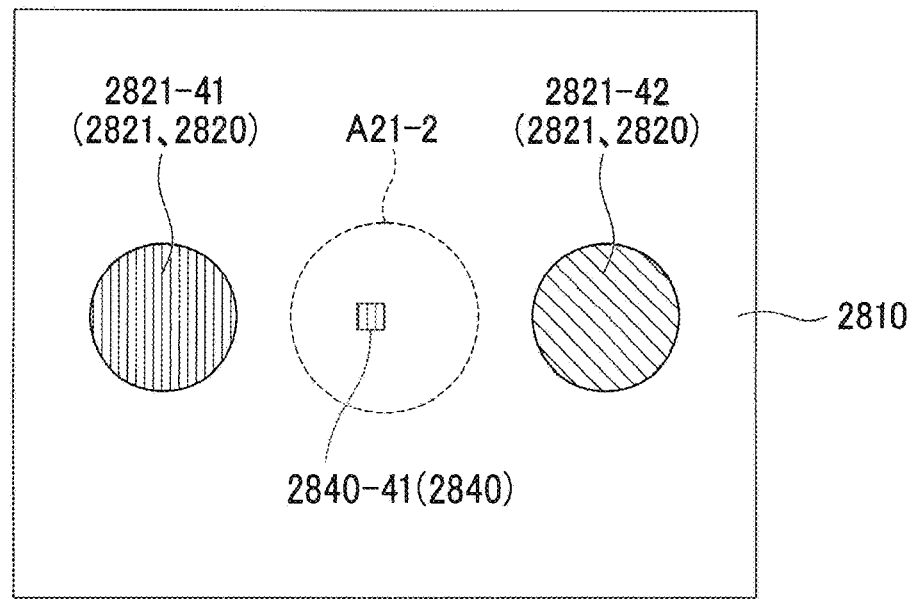
FIG. 50 is a diagram showing an example of a disposition of the material according to the one embodiment.

FIG. 50 shows a third example of the disposition of the material. In the example in FIG. 50, the positions of the substrate 2810, the droplet of the seventh material 2821-42, the solid article of the sixth material 2840-41, and the area A21-2 are the same as in the case in FIG. 49. On the other hand, the example in FIG. 50 is different from the case in FIG. 49 in that the droplet of the sixth material 2821-41 moves from the inside to the outside of the area A21-2.

FIG. 49 shows an example of a state in which a process of the droplet of the sixth material 2821-41 by the shaping unit 2110 is ended. The movement processing unit 2120 moves the droplet of the sixth material 2821-41, in which the usage thereof is ended, from the inside to the outside of the area A21-2 so that the state shown in FIG. 50 is obtained. The movement processing unit 2120 moves the droplet but does not move the material in a solid form. In the example in FIG. 50, the droplet of the sixth material 2821-41 moves from the inside to the outside of the area A21-2 while the solid article of the sixth material 2840-41 remains in the area A21-2.

Figure 51:
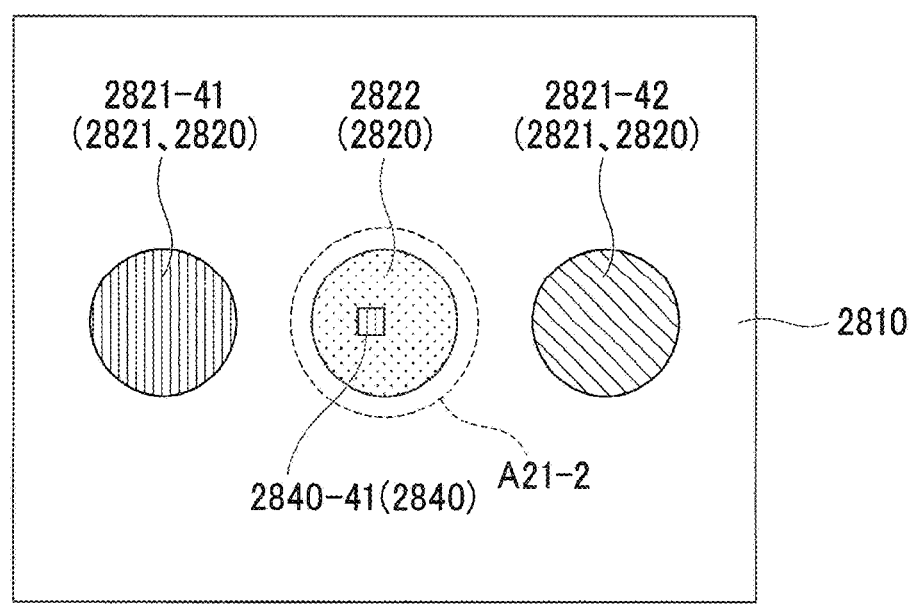
FIG. 51 is a diagram showing an example of a disposition of the material according to the one embodiment.

FIG. 51 shows a fourth example of the disposition of the material. In the example in FIG. 51, the positions of the substrate 2810, the droplet of the sixth material 2821-41, the droplet of the seventh material 2821-42, the solid article of the sixth material 2840-41, and the area A21-2 are the same as in the case in FIG. 50. On the other hand, FIG. 51 is different from the case in FIG. 50 in that there is the droplet of the cleaning liquid 2822 in the area A21-2.

From the state shown in FIG. 50, the dropping port 2140 drops the cleaning liquid into the shaping area (area A21-2) so that the state shown in FIG. 51 is obtained. In the state in FIG. 50, the droplet of the sixth material 2821-41 is moved to the outside of the area A21-2, but the sixth material in a liquid form remains on the surface of the solid article of the sixth material 2840-41. Therefore, the dropping port 2140 drops the cleaning liquid into the area A21-2, and the solid article of the sixth material 2840-41 is immersed in the cleaning liquid. As a result, the shaping system 21 cleans the surface of the solid article of the sixth material 2840-41. Specifically, the shaping system 21 removes the sixth material in a liquid form adhering to the surface of the solid article of the sixth material 2840-41.

Figure 52:
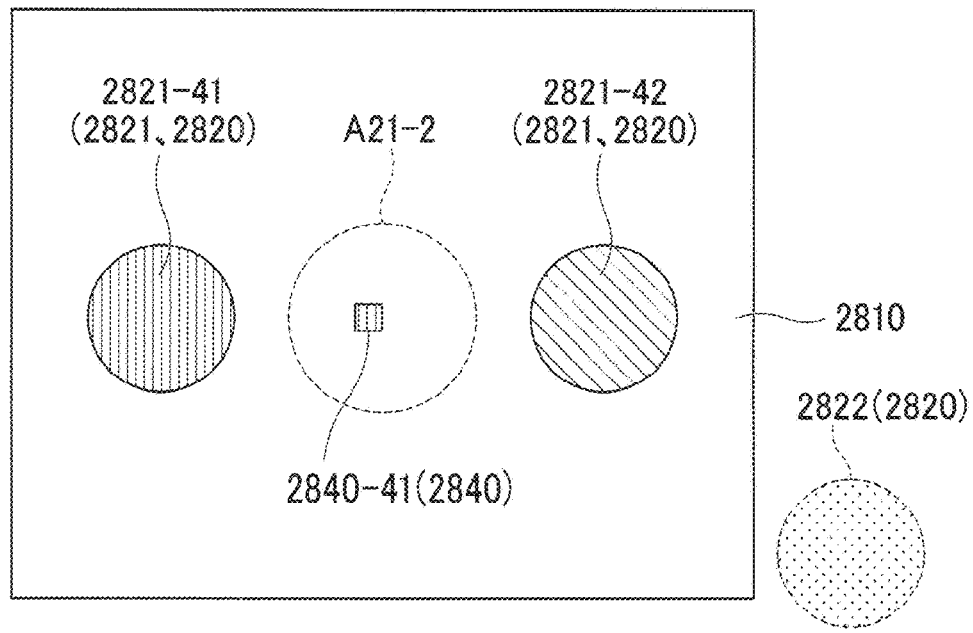
FIG. 52 is a diagram showing an example of a disposition of the material according to the one embodiment.

FIG. 52 shows a fifth example of the disposition of the material. In the example in FIG. 52, the positions of the substrate 2810, the droplet of the sixth material 2821-41, the droplet of the seventh material 2821-42, the solid article of the sixth material 2840-41, and the area A21 are the same as in the case in FIG. 51. On the other hand, FIG. 52 is different from the case in FIG. 51 in that the droplet of the cleaning liquid 2822 is removed from the substrate 2810.

From the state shown in FIG. 51, the movement processing unit 2120 moves the droplet of the cleaning liquid 2822 from the inside of the area A21-2 to the outside of the upper surface of the substrate 2810 so that the droplet of the cleaning liquid 2822 is removed from the substrate 2810, and the state shown in FIG. 52 is obtained.

Figure 53:
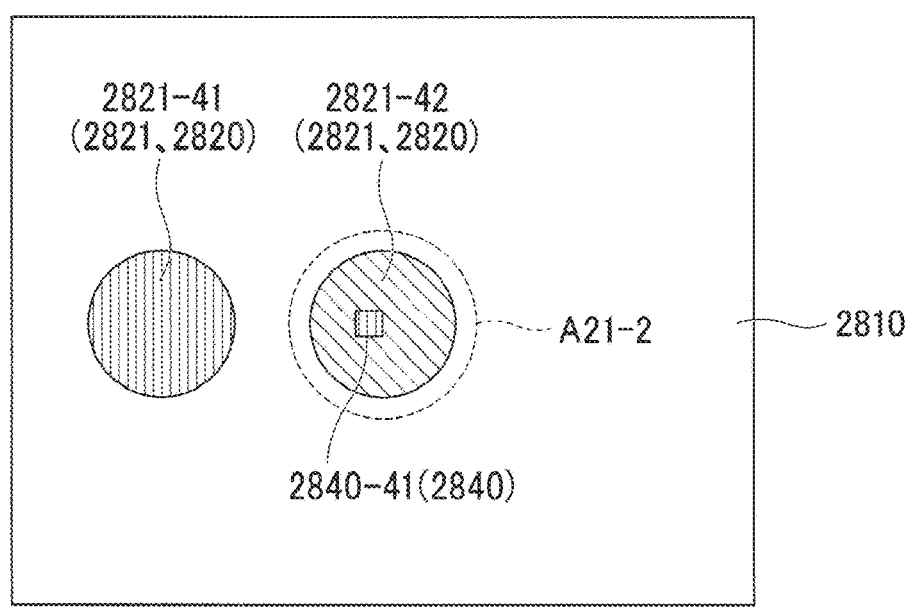
FIG. 53 is a diagram showing an example of a disposition of the material according to the one embodiment.

FIG. 53 shows a sixth example of the disposition of the material. In the example in FIG. 53, the positions of the substrate 2810, the droplet of the sixth material 2821-41, the solid article of the sixth material 2840-41, and the area A21-2 are the same as in the case in FIG. 52. On the other hand, FIG. 53 is different from the case in FIG. 52 in that the droplet of the seventh material 2821-42 moves from the outside to the inside of the area A21-2.

From the state shown in FIG. 52, the movement processing unit 2120 moves the droplet of the seventh material 2821-42 into the area A21-2 so that the state shown in FIG. 53 is obtained.

Figure 54:
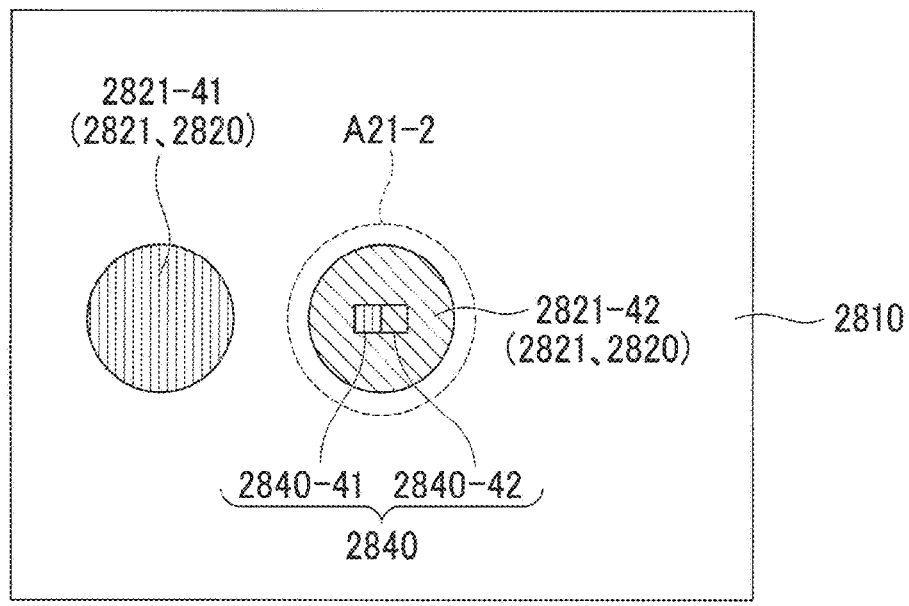
FIG. 54 is a diagram showing an example of a disposition of the material according to the one embodiment.

FIG. 54 shows a sixth example of the disposition of the material. In the example in FIG. 54, the positions of the substrate 2810, the droplet of the sixth material 2821-41, the droplet of the seventh material 2821-42, the solid article of the sixth material 2840-41, and the area A21-2 are the same as in the case in FIG. 53. On the other hand, FIG. 54 is different from the case in FIG. 53 in that the solid article of the seventh material 2840-42 is included in the droplet of the seventh material 2821-42 in addition to the solid article of the sixth material 2840-41. In the example in FIG. 54, the solid article of the sixth material 2840-41 and the solid article of the seventh material 2840-42 constitute the solid article 2840.

From the state shown in FIG. 53, the shaping unit 2110 irradiates the droplet of the seventh material 2821-42 with the shaping beam B11-2 to change part of the droplet of the seventh material 2821-42 into a solid from the liquid. The generated solid is the solid article of the seventh material 2840-42 in FIG. 54.

Figure 55:
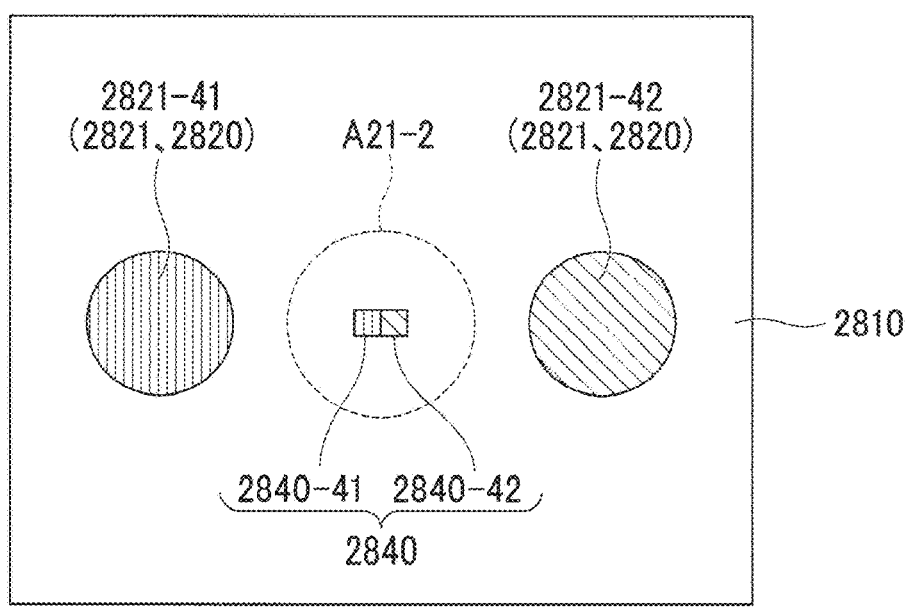
FIG. 55 is a diagram showing an example of a disposition of the material according to the one embodiment.

FIG. 55 shows an eighth example of the disposition of the material. In the example in FIG. 55, the positions of the substrate 2810, the droplet of the sixth material 2821-41, the solid article of the sixth material 2840-41, the solid article of the seventh material 2840-42, and the area A21-2 are the same as in the case in FIG. 54. On the other hand, the example in FIG. 55 is different from the case in FIG. 54 in that the droplet of the seventh material 2821-42 moves from the inside to the outside of the area A21-2.

FIG. 54 shows an example of a state in which a process of the droplet of the seventh material 2821-42 by the shaping unit 2110 is ended. The movement processing unit 2120 moves the droplet of the seventh material 2821-42, in which the usage thereof is ended, from the inside to the outside of the area A21-2 so that the state shown in FIG. 55 is obtained. As described above, the movement processing unit 2120 moves the droplet but does not move the material in a solid form. In the example in FIG. 55, the droplet of the seventh material 2821-42 moves from the inside to the outside of the area A21-2 while the solid article of the seventh material 2840-42 remains in the area A21-2.

Figure 56:
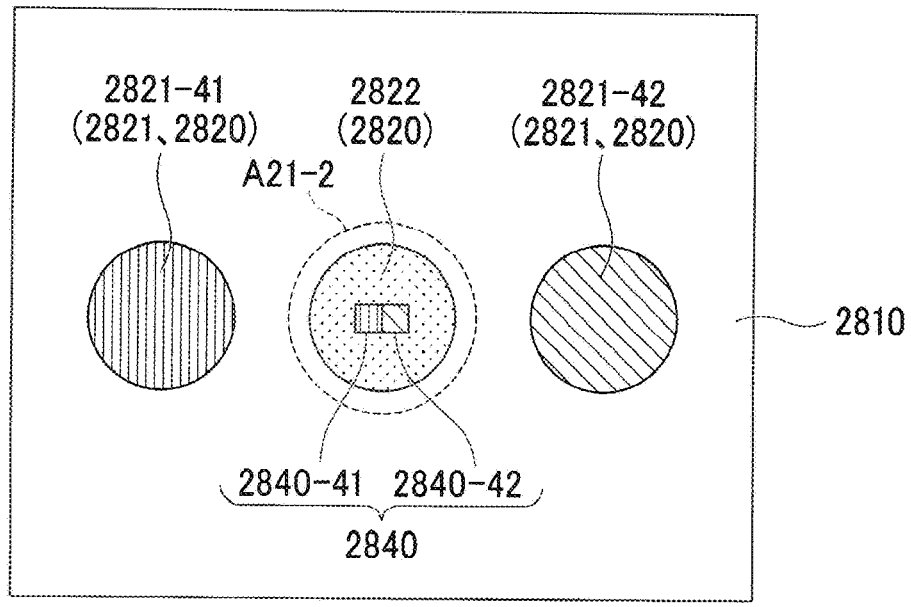
FIG. 56 is a diagram showing an example of a disposition of the material according to the one embodiment.

FIG. 56 shows a ninth example of the disposition of the material. In the example in FIG. 56, the positions of the substrate 2810, the droplet of the sixth material 2821-41, the droplet of the seventh material 2821-42, the solid article of the sixth material 2840-41, the solid article of the seventh material 2840-42, and the area A21-2 are the same as in the case in FIG. 55. On the other hand, FIG. 56 is different from the case in FIG. 55 in that there is the droplet of the cleaning liquid 2822 in the area A21-2.

From the state shown in FIG. 55, the dropping port 2140 drops the cleaning liquid into the shaping area (area A21-2) so that the state shown in FIG. 56 is obtained. In the state in FIG. 55, the droplet of the seventh material 2821-42 is moved to the outside of the area A21-2, but the seventh material in a liquid form remains on the surface of the solid article 2840. Therefore, the dropping port 2140 drops the cleaning liquid into the area A21-2 and the solid article 2840 is immersed in the cleaning liquid. As a result, the shaping system 21 cleans the surface of the solid article 2840. Specifically, the shaping system 21 removes the seventh material in a liquid form adhering to the surface of the solid article of the sixth material 2840-41 and the solid article of the seventh material 2840-42.

Figure 57:
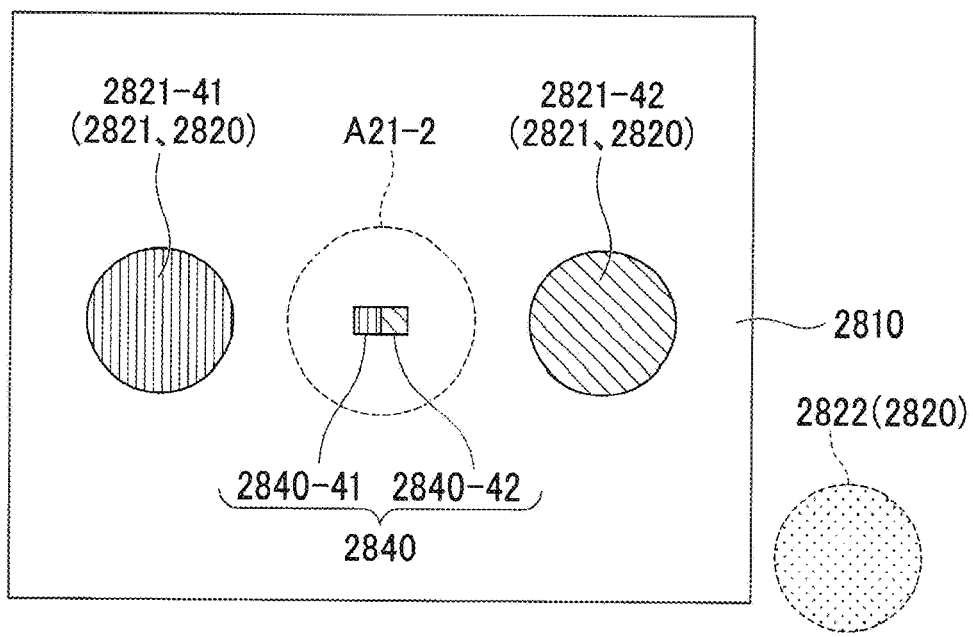
FIG. 57 is a diagram showing an example of a disposition of the material according to the one embodiment.

FIG. 57 shows a tenth example of the disposition of the material. In the example in FIG. 57, the positions of the substrate 2810, the droplet of the sixth material 2821-41, the droplet of the seventh material 2821-42, the solid article of the sixth material 2840-41, the solid article of the seventh material 2840-42, and the area A21-2 are the same as in the case in FIG. 56. On the other hand, FIG. 57 is different from the case in FIG. 56 in that the droplet of the cleaning liquid 2822 is removed from the substrate 2810.

From the state shown in FIG. 56, the movement processing unit 2120 moves the droplet of the cleaning liquid 2822 from the inside of the area A21-2 to the outside of the upper surface of the substrate 2810 so that the droplet of the cleaning liquid 2822 is removed from the substrate 2810, and the state shown in FIG. 57 is obtained.

The solid article 2840 in FIG. 57 corresponds to an example of the completed object. As described above, in the examples in FIGS. 48 to 57, the shaping system 21 produces a multi material object by using a plurality of materials such as the sixth material and the seventh material.

Next, the operation of the shaping system 21 will be described with reference to FIG. 58.

Figure 58:
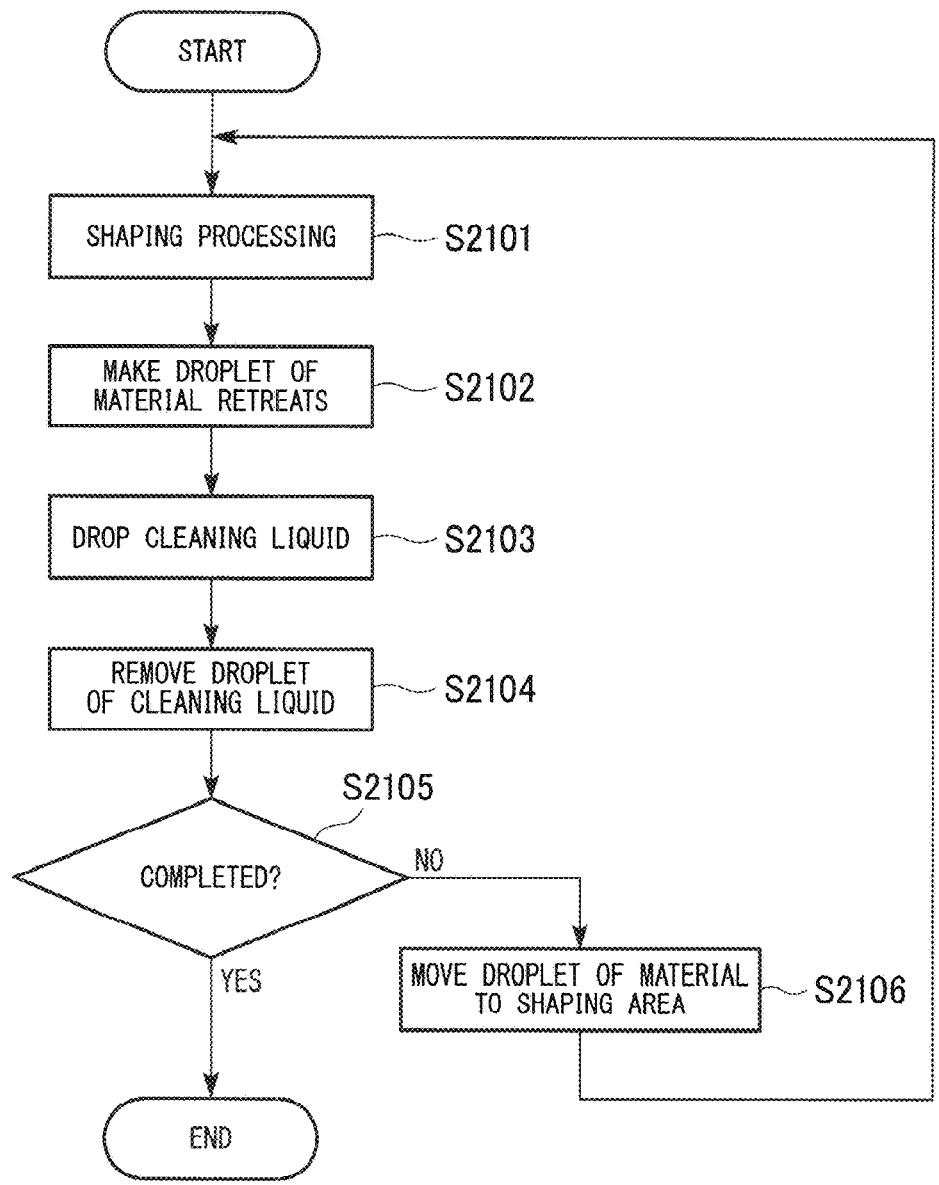
FIG. 58 is a flowchart showing an operation of the shaping system according to the one embodiment.

FIG. 58 is a flowchart showing an example of a processing procedure in which the control device 2200 controls the shaping apparatus 2100 to produce an object.

In the process in FIG. 58, the control device 2200 controls the shaping unit 2110 to perform shaping processing (step S2101). The shaping unit 2110 irradiates the droplet of the material 2821 in the shaping area with the shaping beam B11-2 under the control of the control device 2200 to form the focal point of the shaping beam B11-2 in the droplet of the material 2821. The material changes from liquid to solid at the position of the focal point.

Next, the control device 2200 controls the movement processing unit 2120 to make the droplet of the material 2821 retreats to the outside of the shaping area (retreating area) (step S2102). The movement processing unit 2120 moves the droplet of the material 2821 in the shaping area to the outside of the shaping area under the control of the control device 2200.

Next, the control device 2200 controls the dropping port 2140 to drop the cleaning liquid (step S2103). The dropping port 2140 drops the cleaning liquid into the shaping area under the control of the control device 2200. This dropping cleans the material in a solid form within the shaping area.

Next, the control device 2200 controls the movement processing unit 2120 to remove the droplet of the cleaning liquid 2822 (step S2104). The movement processing unit 2120 moves the droplet of the cleaning liquid 2822 in the shaping area to the outside of the substrate 2810 under the control of the control device 2200. By this movement, the movement processing unit 2120 removes the droplet of the cleaning liquid 2822 from the substrate 2810.

Next, the control device 2200 determines whether or not the object is completed (step S2105). When it is determined that the object is completed (step S2105: YES), the control device 2200 ends the process in FIG. 58.

On the other hand, when it is determined that the object is not completed (step S2105: NO), the control device 2200 controls the movement processing unit 2120 to move the droplet of the material 2821 to be used for the next to the shaping area (step S2106). The movement processing unit 2120 moves the droplet of the material 2821 to be used for the next from the outside of the shaping area to the inside of the shaping area under the control of the control device 2200.

After step S2106, the process returns to step S2101.

As described above the shaping apparatus 2100 includes the movement processing unit 2120 configured to generate a temperature gradient having a predetermined shape by applying the laser C-2 and move the droplet 2820 based on the temperature gradient, and the shaping unit 2110 configured to perform shaping by partially changing the droplet 2820 into a solid in a predetermined shaping area.

As a result, when the material in a liquid form is changed to a solid to shape the object, the burden of placing the material in a liquid form can be reduced, and since no microtube or switching valve is required when exchanging the material, the waste of the material is extremely small and the material can be reused.

Further, the movement processing unit 2120 may generate the temperature gradient by moving the irradiation area D2 of the laser C-2.

As a result, since the temperature gradients having various shapes can be generated, the droplets 2820 having various shapes can be moved, and the burden of placing the material in a liquid form can be reduced.

Further, the movement processing unit 2120 may generate the temperature gradient by moving the irradiation area D2 of the laser C-2 with the galvano mirror 21030.

As a result, the irradiation area D2 of the laser C-2 can be moved at high speed by using the galvano mirror 21030, and the burden of placing the material in a liquid form can be reduced.

The droplet moving device includes the movement processing unit 2120 that generates the temperature gradient having a predetermined shape by applying the laser C-2 and moves the droplet 2820 based on the temperature gradient.

As a result, the burden of placing the liquid can be reduced by moving the droplet 2820 by using the temperature gradient having a predetermined shape.

The shape of the droplet 2820 in the above described shaping apparatus 2100 and the droplet moving device may be various shapes such as an ellipse. In this case, the locus G-2 of the irradiation area D2 of the laser C-2 may be generated in a shape such as an arc in accordance with the various shapes such as an ellipse.

Further, as the substrate 2810, those having different transmissivity may be used according to the wavelength of the laser C-2. For example, the substrate 2810 may be made of a material such as a borosilicate glass or soda-coal glass.

Further, the wavelength of the laser C-2 may be changed according to the absorption spectrum of the material constituting the substrate 2810.

Further, the aspect of the droplet 2820 may be deformed by the locus G-2 of the laser C-2 in the shaping apparatus 2100 and the droplet moving device. Deformation of a shape or a pattern of the droplet 2820, deformation due to a division of the droplet 2820, deformation due to coalescence of different droplets 2820, or the like are exemplary examples of the above described deformation.

The movement processing unit 2120 may move a plurality of droplets 2820 at the same time.

Figure 59:
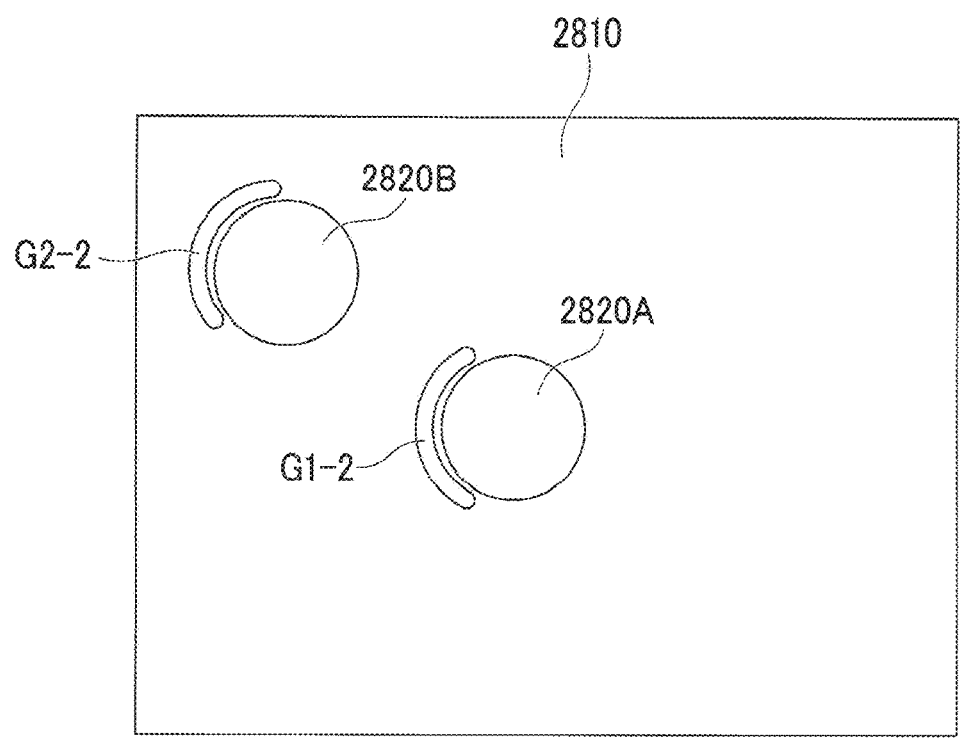
FIG. 59 is a diagram showing an irradiation area and the droplet when the movement processing unit according to the one embodiment irradiates the substrate with the laser.

For example, as shown in FIG. 59, the movement processing unit 2120 may move the plurality of droplets 2820 at the same time by irradiating each of the droplet 2820A and the droplet 2820B with the laser C-2 like the locus G1-2 and the locus G2-2 by the time division processing.

As a result, the movement processing unit 2120 can move the plurality of droplets 2820 at the same time with one laser C-2 (thus, without having to provide a plurality of laser irradiation devices 21010).

The method of changing the position where the shaping beam B11-2 forms the focal point is not limited to the method of changing the position of the laser light emitting portion of the shaping unit 2110. Instead of the laser light emitting portion of the shaping unit 2110, the support stand 2130 may be moved.

Alternatively, the angle at which the laser light emitting portion of the shaping unit 2110 emits the shaping beam B11-2 may be changed.

Figure 60:
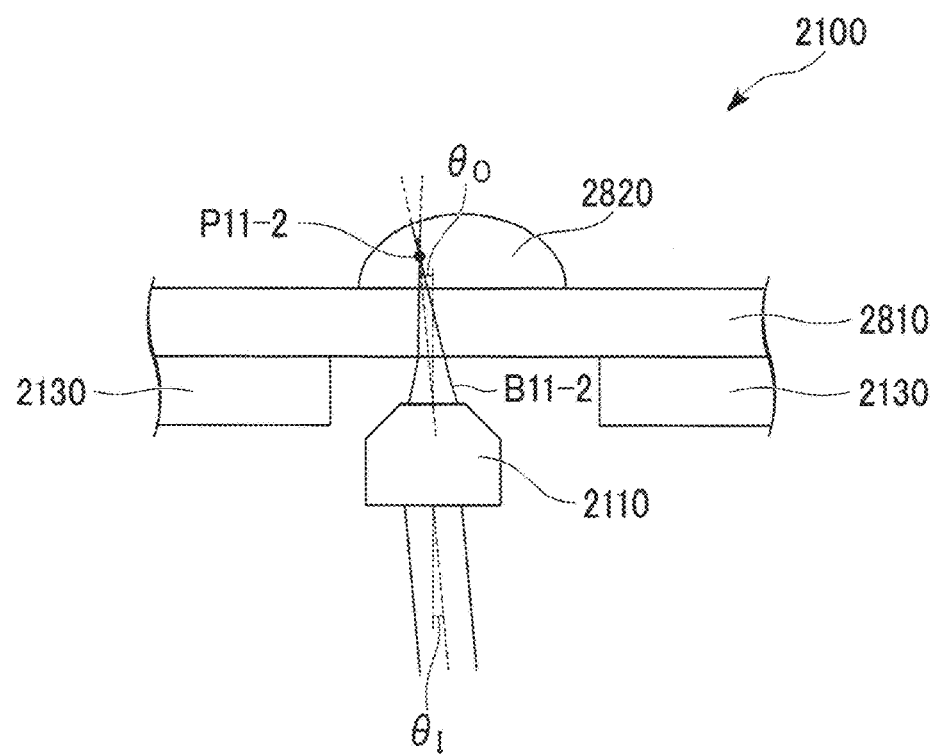
FIG. 60 is a diagram showing an example of a relationship between an angle of a shaping beam and a position of the focal point according to the one embodiment.

FIG. 60 shows an example of the relationship between the angle of the shaping beam B11-2 and the position of the focal point.

In the example in FIG. 60, the laser light emitting portion of the shaping unit 2110 functions as an objective lens, refracts the shaping beam incident from the side opposite to the droplet 2820 (lower side in FIG. 60), and irradiates the side of the droplet 2820 (upper side in FIG. 60) with the refracted shaping beam.

An incident angle of the shaping beam B11-2 to the laser light emitting portion of the shaping unit 2110 is indicated by $\theta_I$. An emission angle of the shaping beam B11-2 from the laser light emitting portion of the shaping unit 2110 is indicated by $\theta_O$. The emission angle $\theta_O$ changes according to the incident angle $\theta_I$. As the emission angle $\theta_O$ changes, the position of the point P11-2 where the shaping beam B11-2 forms the focal point also changes. Therefore, By the shaping unit 2110 to change the incident angle $\theta_I$ of the shaping beam B11-2 to the laser light emitting portion, the position where the shaping beam B11-2 forms the focal point can be changed without having to change either the position of the laser light emitting portion or the position of the substrate 2810.

As a method of changing the incident angle $\theta_I$, for example, a method of providing a mirror between the light source of the shaping beam B11-2 and the laser light emitting portion of the shaping unit 2110 and changing the direction of the mirror can be used.

A program for realizing all or part of the functions of the processes performed by the control device 200 and the control device 2200 is recorded on a computer-readable recording medium, and the processes of each part may be performed by loading the program, which is recorded on the recording medium, into the computer system and executing the program. The term the "computer system" referred to here includes hardware such as an OS or peripheral devices.

Further, the "computer system" includes a homepage providing environment (or a display environment) when a WWW system is used.

Further, the "computer-readable recording medium" refers to a non-transitory storage medium such as a portable medium such as a flexible disk, a magneto-optical disk, a ROM, or a CD-ROM, or a storage device such as a hard disk built in a computer system. Further, the above described program may be a program for realizing part of the above-mentioned functions and may be a program for realizing the above-mentioned functions in combination with a program already recorded in the computer system.

Although the embodiments of the present invention have been described in detail with reference to the drawings, the specific configuration is not limited to those embodiments, and design changes and the like within a range not deviating from the gist of the present invention are also included.

INDUSTRIAL APPLICABILITY

According to an embodiment of the present invention, when shaping an object by changing a material in a liquid form into a solid, the burden of placing the material in a liquid form can be reduced.

REFERENCE SYMBOLS

1: Shaping system
100: Shaping apparatus
110: Shaping unit
120: Movement processing unit
121: Mask
122: Cooling device
123: Fan
124: Duct
125: Air blowing port
130: Support stand
140: Dropping port
200: Control device
210: Display unit
220: Operation input unit
280: Storage unit
290: Processing unit
810: Substrate
820: Droplet
21: Shaping system
2100: Shaping apparatus
2110: Shaping unit
2120: Movement processing unit
2130: Support stand
2140: Dropping port
2150: Observation unit
2151: Observation light-light source
2152: Beam splitter
2153: Observation lens
2154: CCD camera
2155: Display device
2200: Control device
2210: Display unit
2220: Operation input unit
2280: Storage unit
2290: Processing unit
2810: Substrate
2820: Droplet
2840: Solid article
21010: Laser irradiation device
21020: Galvano mirror rotation device
21030: Galvano mirror
21040: Condensing lens

The invention claimed is:

1. A shaping apparatus comprising:
a movement processing unit that heats a droplet placed on a substrate such that a temperature of the droplet on a peripheral side in a horizontal direction becomes higher than that on a center side in the horizontal direction by irradiating an area of the substrate surrounding the periphery of the droplet in a circular form with an electromagnetic wave, and move the droplet by moving the area being irradiated with the electromagnetic wave; and
a shaping unit that performs shaping by partially changing the droplet into a solid in a predetermined shaping area,
wherein the movement processing unit heats the droplet such that the temperature of the droplet on the peripheral side in the horizontal direction becomes higher than that on the center side in the horizontal direction by blocking part of the electromagnetic wave with a mask.

2. The shaping apparatus according to claim 1, wherein after moving the droplet, the movement processing unit cools the moved droplet and ends heating, which makes the temperature of the droplet on the peripheral side in the horizontal direction higher than that on the center side in the horizontal direction.

3. The shaping apparatus according to claim 1, wherein the movement processing unit moves the droplet on a surface where a patterning process that changes wettability is applied.

4. A droplet moving device comprising:
a movement processing unit that heats a droplet placed on a substrate such that a temperature of the droplet on a peripheral side in a horizontal direction becomes higher than that on a center side in the horizontal direction by irradiating an area of the substrate surrounding the periphery of the droplet in a circular form with an electromagnetic wave, and move the droplet by moving the area being irradiated with the electromagnetic wave,
wherein the movement processing unit heats the droplet such that the temperature of the droplet on the peripheral side in the horizontal direction becomes higher than that on the center side in the horizontal direction by blocking part of the electromagnetic wave with a mask.

5. A method for controlling a shaping apparatus including a movement processing unit and a shaping unit, the method comprising:
Heating a droplet placed on a substrate such that a temperature of the droplet on a peripheral side in a horizontal direction becomes higher than that on a center side in the horizontal direction by irradiating an area of the substrate surrounding the periphery of the droplet in a circular form with an electromagnetic wave, and move the droplet by moving the area being irradiated with the electromagnetic wave; and
shaping by partially changing the droplet into a solid in a predetermined shaping area,
wherein the droplet is heated such that the temperature of the droplet on the peripheral side in the horizontal direction becomes higher than that on the center side in the horizontal direction by blocking part of the electromagnetic wave with a mask.

6. A non-transitory storage medium storing a program that executes a method for controlling a shaping apparatus including a movement processing unit and a shaping unit, the method comprising:
heating a droplet placed on a substrate such that a temperature of the droplet on a peripheral side in a horizontal direction becomes higher than that on a center side in the horizontal direction by irradiating an area of the substrate surrounding the periphery of the droplet in a circular form with an electromagnetic wave, and move the droplet by moving the area being irradiated with the electromagnetic wave; and shaping by partially changing the droplet into a solid in a predetermined shaping area, wherein the droplet is heated such that the temperature of the droplet on the peripheral side in the horizontal direction becomes higher than that on the center side in the horizontal direction by blocking part of the electromagnetic wave with a mask.

* * * * *